US012477474B2

(12) United States Patent
Cha et al.

(10) Patent No.: US 12,477,474 B2
(45) Date of Patent: Nov. 18, 2025

(54) ELECTRONIC DEVICE FOR ADJUSTING TRANSMISSION POWER BASED ON SAR AND METHOD FOR OPERATING SAME

(71) Applicant: SAMSUNG ELECTRONICS CO., LTD., Suwon-si (KR)

(72) Inventors: Jaemoon Cha, Suwon-si (KR); Seonyun Kim, Suwon-si (KR); Yeonjoo Lee, Suwon-si (KR); Suyoung Park, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/507,234

(22) Filed: Nov. 13, 2023

(65) Prior Publication Data

US 2024/0089867 A1    Mar. 14, 2024

Related U.S. Application Data

(63) Continuation of application No. 17/570,568, filed on Jan. 7, 2022, now Pat. No. 11,917,552, which is a
(Continued)

(30) Foreign Application Priority Data

Aug. 14, 2019   (KR) ........................ 10-2019-0099812

(51) Int. Cl.
*H04W 52/24* (2009.01)
(52) U.S. Cl.
CPC ................................. *H04W 52/246* (2013.01)
(58) Field of Classification Search
CPC .... H04W 52/246; H04W 52/18; H04W 52/38
See application file for complete search history.

(56) References Cited

U.S. PATENT DOCUMENTS 8,909,282 B2   12/2014  Ngai et al.
9,491,706 B2 *  11/2016  Thorson .............. H04W 52/367
(Continued)

FOREIGN PATENT DOCUMENTS

CN    102835036 A   12/2012
CN    105359420 A    2/2016
(Continued)

OTHER PUBLICATIONS

US 11,818,667 B2, 11/2023, Cha et al. (withdrawn)
(Continued)

*Primary Examiner* — Keith Ferguson
(74) *Attorney, Agent, or Firm* — Nixon & Vanderhye P.C.

(57) ABSTRACT

An electronic device according to various embodiments may include: at least one antenna; and at least one communication processor configured to support first network communication with a first network and second network communication with a second network different from the first network. The at least one communication processor may be configured to: identify a first cumulative SAR value based on radiation of a communication signal corresponding to the first network communication via a first part of the at least one antenna and a second cumulative SAR value based on radiation of a communication signal corresponding to the second network communication via a second part of the at least one antenna; and adjust one of a transmission intensity of a first communication signal corresponding to the first network communication or a transmission intensity of a second communication signal corresponding to the second network communication, based on a designated condition satisfied by the first cumulative SAR value and the second cumulative SAR value.

19 Claims, 42 Drawing Sheets

Related U.S. Application Data continuation of application No. 16/906,242, filed on Jun. 19, 2020, now Pat. No. 11,228,985.

(56) References Cited

U.S. PATENT DOCUMENTS

| | | | |
|---|---|---|---|
| 10,013,038 | B2 | 7/2018 | Mercer et al. |
| 10,129,834 | B2 | 11/2018 | Yao et al. |
| 10,244,489 | B2 | 3/2019 | Loehr et al. |
| 10,652,833 | B2 | 5/2020 | Nadakuduti et al. |
| 11,228,985 | B2 | 1/2022 | Cha et al. |
| 2012/0021800 | A1 | 1/2012 | Wilson |
| 2012/0071195 | A1 | 3/2012 | Chakraborty et al. |
| 2012/0231784 | A1 | 9/2012 | Kazmi |
| 2014/0370929 | A1 | 12/2014 | Khawand et al. |
| 2015/0036514 | A1 | 2/2015 | Zhu |
| 2016/0050633 | A1 | 2/2016 | Yun |
| 2016/0242128 | A1 | 8/2016 | Loehr et al. |
| 2018/0076844 | A1 | 3/2018 | Park et al. |
| 2018/0288709 | A1 | 10/2018 | Yao et al. |

FOREIGN PATENT DOCUMENTS

| | | |
|---|---|---|
| EP | 2683025 | 1/2014 |
| KR | 10-2017-0037924 | 4/2017 |
| KR | 10-2018-0028801 | 3/2018 |
| RU | 2645753 C2 | 2/2018 |
| WO | WO 2018/182822 A1 | 10/2018 |

OTHER PUBLICATIONS

U.S. Appl. No. 17/570,568, filed Jan. 7, 2022; Cha et al.
India Examination Report dated Jul. 31, 2021 for IN Application No. 202034033913.
U.S. Appl. No. 16/906,242, filed Jun. 19, 2020; Cha et al.
International Search Report and Written Opinion dated Nov. 20, 2020 in counterpart International Patent Application No. PCT/KR2020/010730.
Extended Search Report and Written Opinion dated Jan. 13, 2021 in counterpart European Patent Application No. 20190040.4.
ZTE Corporation, et al., "FR2 impacts to power sharing," R2-1816845, 3GPP TSG-RAN WG2 Meeting #104, Spokane, USA, Nov. 2, 2018, 4 pages.
OPPO, "UE capability of SAR for FR1 and FR2," R2-1903092, 3GPP TSG-RAN2 #105bis, Xian, China, Mar. 28, 2019, 5 pages.
CHTTL, "Discussion on solutions for EN-DC FDD-TDD High Power UE," R4-1903296, TSG-RAN Working Group 4 (Radio) meeting #90bis, Xian, China, Apr. 1, 2019, 6 pages.
TSG-RAN Working Group 4 (Radio) meeting #90bis R4-1903296 Xian, China, Apr. 8-12, 2019 "Discussion on solutions for EN-DC FDD-TDD High Power UE", 4 pages.
European Office Action dated Dec. 13, 2022 for EP Application No. 20190040.4.
Russian Office Action and Russian Search Report dated Nov. 7, 2023.
Chinese Decision on Grant dated Nov. 22, 2023 for CN Application No. 202010806110.2.
Russian Decision on Grant dated Feb. 1, 2024 for RU Application No. 2022106273/07(013125).

\* cited by examiner

| 2201 | 2202 | 2203 | 2204 |
|------|------|------|------|
| PAST | PRESENT | LTE-FUTURE | NR-FUTURE |
| D1 | D2 | D7 | D8 |

| 2401 | 2402 | 2403 | 2404 |
|---|---|---|---|
| PAST | PRESENT | HOT SPOT FUTURE | DATA COMMUNICATION FUTURE |
| D1 | D2 | D9 | D10 |

ELECTRONIC DEVICE FOR ADJUSTING TRANSMISSION POWER BASED ON SAR AND METHOD FOR OPERATING SAME

CROSS-REFERENCE TO RELATED APPLICATION

This application is a Continuation of U.S. application Ser. No. 17/570,568, filed Jan. 7, 2022 (now U.S. Pat. No. 11,818,667), which is a Continuation of U.S. application Ser. No. 16/906,242, filed Jun. 19, 2020 (now U.S. Pat. No. 11,228,985), which claims priority to KR 10-2019-0099812, filed on Aug. 14, 2019, the entire contents of which are all hereby incorporated herein by reference in their entireties.

BACKGROUND

Field

The disclosure relates to an electronic device for adjusting transmission power based on a specific absorption rate (SAR) and a method for operating the same.

Description of Related Art

User equipment (UE) may transmit electromagnetic waves in order to transmit/receive data with a base station. The electromagnetic waves radiated by the UE may adversely affect human bodies, and various domestic/overseas institutions attempt to limit such electromagnetic waves that have a hazardous effect on human bodies. For example, a specific absorption rate (SAR) refers to a numerical value indicating the degree of absorption of electromagnetic waves radiated from mobile communications terminal into human bodies. The SAR employs a unit of W/g (or mW/g), which may refer to the amount of electric power (W or mW) absorbed per 1 g of human body. Standards for limiting the SAR in connection with mobile communication terminals have been established in line with the attention to adverse influences of electromagnetic waves on human bodies.

The UE may back off transmission power if it is predicted, for example, that a predicted SAR will exceed a threshold value, due to the transmission power. For example, if occurrence of a specific event (for example, grip, hot spot, or proxy) is identified, the UE may transmit a communication signal using backoff power corresponding to the event.

As described above, if it is predicted that a predicted SAR at a specific timepoint will exceed the threshold SAR, the UE may run an algorithm that backs off the transmission power. However, no technology for backing off transmission power based on the total amount of SAR value cumulative during a specific time has been disclosed. Not only SARs that immediately affect human bodies, but also SARs that affect human bodies on an average basis need to be taken into account. Accordingly, it is expected that, in the future, a technology for backing off transmission power based on an cumulative SAR or an average SAR will be developed.

SUMMARY

Embodiments of the disclosure provide an electronic device capable of identifying whether to back off transmission power based on an cumulative SAR value, and a method for operating the same.

An electronic device according to various example embodiments may include: at least one antenna; and at least one communication processor configured to support first network communication with a first network and second network communication with a second network different from the first network. The at least one communication processor may be configured to: identify a first cumulative specific absorption rate (SAR) value based on radiation of a communication signal corresponding to the first network communication via a first part of the at least one antenna and a second cumulative SAR value based on radiation of a communication signal corresponding to the second network communication via a second part of the at least one antenna; and adjust one of a transmission intensity of a first communication signal corresponding to the first network communication or a transmission intensity of a second communication signal corresponding to the second network communication based on a designated condition satisfied by the first cumulative SAR value and the second cumulative SAR value.

An electronic device according to various example embodiments may include at least one communication processor configured to support first network communication with a first network and second network communication with a second network different from the first network. The at least one communication processor may be configured to: receive, from a base station corresponding to the first network communication, a report condition instructing transmission of a communication signal from at least one peripheral base station corresponding to the second network communication; identify that a communication signal from a first base station among peripheral base stations corresponding to the second network communication satisfies the report condition; and identify whether to perform a measurement report corresponding to the first base station based on a first cumulative SAR value resulting from radiation of a communication signal corresponding to the first network communication.

An electronic device according to various example embodiments may include: at least one antenna; a Wi-Fi communication module comprising circuitry configured to perform Wi-Fi communication with an external electronic device; and at least one communication processor configured to support first network communication with a first network and second network communication with a second network different from the first network. The at least one communication processor may be configured to: identify a first SAR margin configured in the Wi-Fi communication module based on activation of a Wi-Fi hot spot function using the Wi-Fi communication module; identify a first cumulative SAR value based on radiation of a communication signal corresponding to the first network communication via a first part of the at least one antenna and a second cumulative SAR value based on radiation of a communication signal corresponding to the second network communication via a second part of the at least one antenna; and determine a transmission intensity of the communication signal corresponding to the first network communication and a transmission intensity of the communication signal corresponding to the second network communication based on the first cumulative SAR value, the second cumulative SAR value, and the first SAR margin.

According to various example embodiments, an electronic device capable of identifying whether to back off transmission power, based on an cumulative SAR value, and a method for operating the same, may be provided. Accordingly, the average SAR may not exceed a threshold average value, thereby improving the user's safety.

BRIEF DESCRIPTION OF THE DRAWINGS

The above and other aspects, features, and advantages of certain embodiments the present disclosure will be more apparent from the following detailed description, taken in conjunction with the accompanying drawings, in which:

FIG. 22 is a diagram illustrating an example amount of used SAR and a margin according to various embodiments;

FIG. 24 is a diagram illustrating an example amount of used SAR and a margin, which are identified according to various embodiments;

DETAILED DESCRIPTION

Figure 1:
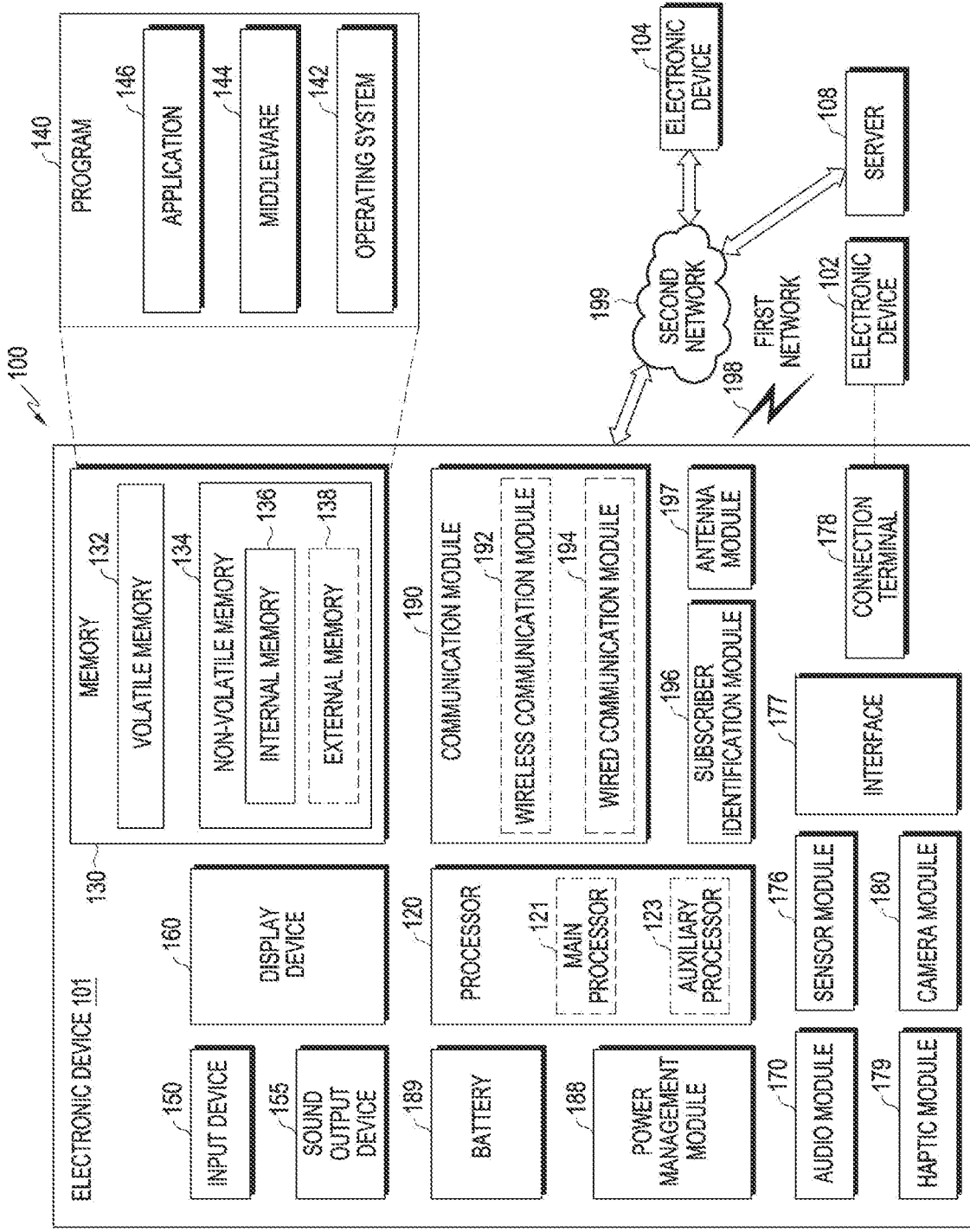
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
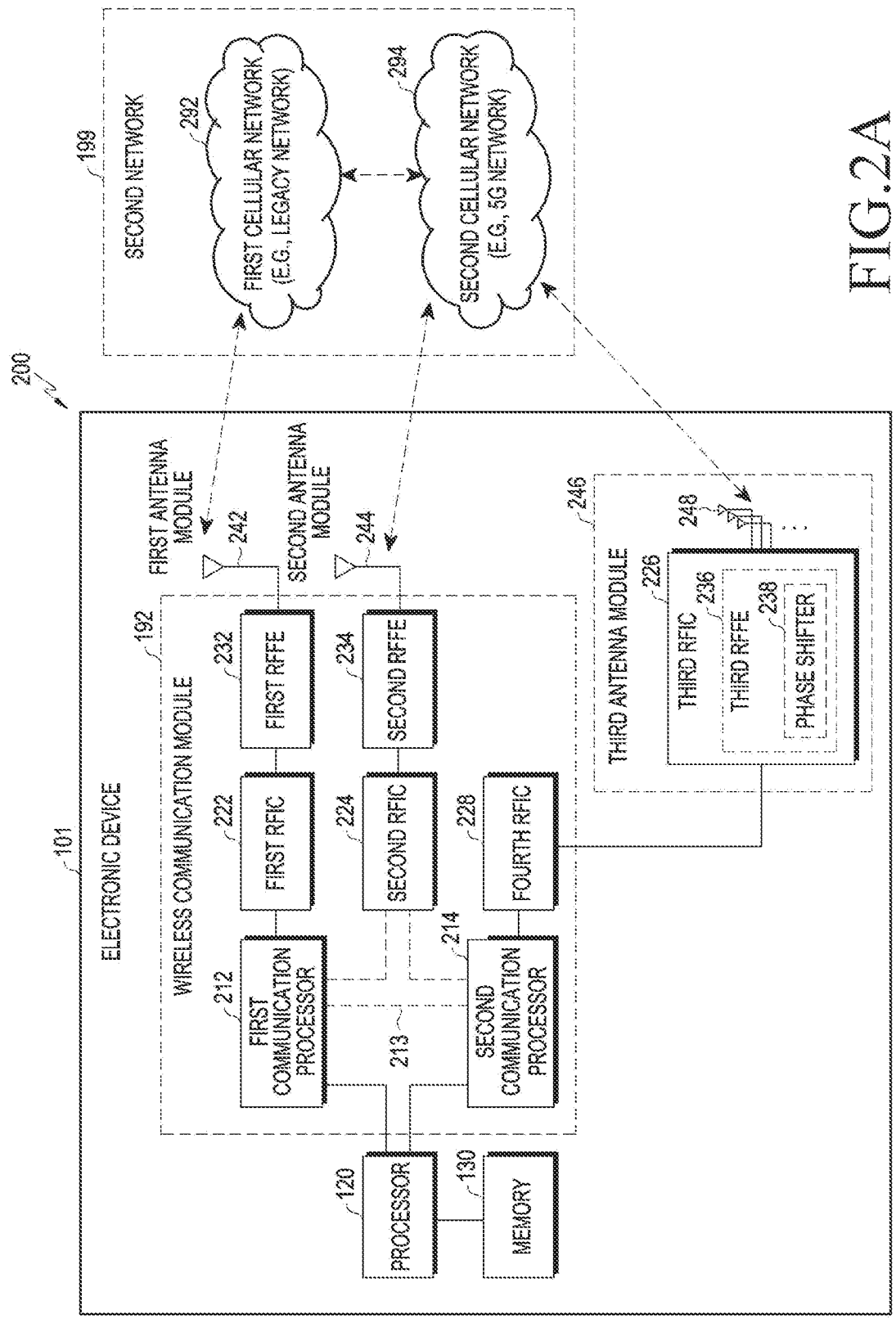
FIG. 2A is a block diagram illustrating an example electronic device for supporting network communication and 5G network communication according to various embodiments.

FIG. 2A is a block diagram 200 illustrating the example electronic device 101 for supporting network communication and 5G network communication, according to various embodiments. Referring to FIG. 2A, the electronic device 101 may include a first communication processor 212 (e.g., including processing circuitry), a second communication processor (e.g., including processing circuitry) 214, a first radio-frequency integrated circuit (RFIC) 222, a second RFIC 224, a third RFIC 226, a fourth RFIC 228, a first radio-frequency front end (RFFE) 232, a second RFFE 234, a first antenna module 242, a second antenna module 244, and an antenna 248. The electronic device 101 may further include a processor 120 and a memory 130. The network 199 may include a first network 292 and a second network 294. According to another embodiment, the electronic device 101 may further include at least one of the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of a wireless communication module 192. According to another embodiment, the fourth RFIC 228 may be omitted or included as a part of the third RFIC 226.

The first communication processor 212 may include various processing circuitry and establish a communication channel in a band to be used for wireless communication with the first network 292 and may support legacy network communication via the established communication channel. According to various embodiments, the first network may be a legacy network including a $2^{nd}$ generation (2G), 3G, 4G, or long term evolution (LTE) network. The second communication processor 214 may establish a communication channel corresponding to a designated band (for example, about 6 GHz to 60 GHz) among bands to be used for wireless communication with the second network 294 and may support 5G network communication via the established communication channel. According to various embodiments, the second network 294 may be a 5G network defined by 3GPP. Additionally, according to an embodiment, the first communication processor 212 or the second communication processor 214 may establish a communication channel corresponding to another designated band (for example, about 6 GHz or less) among bands to be used for wireless communication with the second network 294 and may support 5G network communication via the established communication channel.

The first communication processor 212 may transmit/receive data with the second communication processor 214. For example, data that has been classified to be transmitted via the second cellular network 294 may be changed to be transmitted via the first cellular network 292. In this case, the first communication processor 212 may receive transmission data delivered from the second communication processor 214.

For example, the first communication processor 212 may transmit/receive data with the second communication processor 214 via an inter-processor interface 213. The inter-processor interface 213 may be implemented, for example, as a universal asynchronous receiver/transmitter (UART) (for example, high speed UART (HS-UART)) or peripheral component interconnect bus express (PCIe)) interface, but the type is not limited. Alternatively, the first communication processor 212 and the second communication processor 214 may exchange control information and packet data information via a shared memory, for example. The first communication processor 212 may transmit/receive various kinds of information, such as sensing information, information regarding the output intensity, and resource block (RB) assignment information, with the second communication processor 214.

Depending on the manner of implementation, the first communication processor 212 may not be directly connected to the second communication processor 214. In this case, the first communication processor 212 may transmit/receive data with the second communication processor 214 via a processor 120 (for example, application processor). For example, the first communication processor 212 and the second communication processor 214 may transmit/receive data with the processor 120 (for example, application processor) via an HS-UART interface or PCIe interface, but the type of interface is not limited. Alternatively, the first communication processor 212 and the second communication processor 214 may exchange control information and packet data information with the processor 120 (for example, application processor) via a shared memory.

Figure 2B:
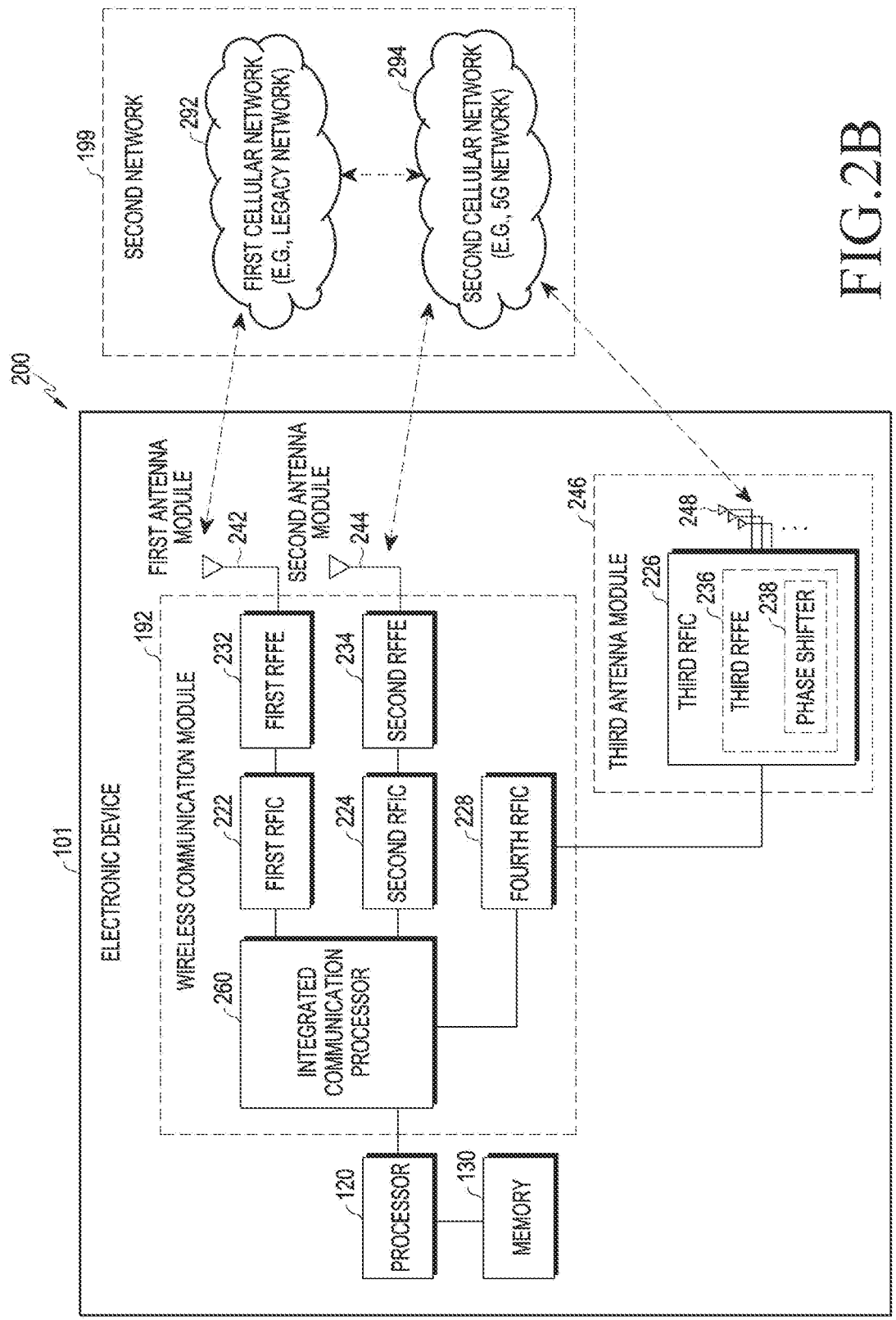
FIG. 2B is a block diagram illustrating an example electronic device for supporting network communication and 5G network communication according to various embodiments.

According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190. For example, as in FIG. 2B, the combined communication processor (e.g., including processing circuitry) 260 may support all functions for communicating with the first cellular network and the second cellular network.

The first RFIC 222 may convert, during transmission, a baseband signal produced by the first communication processor 212 into a RF signal of about 700 MHz to about 3 GHz used by the first network 292 (for example, legacy network). During reception, an RF signal may be acquired from the first network 292 (for example, legacy network) via an antenna (for example, first antenna module 242), and may be preprocessed via the an RFFE (for example, first RFFE 232). The first RFIC 222 may convert the preprocessed RF signal into a baseband signal such that the same can be processed by the first communication processor 212.

The second RFIC 224 may convert, during transmission, a baseband signal produced by the first communication processor 212 or the second communication processor 214 into an RF signal (hereinafter, referred to as 5G Sub6 RF signal) in a Sub6 band (for example, about 6 GHz or less) used by the second network 294 (for example, 5G network). During reception, a 5G Sub6 RF signal may be acquired from the second network 294 (for example, 5G network) via an antenna (for example, second antenna module 244), and may be preprocessed via an RFFE (for example, second RFFE 234). The second RFIC 224 may convert the preprocessed 5G Sub6 RF signal into a baseband signal such that the same can be processed by a corresponding communication processor, among the first communication processor 212 and the second communication processor 214.

The third RFIC 226 may convert a baseband signal produced by the second communication processor 214 into a RF signal (hereinafter, referred to as 5G Above6 RF signal) in a 5G Above6 band (for example, about 6 GHz to about 60 GHz) to be used in the second network 294 (for example, 5G network). During reception, a 5G Above RF signal may be acquired from the second network 294 (for example, 5G network) via an antenna (for example, antenna 248) and may be preprocessed via the third RFFE 236. The third RFIC 226 may convert the preprocessed 5G Above 6 RF signal into a baseband signal such that the same can be processed by the second communication processor 214. According to an embodiment, the third RFFE 236 may be formed as a part of the third RFIC 226.

The electronic device 101, according to an embodiment, may include a fourth RFIC 228 separately from the third RFIC 226 or as at least a part thereof. In this case, the fourth RFIC 228 may convert a baseband signal produced by the second communication processor 214 into an RF signal (hereinafter, referred to as IF signal) in an intermediate frequency band (for example, about 9 GHz to about 11 GHz) and then deliver the IF signal to the third RFIC 226. The third RFIC 226 may convert the FI signal into a 5G Above6 RF signal. During reception, a 5G Above6 RF signal may be received from the second network 294 (for example, 5G network) via an antenna (for example, antenna 248) and may be converted into an IF signal via the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one of the first antenna module 242 or the second antenna module 244 may be omitted or coupled to another antenna module so as to process RF signals in corresponding multiple bands.

According to an embodiment, the third RFIC 226 and the antenna 248 may be disposed on the same substrate so as to form a third antenna module 246. For example, the wireless communication module 192 or the processor 120 may be disposed on a first substrate (for example, main PCB). In this case, the third RFIC 226 may be disposed on a partial area (for example, lower surface) of a second substrate (for example, sub PCB) which is separate from the first substrate, and the antenna 248 may be disposed on another partial area (for example, upper surface) thereof, thereby forming a third antenna module 246. By disposing the third RFIC 226 and the antenna 248 on the same substrate, the length of the transmission line therebetween can be reduced. For example, it is possible to reduce loss (for example, attenuation) of a signal in a high-frequency band (for example, about 6 GHz to about 60 GHz) used for 5G network communication, due to the transmission line. This enables the electronic device 101 to improve the quality or rate of communication with the second network 294 (for example, 5G network).

According to an embodiment, the antenna 248 may be formed as an antenna array including multiple antenna elements that can be used for beamforming. In this case, the third RFIC 226 may include multiple phase shifters 238 corresponding to the multiple antenna elements, as a part of the third RFFE 236, for example. During transmission, each of the multiple phase shifters 238 may convert the phase of a 5G Above6 RF signal to be transmitted to the outside (for example, base station of 5G network) of the electronic device 101 via a corresponding antenna element. During reception, each of the multiple phase shifters 238 may convert the phase of a 5G Above6 RF signal received from the outside via a corresponding antenna element into the same or substantially same phase. This enables transmission or reception via beamforming between the electronic device 101 and the outside.

The second network 294 (for example, 5G network) may be run independently (for example, standalone (SA)) of the first network 292 (for example, legacy network) or run while being connected thereto (for example, non-standalone (NSA)). For example, the 5G network may have only an access network (for example, 5G radio access network (RAN)) or next-generation RAN (NG RAN), and may have no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol information) for communication with the legacy network or protocol information (for example, new radio (NR) protocol information) for communication with the 5G network may be stored in the memory 230 and accessed by another component (for example, processor 120, first communication processor 212, or second communication processor 214).

Figure 3:
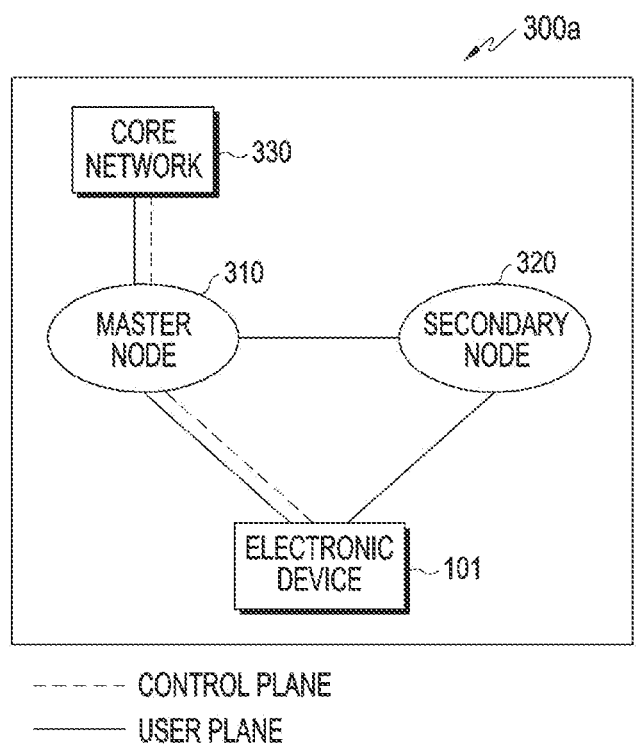
FIG. 3 is a diagram illustrating example wireless communication systems providing networks for legacy communication and/or 5G communication according to various embodiments.

FIG. 3 is a diagram illustrating an example wireless communication systems providing networks for legacy communication and/or 5G communication according to various embodiments. Referring to FIG. 3, the network environment 300a may include at least one of a legacy network and a 5G network. The legacy network may include, for example, a 4G or LTE base station 340 (for example, eNodeB (eNB)) based on a 3GPP standard that supports wireless connection with an electronic device 101, and an evolved packet core (EPC) configured to manage 4G communication. The 5G network may include, for example, a new radio (NR) base station (for example, gNodeB (gNB)) supporting wireless connection with the electronic device 101, and a 5th generation core (5GC) configured to manage 5G communication of the electronic device 101.

According to various embodiments, the electronic device 101 may transmit/receive a control message and user data via legacy communication and/or 5G communication. The control message may include, for example, a message related to at least one of security control, bear setup, authentication, registration, or mobility management of the electronic device 101. The user data may refer to user data other than a control message transmitted/received between the electronic device 101 and the core network 330 (for example, EPC).

Referring to FIG. 3, the electronic device 101 according to an embodiment may transmit/receive at least one of a control message or user data with at least a part (for example, NR base station or 5GC) of the 5G network using at least a part (for example, LTE base station or EPC) of the legacy network.

According to various embodiments, the network environment 300a may include a network environment which provides wireless communication dual connectivity (DC) to the LTE base station and the NR base station, and which transmits/receives a control message with the electronic device 101 via a core network 230 of one of EPC or the 5GC.

According to various embodiments, in the DC environment, one of the LTE base station or the NR base station may operate as a master node (MN) 310, and the other thereof may operate a secondary node (SN) 320. The MN 310 may be connected to the core network 230 so as to transmit/receive a control message. The MN 310 and the SN 320 may be connected via a network interface so as to transmit/receive messages related to radio resource (for example, communication channel) management.

According to various embodiments, the MN 310 may be configured with an LTE base station 340, the SN 320 may be configured with an NR base station, and the core network 330 may be configured with an EPC. For example, a control message may be transmitted/received via the LTE base station and the EPC, and user data may be transmitted/received via at least one of the LTE base station or the NR base station.

According to various embodiments, the MN 310 may be configured with an NR base station, the SN 320 may be configured with an LTE base station, and the core network 330 may be configured with a 5GC. For example, a control message may be transmitted/received via the NR base station and the 5GC, and user data may be transmitted/received via at least one of the LTE base station or the NR base station.

According to various embodiments, the electronic device 101 may be registered in at least one of the EPC or the 5GC so as to transmit/receive a control message.

According to various embodiments, the EPC or the 5GC may manage communication of the electronic device 101 via interworking. For example, movement information of the electronic device 101 may be transmitted/received via the interface between the EPC and the 5GC.

As described above, the dual connectivity via the LTE base station and the NR base station may also be referred to as E-UTRA new radio dual connectivity (EN-DC). Meanwhile, the MR DC may be variously applicable, in addition to the EN-DC. For example, the first network and the second network based on the MR-DC may all pertain to LTE communication, and the second network may correspond to a small cell having a specific frequency. For example, the first network may be connected to the 5G core network, but the radio interval thereof may use LTE communication, and the second network may pertain to 5G communication. For example, the first network and the second network based on the MR-DC may all pertain to 5G, the first network may correspond to a frequency band (for example, below 6) less than 6 GHz, and the second network may correspond to a frequency band (for example, over 6) equal to/higher than 6 GHz. A person skilled in the art could easily understand that various embodiments are applicable to any network structure to which dual connectivity is applicable, besides the above-mentioned examples.

Figure 4:
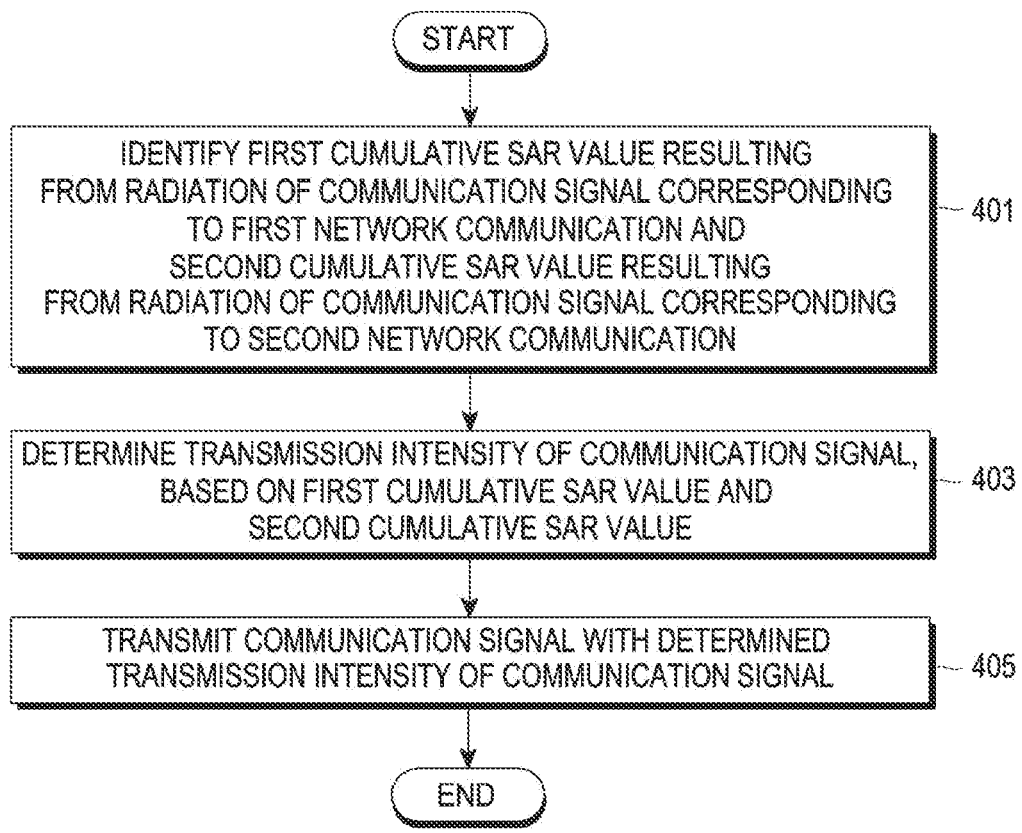
FIG. 4 is a flowchart illustrating an example method for operating an electronic device according to various embodiments.

FIG. 4 is a flowchart illustrating an example method for operating an electronic device according to various embodiments.

According to various embodiments, the electronic device 101 (for example, at least one of processor 120, first communication processor 212, second communication processor 214, or combined communication processor 260) may identify a first cumulative SAR value resulting from (e.g., based on) radiation of a communication signal corresponding to first network communication and a second cumulative SAR value resulting from radiation of a communication signal corresponding to second network communication, in operation 401. The electronic device 101 may store information regarding power input to an antenna for radiation of a communication signal corresponding to first network communication, which has been transmitted in the past, and information regarding power input to the antenna for radiation of a communication corresponding to a second network communication signal. The information regarding power input to the antenna may be expressed in the unit of dB, dBM, or Watt (W), for example, but the unit is not limited. According to various embodiments, the electronic device 101 may store information regarding power radiated from the antenna, and any magnitude of power associated with the SAR may be used with no limitation. The magnitude of power input to the antenna and/or the magnitude of power radiated from the antenna may be referred to as the transmission intensity of the communication signal. The electronic device 101 may store pieces of information regarding the transmission intensity corresponding to respective network communication signals during a designated time period. The electronic device 101 may identify a first cumulative SAR value corresponding to first network communication, based on information regarding the transmission intensity of a communication signal corresponding to the first network communication, and may identify a second cumulative SAR value corresponding to second network communication, based on information regarding the transmission intensity of a communication signal corresponding to the second network communication. The electronic device 101 may store information regarding association between the transmission intensity and the SAR value, and may identify the cumulative SAR value based thereon. For example, the electronic device 101 may identify SAR values in multiple sub time intervals of a designated time period, respectively, and may summate the SAR values in the multiple sub time intervals, respectively, thereby identifying the cumulative SAR value. In another embodiment, the electronic device 101 may store only the cumulative SAR value at a past timepoint of a designated period and may update the same, thereby managing the cumulative SAR value. In this case, the electronic device 101 may not store information regarding the transmission intensity at the past timepoint.

According to various embodiments, the electronic device 101 may determine the transmission intensity of a communication signal, which is scheduled to be transmitted at the current timepoint, based on the first cumulative SAR value and the second cumulative SAR value, in operation 403. The electronic device 101 may transmit a communication signal with the determined transmission intensity of the communication signal, in operation 405. For example, the electronic device 101 may predict an cumulative SAR value during a designated time period (for example, fifty seconds) at least one future timepoint, based on an cumulative SAR value. For example, the electronic device 101 may predict an cumulative SAR value for a designated time period (50 seconds) at a first future timepoint after 0.5 second, and may predict a (minimum) cumulative SAR value for 50 seconds at each of a second future timepoint and a $50^{th}$ future timepoint after 1.0 second/49.5 seconds. In order to predict a (minimum) cumulative SAR value during a designated time period at a future timepoint, the electronic device 101 may use at least a part of a SAR value cumulative at a past timepoint. According to various embodiments, if a predicted (minimum) cumulative SAR value at least one future timepoint exceeds a threshold cumulative value, the electronic device 101 may determine that the transmission intensity of the communication signal to be transmitted at the current timepoint is a backed-off transmission intensity. If the predicted (minimum) cumulative SAR value at least one future timepoint is equal to/less than the threshold cumulative value, the electronic device 101 may determine that the transmission intensity of the communication signal to be transmitted at the current timepoint is a normal transmission intensity. In various embodiments, the expression "transmitting a communication signal with a determined transmission intensity" may be understood referring, for example, to the electronic device 101 configuring a parameter (for example, power amp bias or RF gain) based on the determine transmission intensity. For example, at least one of the first communication processor 212, the second communication processor 214, or the combined communication processor 260 may configure (or adjust) the parameter (or setting) of at least one of the first RFIC 222, the second RFIC 224, the third RFIC 226, the fourth RFIC 228, the first RFFE 232, or the second RFFE 234. A person skilled in the art would understand that the parameter is not limited, as long as the same is for the purpose of adjusting the magnitude of power (or current) applied to the antenna. As described above, the cumulative SAR value at a specific future timepoint may be maintained to be equal to/less than a threshold cumulative value, and the average SAR value may accordingly be maintained to be equal to/less than a threshold average value.

In some cases, the electronic device 101 according to various embodiments may determine, even when a SAR event has occurred, a transmission intensity corresponding to the SAR event, instead of a normal transmission intensity, even if the predicted cumulative SAR value at a future timepoint is equal to/less than the threshold cumulative value. The SAR event may refer to an event that by which the SAR that influences the user may be changed, such as the user's approach or contact, for example, and a different transmission intensity may be configured for each SAR event. As described above, if the cumulative SAR value predicted at a future timepoint is equal to/less than the threshold cumulative value, the electronic device 101 may select a small value from a normal transmission intensity and a transmission intensity corresponding to a SAR event when the SAR event occurs. Moreover, if the cumulative SAR value predicted at a future timepoint exceeds the threshold cumulative value, the electronic device 101 may select a small value from a normal transmission intensity, a transmission intensity corresponding to a SAR event when the SAR event occurs, and backoff intensities following cumulative values, and this will be described in greater detail below.

Figure 5:
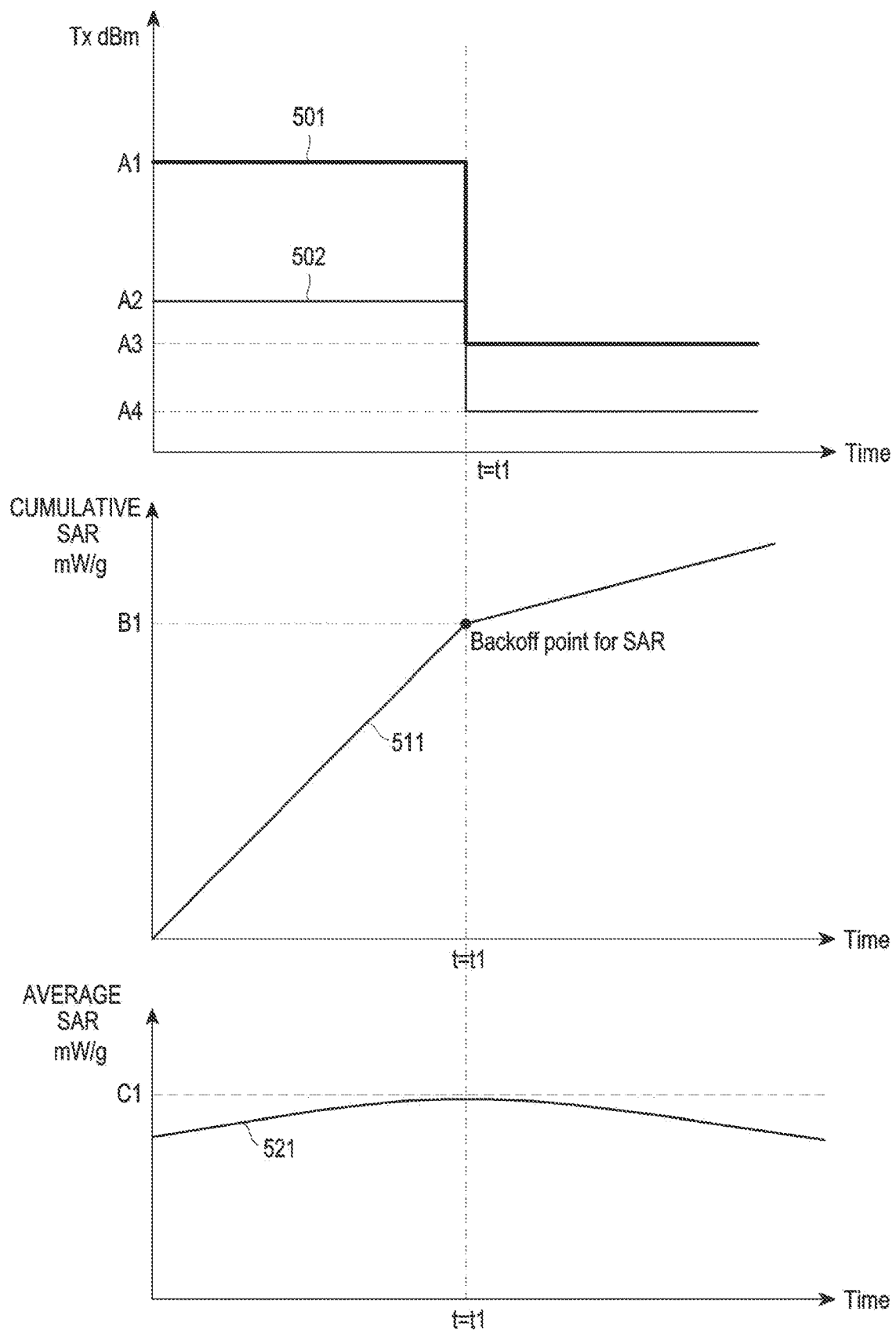
FIG. 5 is a diagram including graphs illustrating an example backoff process based on an cumulative SAR value according to various embodiments.

FIG. 5 is a diagram including graphs illustrating an example backoff process based on an cumulative SAR value according to various embodiments.

According to various embodiments, during a first time interval (t<t1), the electronic device 101 (for example, at least one of processor 120, first communication processor 212, second communication processor 214, or combined communication processor 260) may configure the transmission intensity 501 of first network communication (for example, LTE communication) to be A1, and may configure the transmission intensity 502 of second network communication (for example, NR communication) to be A2. The A1 and A2 may be, for example, transmission intensities that are not backed off, or if a SAR event has occurred, may be transmission intensities that are backed off so as to correspond to the occurred SAR event. During the first time interval (t<t1), the cumulative SAR 511 may increase to B1, and the average SAR 521 may also increase. If the current transmission intensities 501 and 502 are maintained at the timepoint of t1, for example, the electronic device 101 may identify that the average SAR 521 will exceed a threshold average value C1 at a future timepoint. Methods for determining whether the predicted average SAR exceeds the threshold average value will be described later. Alternatively, the electronic device 101 may be configured to determine whether a predicted cumulative SAR during a designated period at a future timepoint exceeds a threshold cumulative value.

According to various embodiments, if it is identified that the average SAR 521 exceeds the threshold average value, the electronic device 101 may back off the transmission intensity 501 of the first network to A3 during the second time interval (t≥t1), and may back off the transmission intensity 502 of the second network to A4. It may be identified that, as a result of the backoff, the rate of increase of the cumulative SAR 511 in the second time interval (t≥t1) has decreased compared with the rate of increase of the cumulative SAR 511 in the first time interval (t<t1). It may also be identified that the average SAR 521 decreases during the second time interval (t≥t1) as a result of the backoff. Although not illustrated, even if the electronic device 101 increases the backed-off intensities again, the average SAR at a future timepoint may be maintained to be equal to/less than a threshold average value. In this case, the electronic device 101 may increase the transmission intensities A3 and A4 back to A1 and A2. As described above, the average SAR 521 may be maintained to be equal to/less than a threshold average value C.

Although FIG. 5 illustrates a configuration in which the transmission intensity 501 of the first network communication and the transmission intensity 502 of the second network communication are substantially simultaneously backed off, this is simply an example, and the electronic device 101 according to various embodiments may preferentially back off the transmission intensity of specific network communication, and this will now be described in greater detail below with reference to FIG. 6A and FIG. 6B.

Figure 6A:
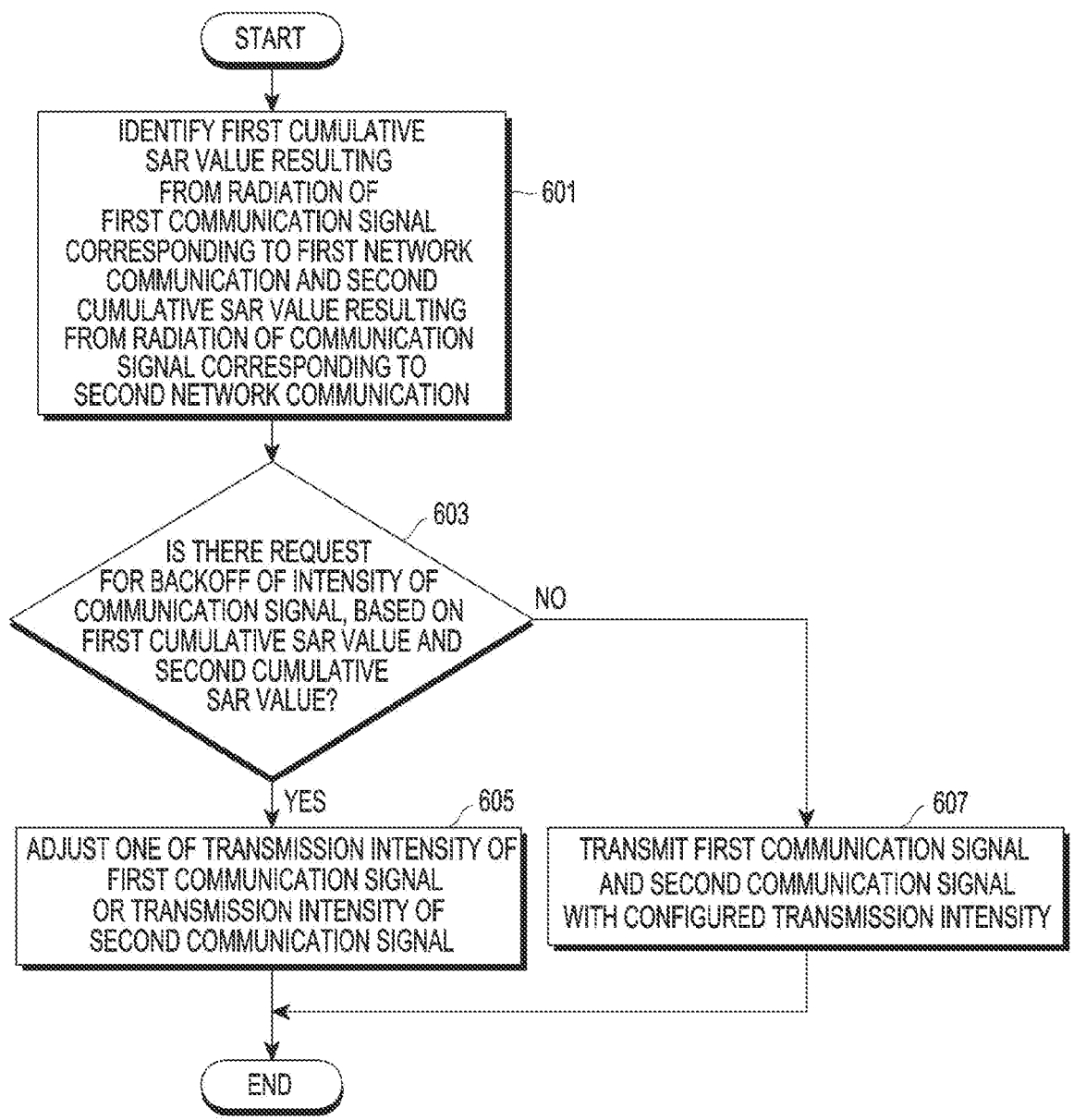
FIG. 6A is a flowchart illustrating an example method for operating an electronic device according to various embodiments.

FIG. 6A is a flowchart illustrating an example method for operating an electronic device according to various embodiments. Descriptions of operations in FIG. 6A, which have already been described with reference to FIG. 4, may be made briefly.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 601. The electronic device 101 may identify whether a backoff of the transmission intensity of a communication signal is required, based on the first cumulative SAR value and the second cumulative SAR value, in operation 603. For example, the electronic device 101 may identify whether a backoff is requested, according to whether it is predicted that the average SAR will exceed the threshold average value at least one future timepoint. The electronic device 101 may identify whether a backoff is requested, according to whether it is predicted that the cumulative SAR will exceed the threshold cumulative value during a designated time period at least one future timepoint.

According to various embodiments, if it is identified that a backoff is requested (Yes in operation 603), the electronic device 101 may adjust one of the transmission intensity of the first communication signal or the transmission intensity of the second communication signal in operation 605. In an embodiment, the electronic device 101 may perform a backoff first with regard to one of the two types of network communication according to a designated priority. For example, the electronic device 101 may be configured to first back off NR communication in an EN-DC environment for LTE communication and NR communication. Configuration of a priority for each type of network communication is simply an example, the priority is not limited, and various priorities will be described later. If it is identified that no backoff is requested (No in operation 603), the electronic device 101 may transmit a first communication signal and a second communication signal with the configured transmission intensity in operation 607. For example, the electronic device 101 may transmit communication signals with a normal communication signal intensity. Alternatively, the electronic device 101 may transmit communication signals with a transmission intensity which is not backed off by an average SAR, but which is backed off by temporary occurrence of a SAR event.

Figure 6B:
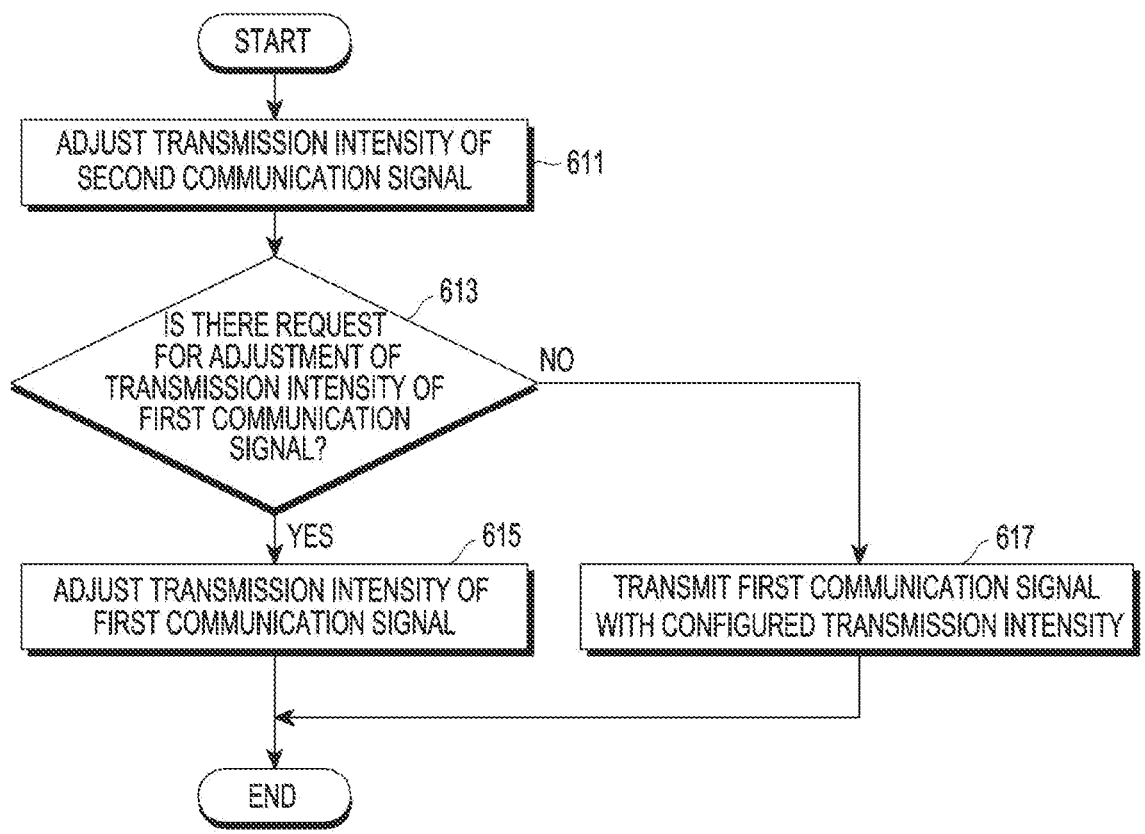
FIG. 6B is a flowchart illustrating an example method for operating an electronic device according to various embodiments.

FIG. 6B is a flowchart illustrating an example method for operating an electronic device according to various embodiments. The operations in FIG. 6B may be performed by the electronic device 101, for example, when it is determined to adjust the second communication signal, from among the first communication signal and the second communication signal, in FIG. 6A.

According to various embodiments, the electronic device 101 (for example, at least one of processor 120, first communication processor 212, second communication processor 214, or combined communication processor 260) may adjust (for example, back off) the transmission intensity of the second communication signal in operation 611. For example, the electronic device 101 may be configured to back off the transmission intensity of the second communication signal preferentially, compared with the transmission intensity of the first communication signal. If it is identified in operation 603 in FIG. 6A that there is a request for a backoff of the intensity of a communication signal, the electronic device 101 may preferentially back off the transmission intensity of the second communication signal according to the priority. In operation 613, the electronic device 101 may determine whether the transmission intensity of the first communication signal is adjusted. While transmitting the second communication signal with a backed-off transmission intensity, the electronic device 101 may transmit the first communication signal with a normal transmission intensity that is not backed off. The electronic device 101 may determine whether to back off the transmission intensity of the first communication signal additionally. For example, when transmitting communication signals with the above-mentioned transmission intensity, the electronic device 101 may identify whether there is a request for a backoff regarding the first communication signal, according to whether it is predicted that the average SAR will exceed the threshold average value at least one future time. The electronic device 101 may identify whether there is a request for a backoff regarding the first communication signal, according to whether it is predicted that the cumulative SAR during a designated time period at least one future timepoint will exceed the threshold cumulative value. If it is identified that there is a request for adjustment of the transmission intensity of the first communication signal (Yes in operation 613), the electronic device 101 may adjust (for example, back off) the transmission intensity of the first communication signal in operation 615. If it is identified that there is no request for adjustment of the transmission intensity of the first communication signal (No in operation 613), the electronic device 101 may transmit a first communication signal with a configured transmission intensity (for example, normal transmission intensity that is not backed off) in operation 617. Although not illustrated, the electronic device 101 may identify whether the backoff of the second communication signal is released. If it is identified that the backoff of the second communication signal will be released, the electronic device 101 may determine that the transmission intensity of the second communication signal is a normal transmission intensity that is not backed off.

According to various embodiments, the electronic device 101 may determine whether to conduct a backoff in view of not only the SAR, but also the power density (PD). For example, the electronic device 101 may determine to back off the transmission intensity if it is predicted that the sum of the ratio of the cumulative SAR against the threshold SAR value and the ratio of the cumulative PD against the threshold PD value will exceed 1. The configuration regarding the threshold PD value or the cumulative PD may be substantially identical to the corresponding configuration of the SAR.

Figure 7:
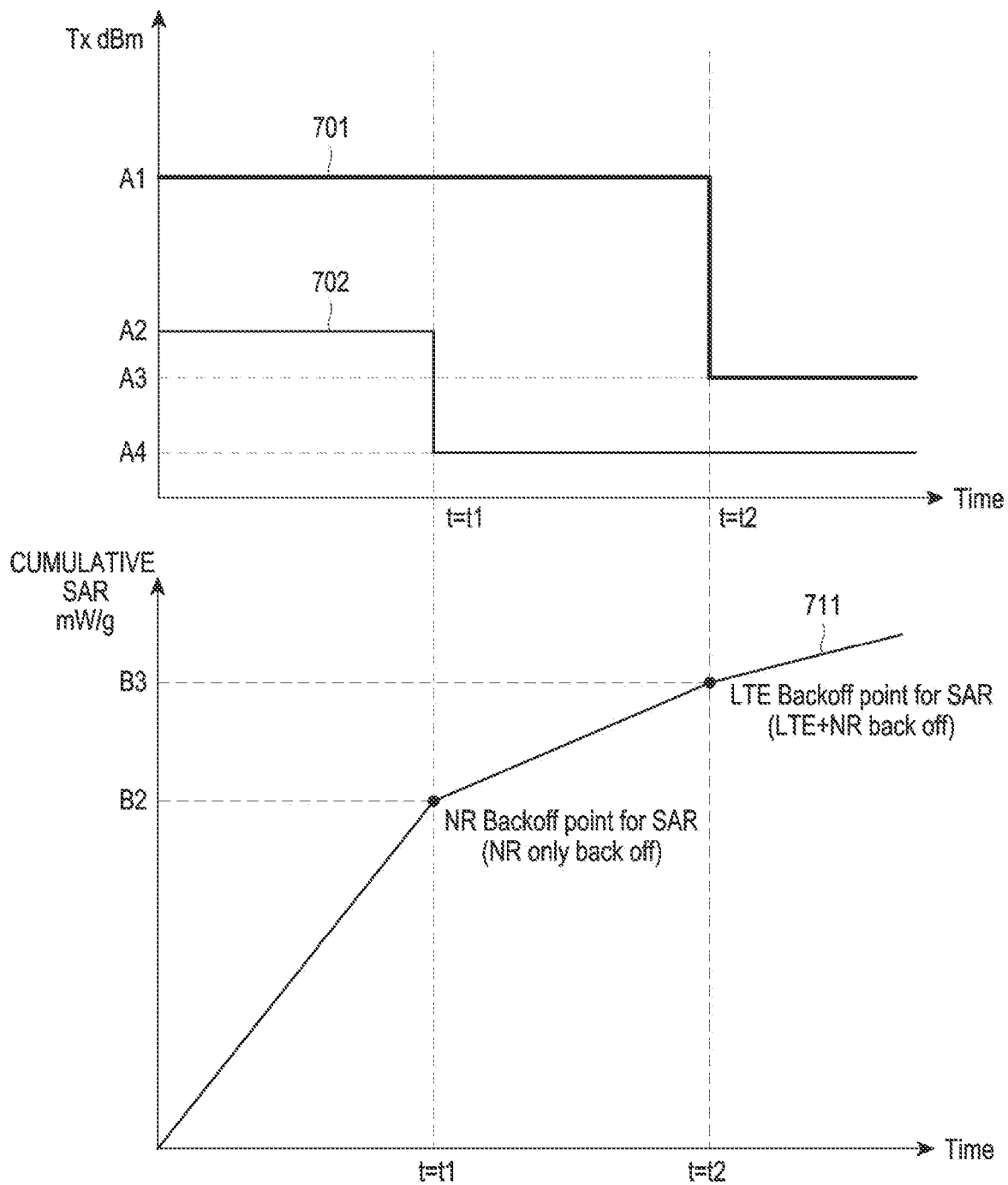
FIG. 7 is a diagram including graphs illustrating an example backoff process based on an cumulative SAR value according to various embodiments.

FIG. 7 is a diagram including graphs illustrating an example backoff process based on an cumulative SAR value according to various embodiments.

According to various embodiments, during the first time interval (t<t1), the electronic device 101 (for example, at least one of processor 120, first communication processor 212, second communication processor 214, or combined communication processor 260) may configure the transmission intensity 701 of first network communication (for example, LTE communication) to be A1 and may configure the transmission intensity 702 of second network communication (for example, NR communication) to be A2. The relative size between the values of A1 and A2 in the diagram is an example, and A1 and A2 may have the same absolute value. It may be identified that the cumulative SAR 711 increases to B2 with a first rate of increase during the first time interval (t<t1). The electronic device 101 may identify that a backoff is requested at the first timepoint t1. The electronic device 101 may preferentially back off the transmission intensity 702 of the second network communication (for example, NR communication) to A4, based on identifying that a backoff is requested. It may be identified that the cumulative SAR 711 accordingly increases to B3 with a second rate of increase during the second time interval (t1≤t≤t2). The electronic device 101 may again identify that a backoff is requested at the second timepoint t2. The electronic device 101 may back off the transmission intensity 701 of the first network communication (for example, LTE communication) to A3 at the second timepoint t2. It may be identified that the cumulative SAR 711 accordingly increases with a third rate of increase during the third time interval (t2≤t). As described above, the transmission intensity of the second network communication (for example, NR communication) is first backed off, thereby making it possible to operate a relatively large intensity of the communication signal for communication with the master node, which is in charge of both the control plane and the user plane.

According to various embodiments, the electronic device 101 may back off the transmission intensity 702 of the second network communication during the second time interval (t1≤t≤t2), for example, and may configure the transmission intensity 701 of the first network communication to have a larger value than A1. In this case, the cumulative SAR 711 may increase at a rate of increase different from the second rate of increase in FIG. 7, and the cumulative SAR 711 may increase, for example, at a first rate of increase or at a rate of increase smaller than the first rate of increase. If the first rate of increase is maintained, the additional LTE communication backoff timepoint may be advanced.

Figure 8A:
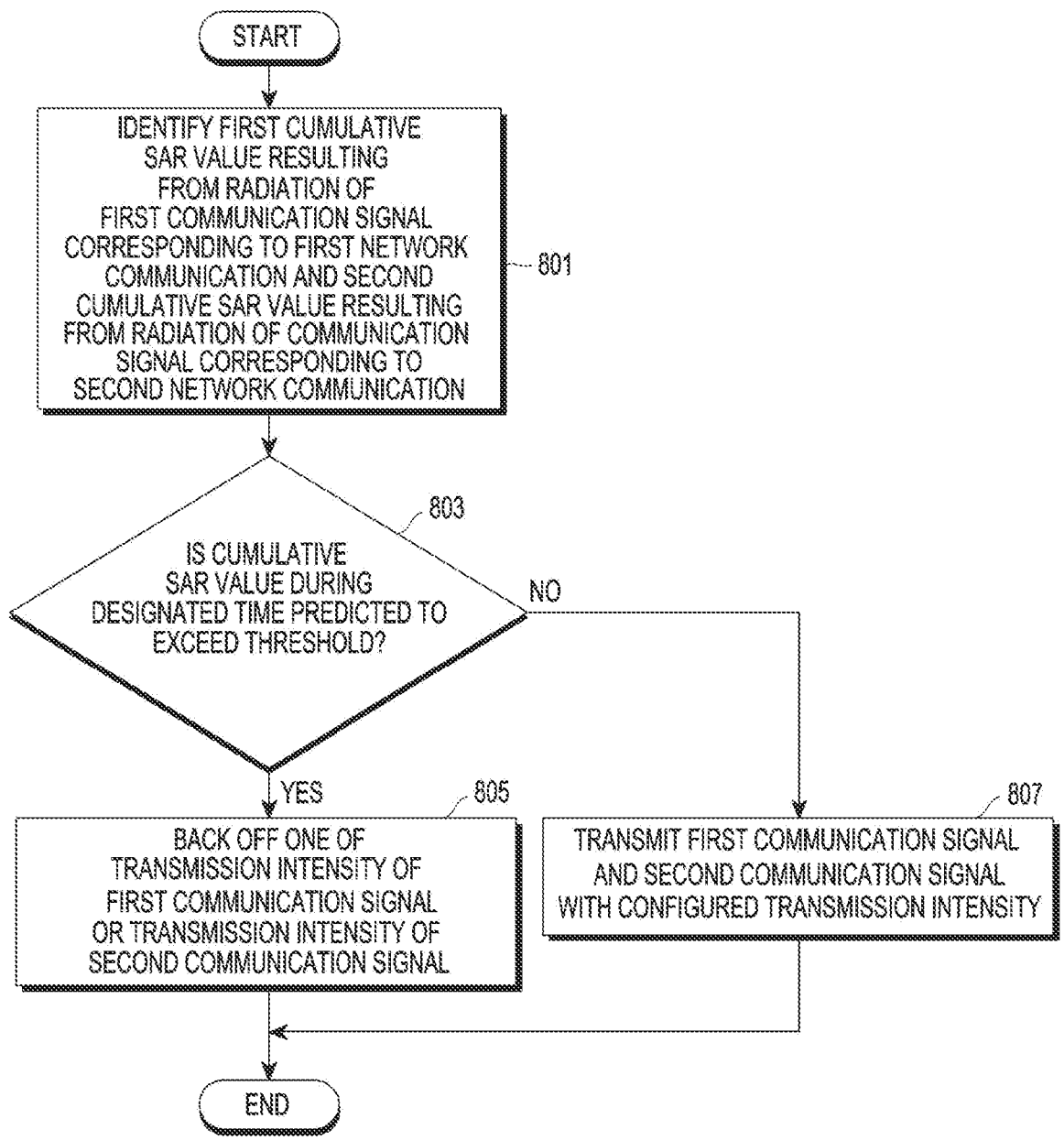
FIG. 8A is a flowchart illustrating an example method for operating an electronic device according to various embodiments.

FIG. 8A is a flowchart illustrating an example method for operating an electronic device according to various embodiments. Descriptions of operations in FIG. 8A, which have already been described, may be made briefly.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 801. The electronic device 101 may identify in operation 803 whether it is predicted that the cumulative SAR value during a designated time will exceed the threshold cumulative value. For example, the electronic device 101 may identify whether it is predicted that the cumulative SAR value during a designated time will exceed the threshold cumulative value, based on a SAR at least one past timepoint. There is no restriction on the manner in which the electronic device 101 identifies whether the cumulative SAR value exceeds the threshold cumulative value. For example, the electronic device 101 may identify whether the threshold is exceeded using a preconfigured mathematical formula, or with reference to individual calculations regarding multiple future timepoints. If it is identified that the cumulative SAR value during a designated time exceeds the threshold cumulative value (Yes in operation 803), the electronic device 101 may back off one of the transmission intensity of the first communication signal or the transmission intensity of the second communication signal in operation 805. If it is identified that the cumulative SAR value during the designated time does not exceed the threshold cumulative value (No in operation 803), the electronic device 101 may transmit the first communication signal and the second communication signal with a configured transmission intensity in operation 807.

Figure 8B:
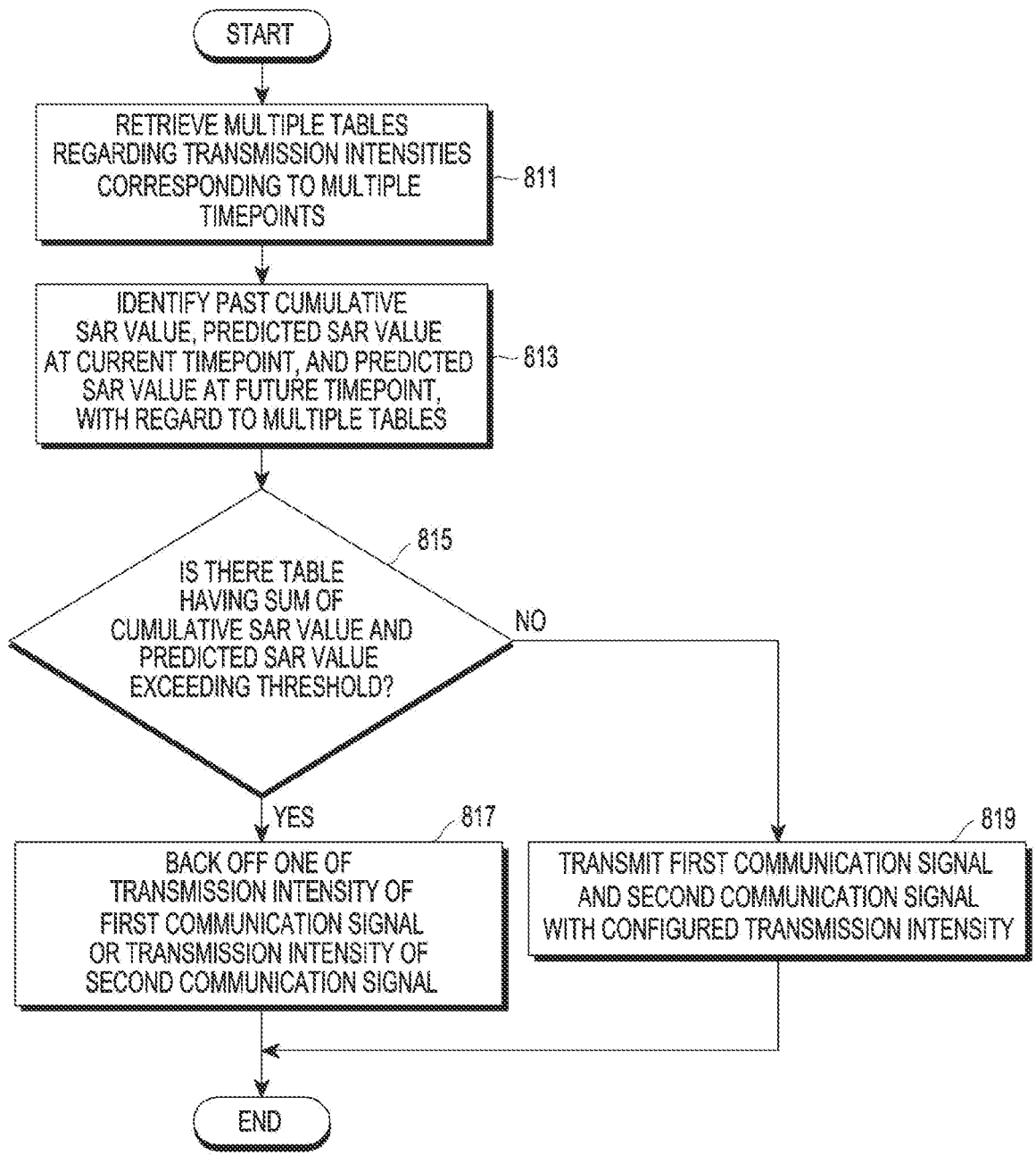
FIG. 8B is a flowchart illustrating an example method for operating an electronic device according to various embodiments.
Figure 9A:
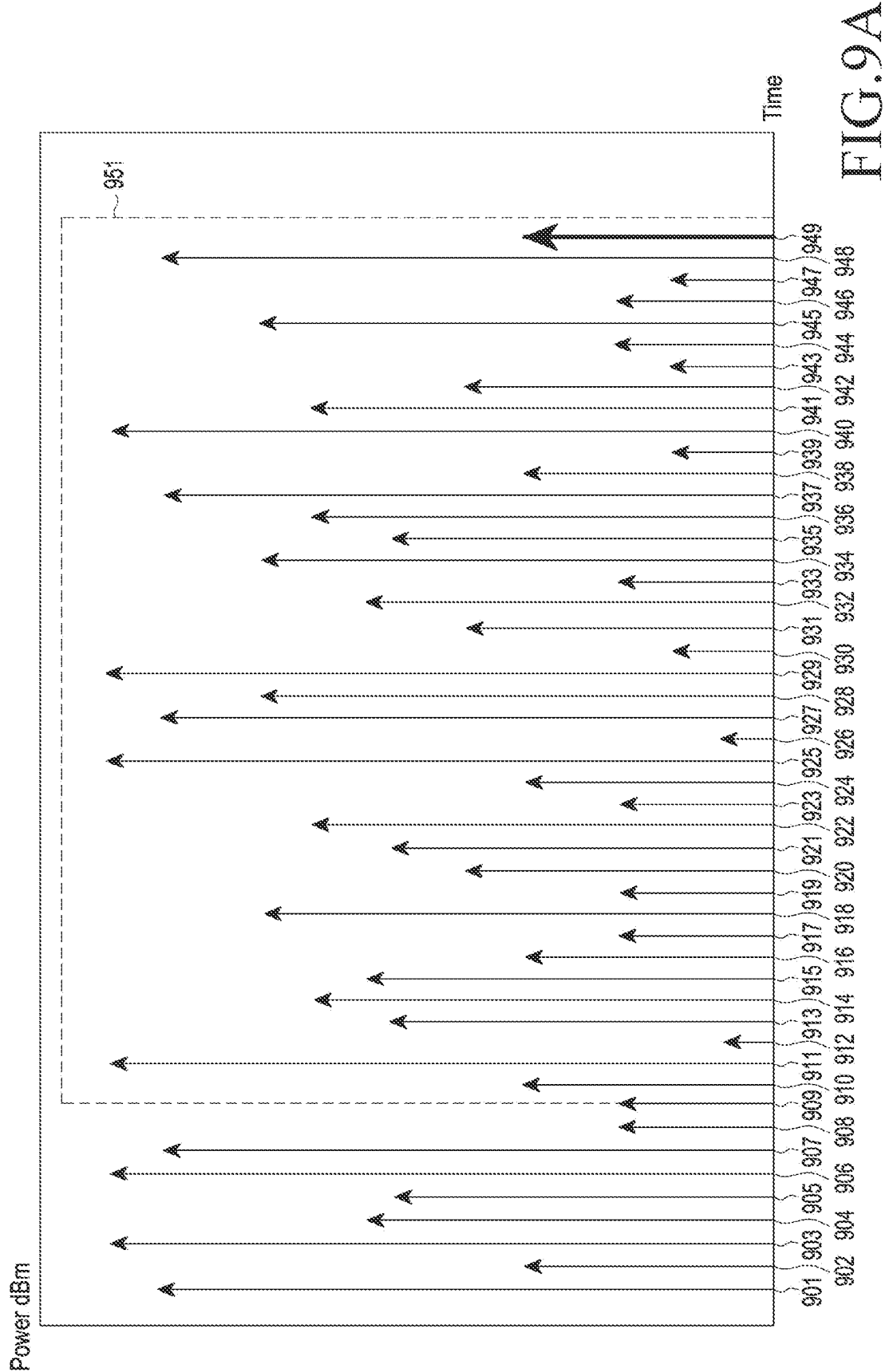
FIG. 9A is a graph illustrating example time-specific transmission intensities according to various embodiments.
Figure 9B:
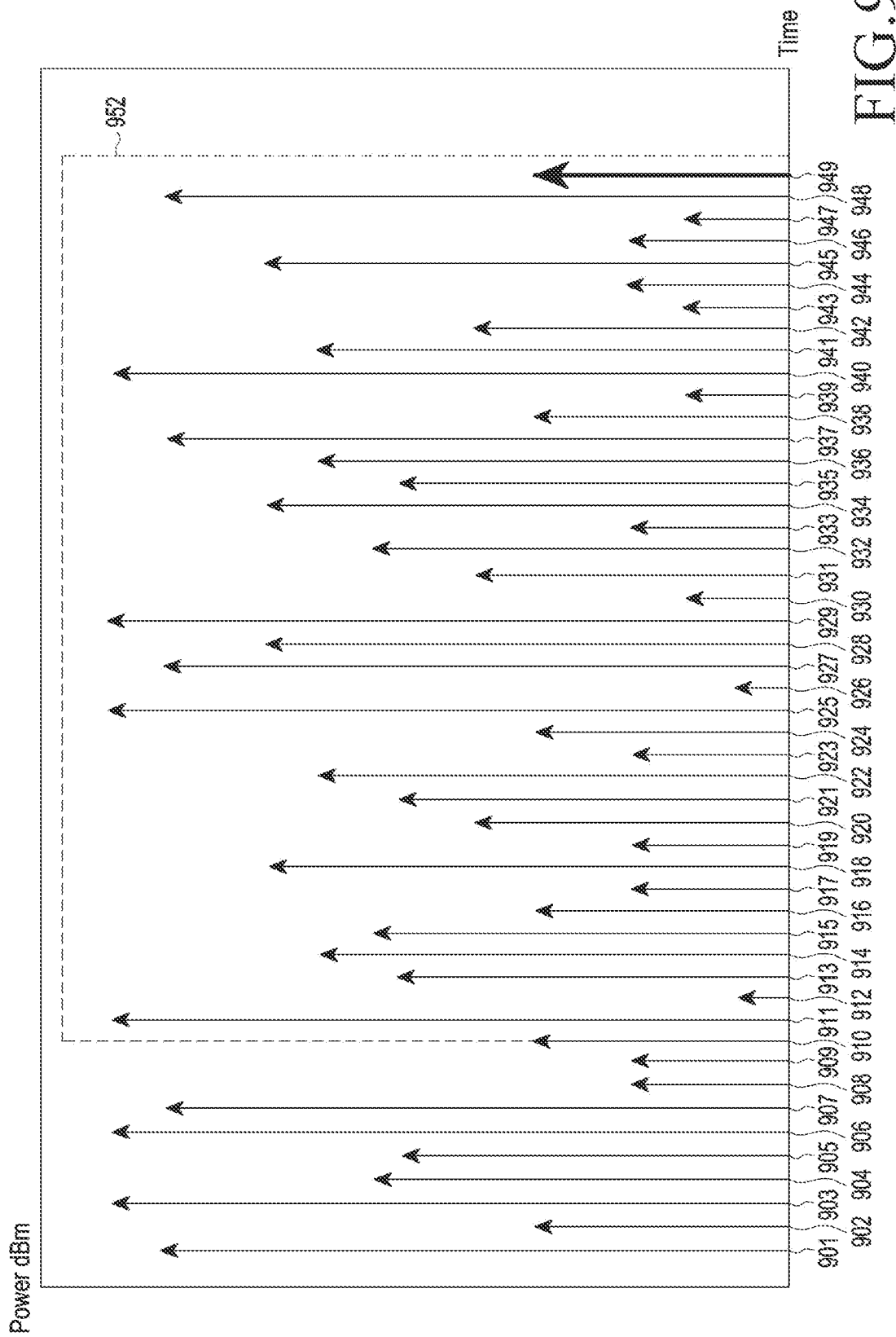
FIG. 9B is a graph illustrating example time-specific transmission intensities according to various embodiments.
Figure 9C:
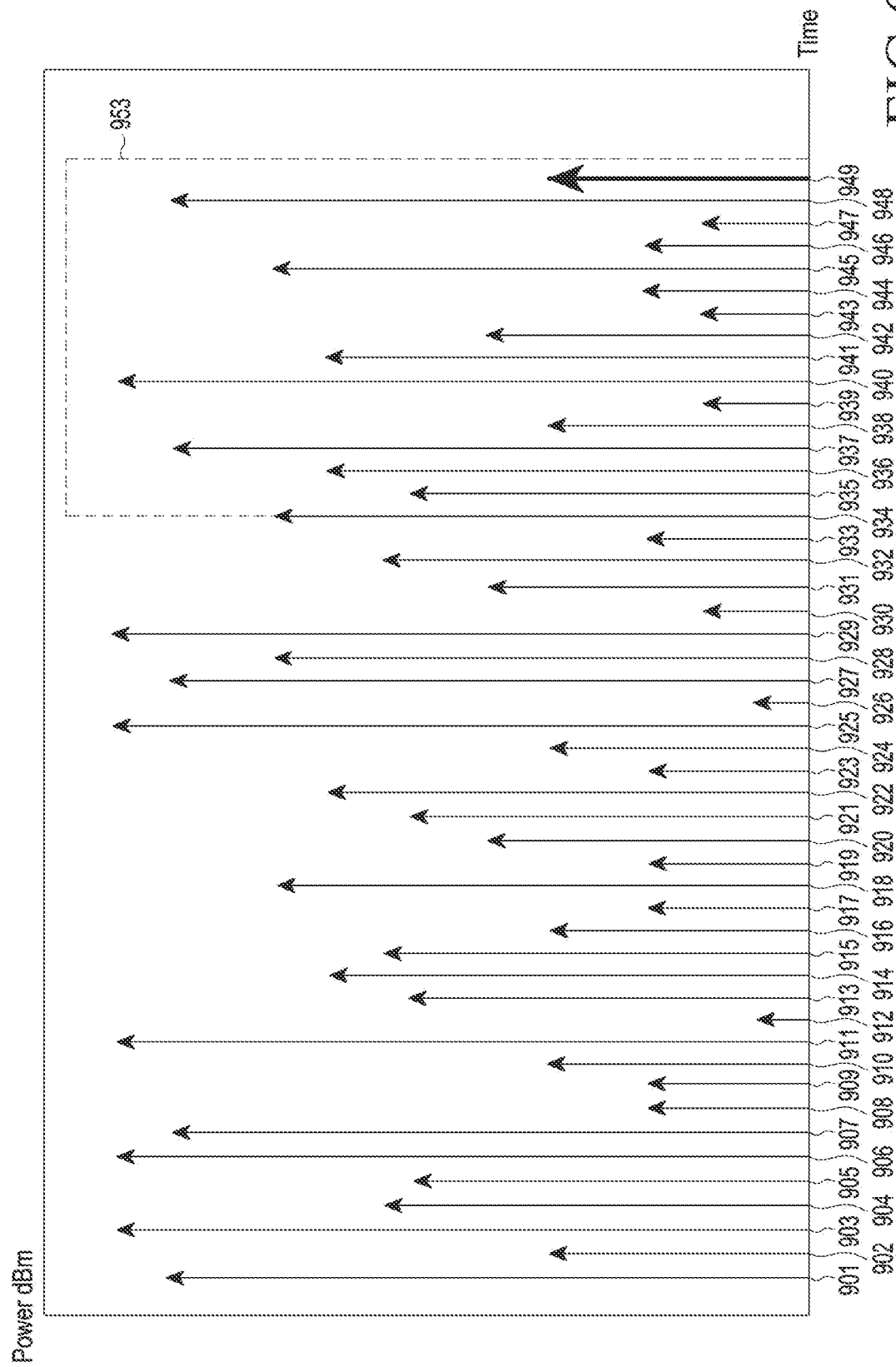
FIG. 9C is a graph illustrating example time-specific transmission intensities according to various embodiments.
Figure 9D:
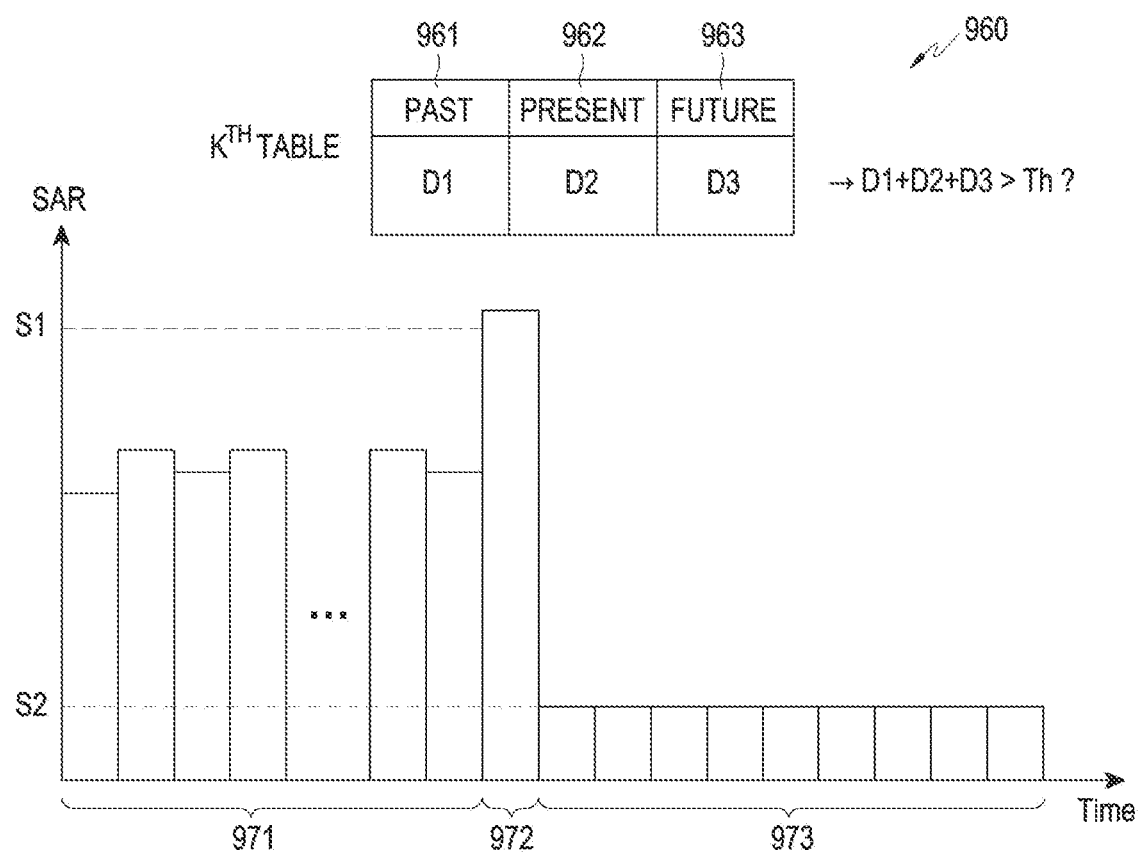
FIG. 9D is a table and graph illustrating example time-specific transmission intensities according to various embodiments.
Figure 9E:
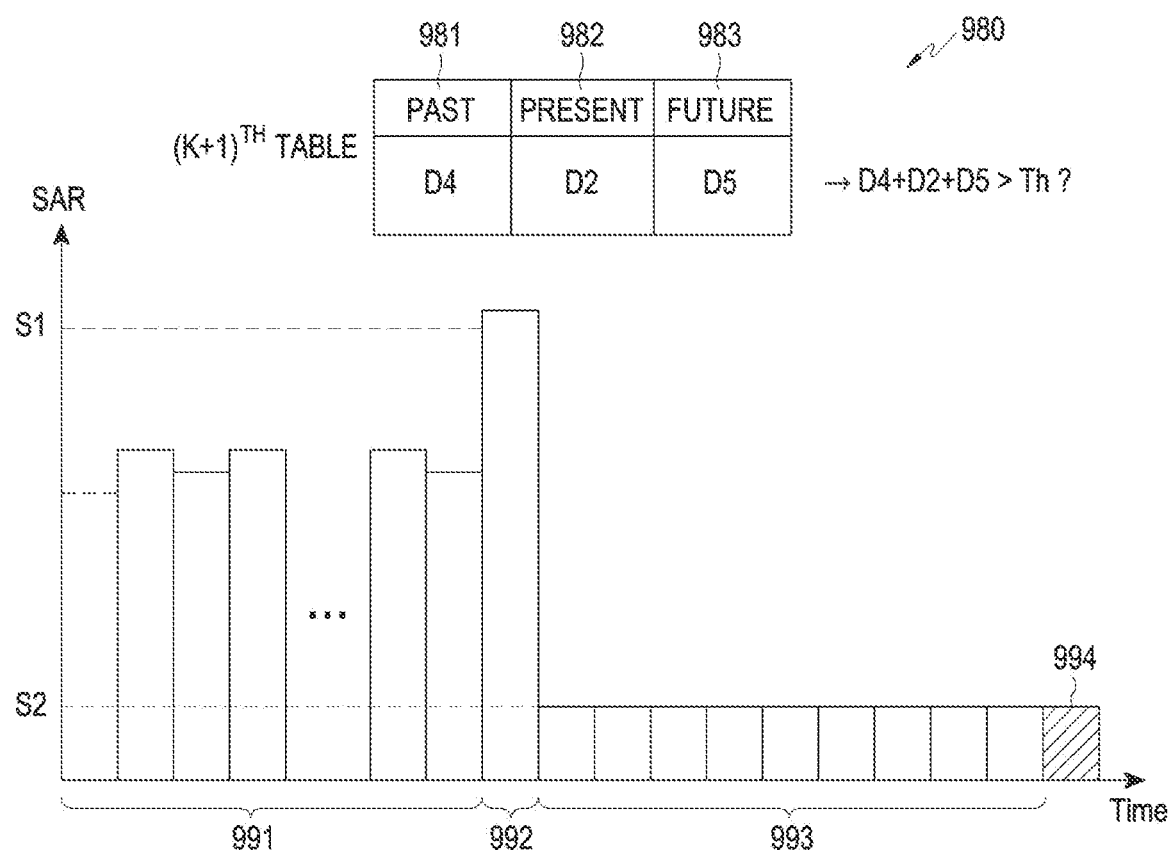
FIG. 9E is a table an graph illustrating example time-specific transmission intensities according to various embodiments.

FIG. 8B is a flowchart illustrating an example method for operating an electronic device according to various embodiments. The embodiment in FIG. 8B will be described with reference to FIG. 9A, 9B, 9C, 9D and FIG. 9E. FIG. 9A is a graph illustrating example time-specific transmission intensities according to various embodiments, FIG. 9B is a graph illustrating example time-specific transmission intensities according to various embodiments, and FIG. 9C is a graph illustrating example time-specific transmission intensities according to various embodiments. FIG. 9D is a diagram including a graph and a table illustrating example time-specific transmission intensities according to various embodiments, and FIG. 9E is a diagram including a graph and a table illustrating example time-specific transmission intensities according to various embodiments. Descriptions of operations in FIG. 8B, which have already been described, may be made briefly.

According to various embodiments, the electronic device 101 (for example, at least one of processor 120, first communication processor 212, second communication processor 214, or combined communication processor 260) may retrieve multiple tables regarding transmission intensities corresponding to multiple timepoints in operation 811. Tables will be described first with reference to FIG. 9A, 9B and FIG. 9C. FIG. 9A illustrates a graph including transmission intensities regarding multiple timepoints 901 to 949. An cumulative SAR during a designated time period, for example, a time period including 50 timepoints, may need to maintain a value equal to/less than a threshold cumulative value. The electronic device 101 may determine the transmission intensity of a communication signal to be transmitted at the current timepoint 949 such that the sum of SARs at the current timepoint 949, at specific past timepoints 909 to 948, and at nine additional future timepoints (not illustrated), for example, maintain a value equal to/less than a threshold cumulative value. Moreover, the electronic device 101 may identify transmission intensities 952, the timepoints of which are shifted by 1 compared with the transmission intensities 951 at the current timepoint 949 and at specific past timepoints 909 to 948, as in FIG. 9B. The description that the timepoints are shifted by 1 may refer, for example, to data at the timepoint corresponding to the most distant past (for example, timepoint 909 in FIG. 9A) not being reflected. The number of transmission intensities 952 at the current timepoint 949 and at specific past timepoints 909 to 948 is 40, which may be smaller by one than the number (41) of transmission intensities 951 in FIG. 9A. The electronic device 101 may determine the transmission intensity at the current timepoint 949 such that the sum of SARs resulting from the transmission intensities 952 and SARs predicted at ten additional future timepoints maintain a value equal to/less than a threshold cumulative value. As in FIG. 9C, the electronic device 101 may identify transmission intensities 953, the timepoints of which are shifted by 25 compared with the transmission intensities 951. The number of transmission intensities 953 at the current timepoint 949 and at specific past timepoints 934 to 948 is 16, which may be smaller by 25 than the number (41) of transmission intensities 951 in FIG. 9A. The electronic device 101 may determine the transmission intensity at the current timepoint 949 such that the sum of SARs resulting from the transmission intensities 952 and SARs predicted at 34 additional future timepoints maintain a value equal to/less than a threshold cumulative value. Although not illustrated, the electronic device 101 may manage multiple graphs, each of which is shifted by one timepoint. Hereinafter, a configuration for identifying a predicted SAR value will be described in greater detail below with reference to FIG. 9D and FIG. 9E.

Referring to FIG. 9D, the electronic device 101 may identify a $k^{th}$ SAR table 960. The $k^{th}$ SAR table 960 may include an cumulative SAR value 961 (D1) at least one past timepoint, the maximum SAR value 962 (D2) at the current timepoint, and a predicted SAR value 963 (D3) at least one future timepoint. Referring to the graph, the cumulative SAR value corresponding to at least one past timepoint 971 may be D1. The number of at least one past timepoint may be, in the case of the first table, smaller by one than the number of total timepoints (for example, 100) corresponding to the entire time period (for example, 50 seconds). The entire number of timepoints (for example, 100), N, may be obtained by dividing the entire time period by the sampling interval (or shift interval). Accordingly, in the case of the $k^{th}$ table, the number of at least one past timepoint may be smaller than the entire number of timepoints by k. The electronic device 101 may identify an cumulative SAR value (D1) at (N-k) past timepoints 971. The electronic device 101 may use the maximum SAR value (S1) for the current timepoint 972. The maximum SAR value (S1) may be a SAR value corresponding to the maximum transmission intensity (maximum instantaneous power) designated by the electronic device 101. In another embodiment, the SAR value immediately before the current timepoint 972 may be used for the current timepoint 972. In another embodiment, the average SAR value of past timepoints 971 of the current timepoint 972 may be used for the current timepoint 972. With regard to at least one future timepoint 973, the electronic device 101 may calculate the sum of SAR values (S2) regarding backed-off transmission intensities. The electronic device 101 may identify D3 as the sum of SARs regarding at least one future timepoint 973. In the case of the $k^{th}$ table, the number of at least one future timepoint may be k-1. Accordingly, in the case of the $k^{th}$ table, the electronic device 101 may identify whether the total sum of SARs (D1+D2+D3) regarding N timepoints including (N-k) past timepoints, one current timepoint, and (k-1) future timepoints exceeds a threshold cumulative SAR value (Th). If it is identified that the threshold is exceeded, the electronic device 101 may back off the transmission intensity at the current timepoint. Referring to FIG. 9E, the electronic device 101 may identify the $(k+1)^{th}$ table 980 as well. The electronic device 101 may identify, in the case of $(k+1)^{th}$ table 980, the cumulative SAR value 981 (D4) at least one past timepoint 991, the maximum SAR value 982 (D2) at the current timepoint 992, and the predicted SAR value 983 (D5) at least one future timepoint 993. The electronic device 101 may identify whether the cumulative SAR value of D4+D2+D5 exceeds the threshold cumulative value (Th). In the case of the $(k+1)^{th}$ table, the number of at least one past timepoint 991 may be smaller by one than the number of at least one past time point 971 in the case of the $k^{th}$ table. In the case of the $(k+1)^{th}$ table, the number of at least one future timepoint 993 may be larger by one (994) than the number of at least one future time point 973 in the case of the $k^{th}$ table.

According to various embodiments, in operation 813, the electronic device 101 may identify, with regard to multiple tables corresponding to at least one future timepoint, a past cumulative SAR value, a predicted SAR value at the current timepoint, and a predicted SAR value at a future timepoint. The electronic device 101 may identify an cumulative SAR value with regard to the first table and a total of (N-1) tables that are shifted from the first table by i timepoints (i is equal to/larger than 1 and less than N-2). In operation 815, the electronic device 101 may identify whether there exists a table having the sum of the cumulative SAR value and the predicted SAR value exceeding a threshold. If there is a table having a sum exceeding the threshold (Yes in operation 815), the electronic device 101 may back off one of the transmission intensity of the first communication signal or the transmission intensity of the second communication signal in operation 817. If there is no table having a sum exceeding the threshold (No in operation 815), the electronic device 101 may transmit the first communication signal and the second communication signal with a designated (e.g. configured) transmission intensity in operation 819.

Table 1 below gives examples of parameters and procedures for determining whether to conduct a table-based backoff according to various embodiments:

TABLE 1

| | |
|---|---|
| Parameter | i. Measurement Time (T): 50 sec. [description: time for averaging SARs] |
| | ii. Measurement Period (P): 0.5 sec. [description: period for calculating SARs] |
| | iii. Number of calculator tables: 99 [description: having (T/P-1) calculator tables] |
| | iv. SAR LIMIT: 80 mW/g [description: maximum SAR value not to be exceeded during T sec.] |
| | v. LTE Max power: 23 dBm [description: maximum value of normal transmission intensity of LTE] (changeable depending on SAR event) |
| | vi. Amount of use of LTE Max Power SAR: 1 mW/g*sec [description: amount of use of SAR when maximum value of normal transmission intensity of LTE is applied] (changeable depending on SAR event) |
| | vii. LTE SAR backoff power: 22.5 dBM [description: maximum value of backed off transmission intensity of LTE] (changeable depending on SAR event) |
| | viii. Amount of use of LTE SAR backoff power SAR: 0.7 mW/g*sec [description: amount of use of SAR when maximum value of backed-off transmission intensity of LTE is applied] (changeable depending on SAR event) |
| | ix. NR Max power: 23 dBm [description: maximum value of normal transmission intensity of NR] (changeable depending on SAR event) |
| | x. Amount of use of NR Max power SAR: 1 mW/g * sec [description: amount of use of SAR when maximum value of normal transmission intensity of NR is applied] (changeable depending on SAR event) |
| | xi. NR SAR backoff power: 20 dBm [description: maximum value of backed-off transmission intensity of NR] (changeable depending on SAR event) |
| | xii. Amount of use of NR SAR backoff power SAR: 0.1 mW/g * sec [description: amount of use of SAR when maximum value of backed-off transmission intensity of NR is applied] (changeable depending on SAR event) |
| | xiii. Max SAR => maximum SAR value during 0.5 sec. = 1 mW/g (LTE max + NR max) * time) [description: amount of use of SAR occurring per unit time when transmission intensities of LTE/NR are both configured as maximum values] |
| | xiv. Max Backoff SAR => maximum SAR value when backing off during 1 sec. = 0.4 mW/g (LTE backoff max + NR backoff max) * time) [description; amount of use of SAR occurring per unit time when backing off both transmission intensities of LTE/NR] |
| | xv. Current SAR VALUE = amount of SAR cumulative to the present, held by each table |
| Determination Criterion | Current SAR VALUE + MAX SAR + (MAX BACKOFF SAR * (remaining time − P)/P) > SAR LIMIT |

As illustrated, for example, in Table 1, the electronic device 101 may identify whether the determination criterion is satisfied with regard to each of 99 calculator tables, for example. The "Current SAR VALUE" in the determination criterion may be an cumulative SAR value at past timepoints 971 in FIG. 9D, for example. The "MAX SAR" in the determination criterion may be the maximum SAR value at the current timepoint 972 in FIG. 9D, for example. The "(remaining time−P)/P" in the determination criterion may be the number of at least one future timepoint 973 in FIG. 9D, for example, and a value obtained by multiplying the corresponding value with "SAR(MAX BACKOFF SAR)", which corresponds to a backoff, may be the sum of predicted SARs at future timepoints 973. If there is a table satisfying the determination criterion, among the tables, the electronic device 101 may determine that the transmission intensify of a communication signal scheduled to be transmitted at the current timepoint is a backed-off value (for example, LTE SAR backoff power: 22.5 dBM or NR SAR backoff power: 20 dBM). Although it has been assumed in the description with reference to Table 1 that LTE communication and NR communication are simultaneously backed off, this is simply an example, and one type of communication may be backed off first according to the priority, as described above, and this will be described in greater detail below. The threshold cumulative value (SAR LIMIT) in Table 1 may be configured differently for each table, and may be configured identically in another example.

Figure 10:
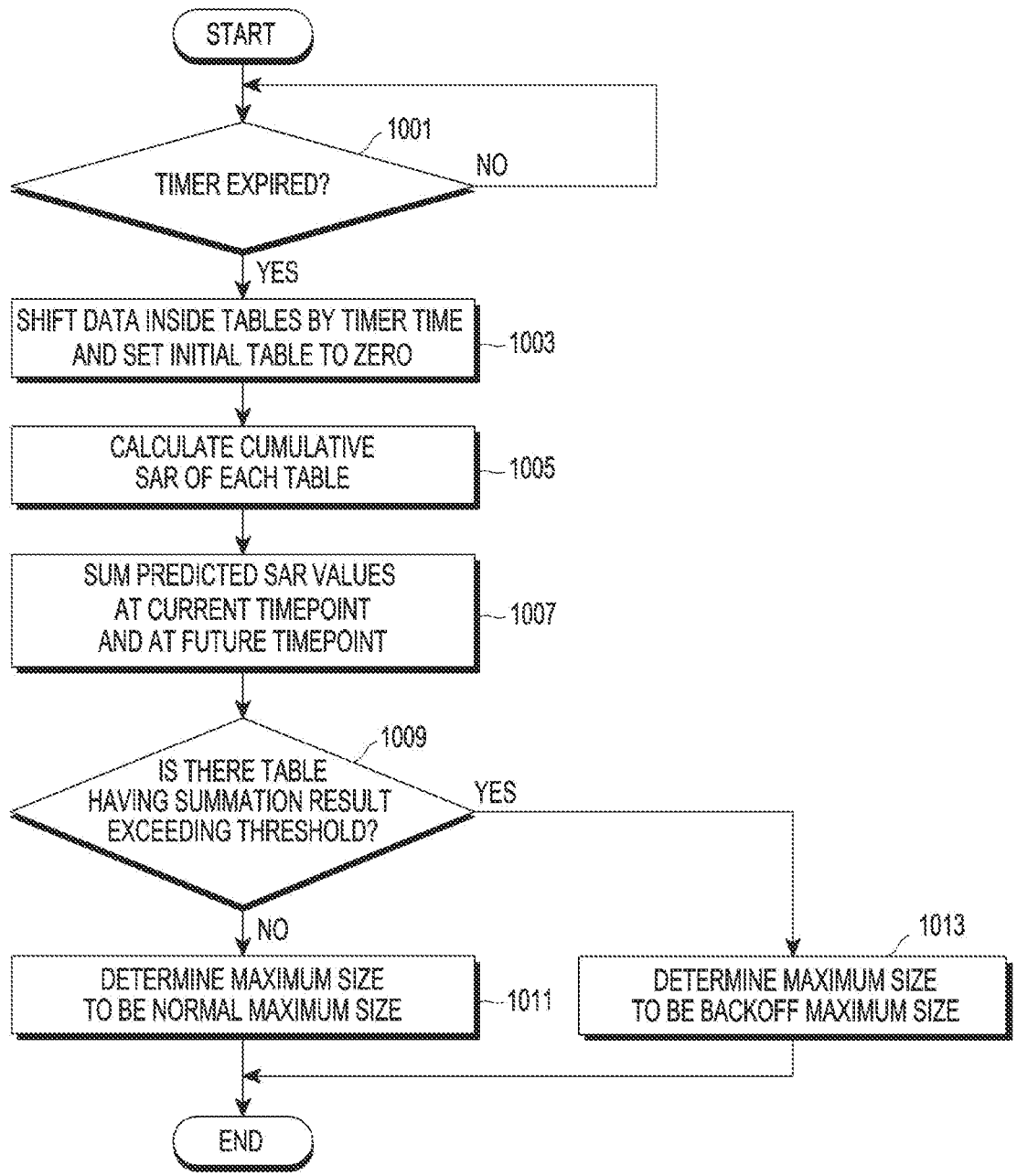
FIG. 10 is a flowchart illustrating example operations of updating a table and identifying whether a determination criterion in the table is satisfied, according to various embodiments.

FIG. 10 is a flowchart illustrating example operations of updating a table and determining whether a determination criterion in the table is satisfied, according to various embodiments.

According to various embodiments, the electronic device 101 (for example, at least one of processor 120, first communication processor 212, second communication processor 214, or combined communication processor 260) may identify whether a timer expires in operation 1001. For example, the timer may be configured for one unit time (for example, 0.5 second in Table 1). If it is identified that the timer has expired (Yes in operation 1001), the electronic device 101 may shift data within tables by the timer time and set the initial table to zero in operation 1003. For example, the electronic device 101 may shift each of 99 tables in Table 1 by the timer time (for example, 0.5 second), thereby updating 98 tables, and may set one (initial) table to zero. For example, the shift may set a table to zero, all times within the table being made up of past timepoints.

According to various embodiments, the electronic device 101 may identify cumulative SARs (for example, Current SAR VALUE in Table 1) of respective tables in operation 1005. In operation 1007, the electronic device 101 may sum a predicted SAR value at the current timepoint (for example, MAX SAR in Table 1) and a predicted SAR value at a future timepoint (for example, MAX Backoff SAR in Table 1) with regard to cumulative SARs of respective tables. In operation 1009, the electronic device 101 may identify whether there is a table, the summation result of which exceeds a threshold. If there is no table having a summation result exceeding the threshold (No in operation 1009), the electronic device 101 may determine in operation 1011 that the maximum size is a normal maximum size. For example, the electronic device 101 is not limited by the cumulative SAR value, and may use power necessary to transmit data with reference to predesignated maximum instantaneous power of the electronic device 101. If it is identified that there is a table having a summation result exceeding the threshold (Yes in operation 1009), the electronic device 101 may determine in operation 1013 that the maximum size is a backoff maximum size. The above-described operations may enable the electronic device 101 to identify whether to perform a backoff for each designated timer time. Table 2 below gives an example of tables according to various embodiments.

TABLE 2

| Table (sec) | MAX SAR | MAX BACKOFF SAR | Maximum use of SAR when backing off after P seconds | SAR LIMIT | Amount of cumulative SAR before MAX |
|---|---|---|---|---|---|
| 0.5 | 1 | 0.4 | 40.2 | 80 | 39.8 |
| 1.0 | 1 | 0.4 | 39.8 | 80 | 40.2 |
| 1.5 | 1 | 0.4 | 39.4 | 80 | 40.6 |
| 2.0 | 1 | 0.4 | 39.0 | 80 | 41.0 |
| 2.5 | 1 | 0.4 | 38.6 | 80 | 41.4 |
| 3.0 | 1 | 0.4 | 38.2 | 80 | 41.8 |
| ... | 1 | 0.4 | ... | 80 | ... |
| 47.0 | 1 | 0.4 | 3.0 | 80 | 77.0 |
| 47.5 | 1 | 0.4 | 2.6 | 80 | 77.4 |
| 48.0 | 1 | 0.4 | 2.2 | 80 | 77.8 |
| 48.5 | 1 | 0.4 | 1.8 | 80 | 78.2 |
| 49.0 | 1 | 0.4 | 1.4 | 80 | 78.6 |
| 49.5 | 1 | 0.4 | 1.0 | 80 | 79.0 |

Figure 11:
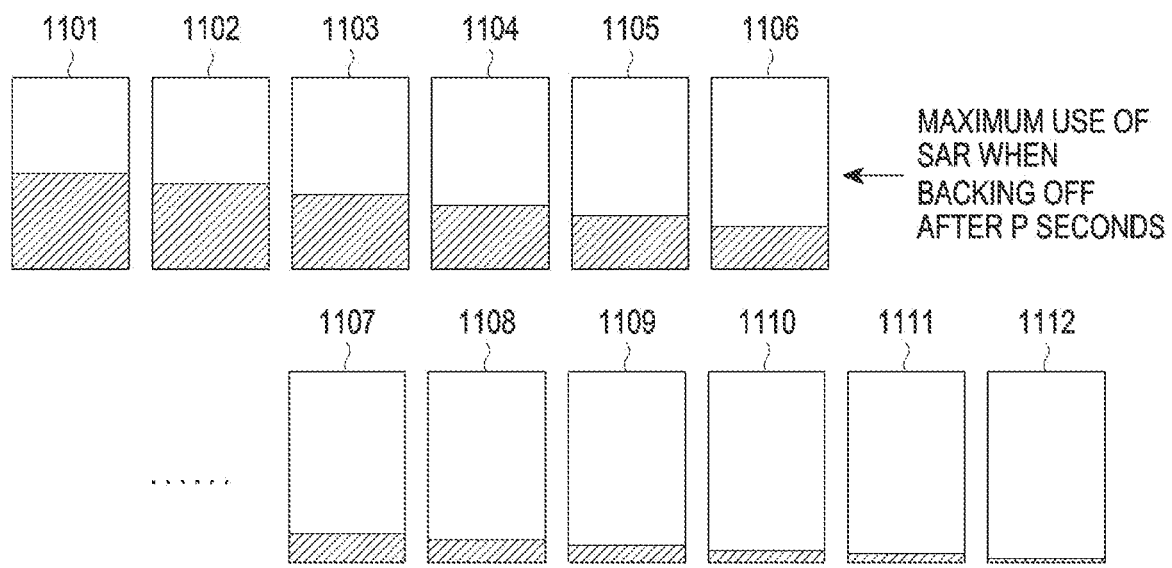
FIG. 11 is a diagram illustrating examples of the maximum use of SAR during a backoff with regard to each table.

The electronic device 101 may identically configure MAX SAR (for example, 1), MAX BACK OFF (for example, 0.4), and SAR LIMIT (for example, 80) with regard to 99 tables, as in Table 2, for example. Meanwhile, the maximum use of SAR when backing off after P seconds is based on a value obtained by multiplying the remaining time by MAX BACKOFF SAR (or a value obtained by taking an offset), for example, and may be a substantially fixed value. The maximum use of SAR when backing off after P seconds is illustrated in FIG. 11. For example, the first table 1101 in FIG. 11 may correspond to 0.5 second in Table 2, and the maximum use of SAR when backing off after P seconds may be 40.2. It is clear from FIG. 11 that the maximum use of SAR when backing off after P seconds decreases in the case of tables 1101, 1102, 1103, 1104, 1105, 1106, 1107, 1108, 1109, 1110, 1111 and 1112. Since the maximum use of SAR when backing off after P seconds is a substantially fixed value, and since MAX SAR and MAX BACKOFF SAR are fixed values, the electronic device 101 may determine whether to conduct a backoff by comparing the amount of cumulative SAR before MAX with the amount of cumulative SAR for each table. For example, if the previous amount of cumulative SAR of the table corresponding to 3.0 seconds exceeds 41.8, the electronic device 101 may determine to conduct a backoff.

Figure 12:
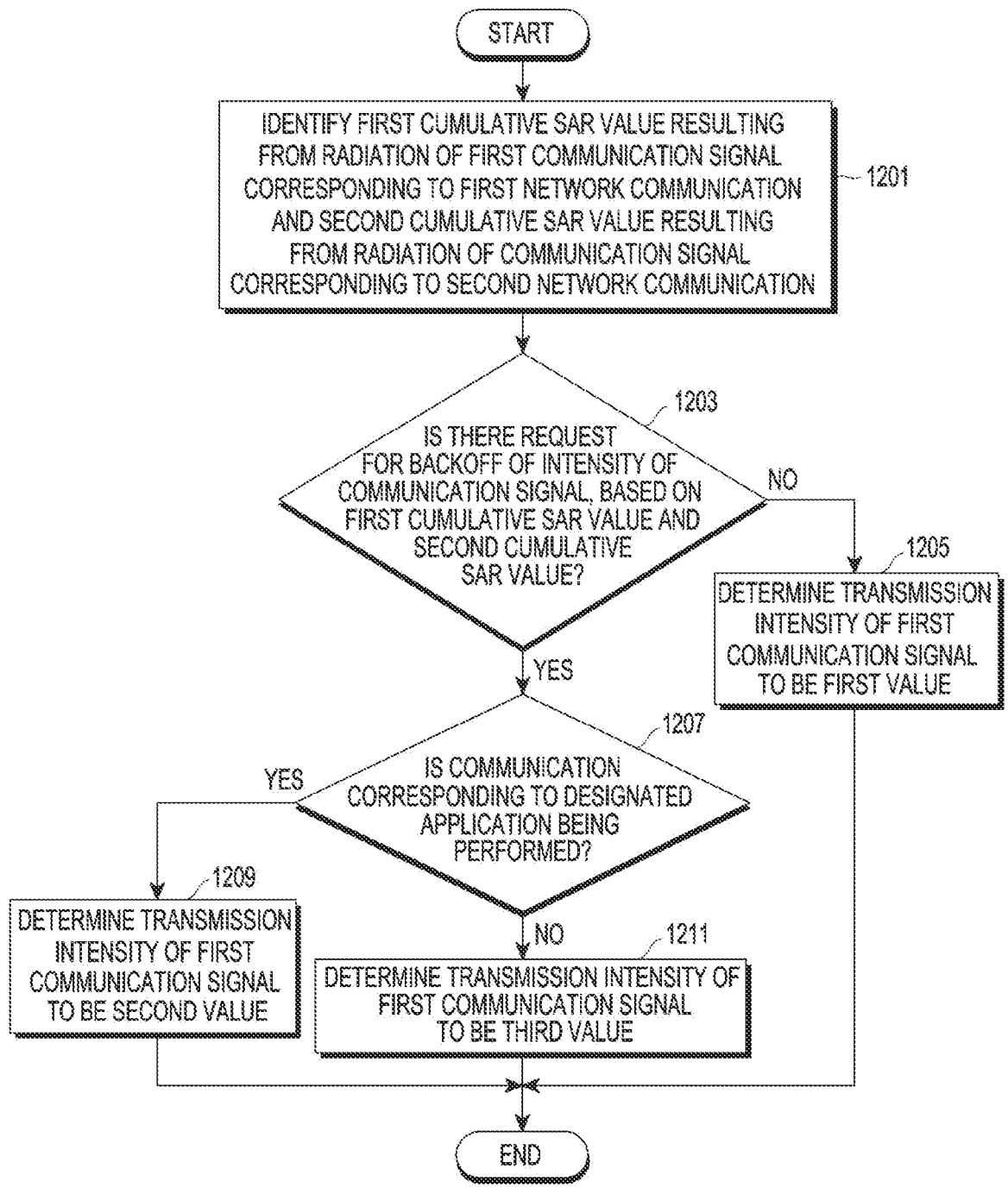
FIG. 12 is a flowchart illustrating an example method for operating an electronic device according to various embodiments.
Figure 13:
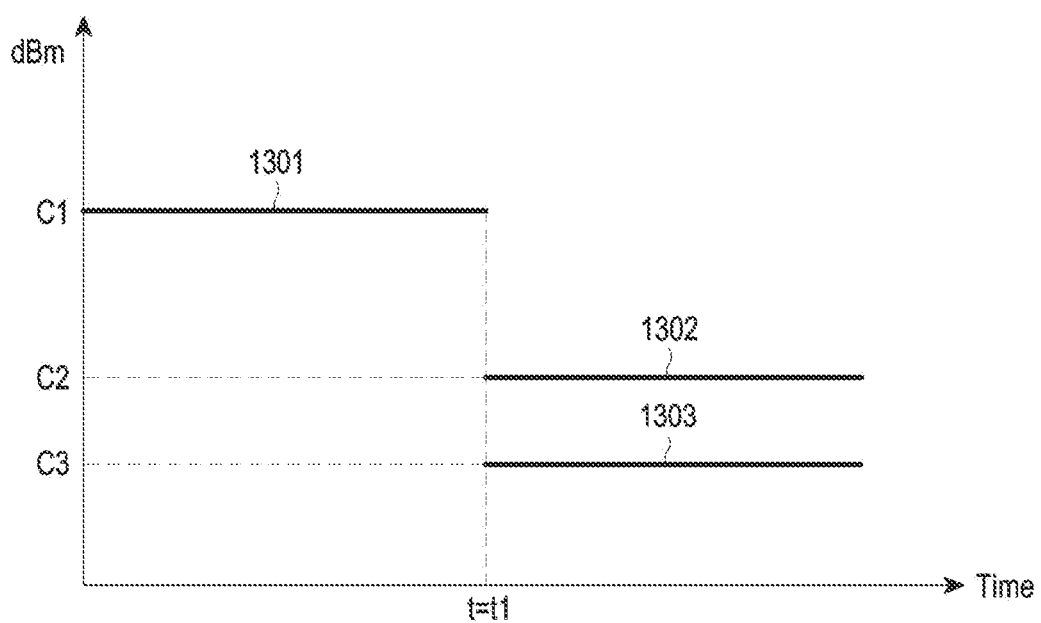
FIG. 13 is a graph illustrating example transmission intensities according to various embodiments.

FIG. 12 is a flowchart illustrating an example method for operating an electronic device according to various embodiments. Descriptions of operations in FIG. 12, which have already been described, may be made briefly. The embodiment in FIG. 12 will be described with reference to FIG. 13. FIG. 13 is a graph illustrating example transmission intensities according to various embodiments.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 1201. The electronic device 101 may identify whether a backoff of the transmission intensity of a communication signal is required, based on the first cumulative SAR value and the second cumulative SAR value, in operation 1203. If it is identified that no backoff is required (No in operation 1203), the electronic device 101 may determine that the transmission intensity of the communication signal of the first network communication (for example, LTE communication) is a first value in operation 1205. The first value, as used herein, refers to a value that is not backed off, for example, and may correspond to a normally configured maximum transmission intensity or a transmission intensity corresponding to a SAR event. For example, if no backoff is requested, the electronic device 101 may transmit the communication signal of the first network communication with a first transmission intensity 1301 (C1) in FIG. 13. According to various embodiments, the electronic device 101 may determine that the transmission intensity of the first network communication (for example, LTE communication) is a value that is not backed off.

According to various embodiments, if it is identified that a backoff is requested (Yes in operation 1203), the electronic device 101 may identify whether communication corresponding to a designated application is being performed in operation 1207. For example, the electronic device 101 may identify whether communication (for example, VoLTE service) related to a call application is being performed. If it is identified that communication corresponding to a designated application is being performed (Yes in operation 1207), the electronic device 101 may determine that the transmission intensity of the communication signal of the first network communication (for example, LTE communication) is a second value, in operation 1209. The second value may be a backoff transmission intensity when a designated application is performed, for example. For example, the electronic device 101 may transmit the communication signal of the first network communication (for example, LTE communication) with a second transmission intensity 1302 (C2) in FIG. 13. The electronic device 101 may transmit a communication signal with the first transmission intensity 1301 (C1) and, upon identifying that a backoff is requested at the first timepoint (t1), may transmit the communication signal with the second transmission intensity 1302 (C2). If it is identified that no communication corresponding to the designated application is being performed (No in operation 1207), the electronic device 101 may determine that the transmission intensity of the first communication signal is a third value in operation 1211. The third value may be a backoff transmission intensity when no designated application is performed, for example. For example, the electronic device 101 may transmit the communication signal of the first network communication (for example, LTE communication) with a third transmission intensity 1302 (C3) in FIG. 13. The electronic device 101 may transmit a communication signal with the first transmission intensity 1301 (C1) and, upon identifying that a backoff is requested at the first timepoint (t1), may transmit the communication signal with the third transmission intensity 1303 (C3). The third transmission intensity 1303 (C3) may be smaller than the second transmission intensity 1302 (C2). As described above, if it is identified that VoLTE is being performed, the electronic device 101 according to an embodiment may configure a relatively large value (for example, second transmission intensity C2) as the backed-off transmission intensity. In the case of VoLTE, the user's telephone call may be hung up during a call drop, and stable communication connection needs to be maintained. Accordingly, the electronic device 101 may configure a relatively high transmission intensity of LTE communication while performing VoLTE, even if a backoff is requested. In various embodiments, the electronic device 101 may maintain the transmission intensity of LTE as it is, or may further increase the same, and the transmission intensity of NR communication may be backed off in this case. It is also possible to back off the transmission intensity of NR communication, and this will be described later. Meanwhile, it has been assumed in the description with reference to FIG. 12 that the backed-off transmission intensity of the first network communication (for example, LTE communication) when VoLTE is performed is configured to be larger than the backed-off transmission intensity of the first network communication when VoLTE is not performed, but this is simply an example. For example, even when a specific application requiring stability (for example, payment application) is executed, the backed-off transmission intensity may be configured to be higher than when the application is not executed.

Figure 14:
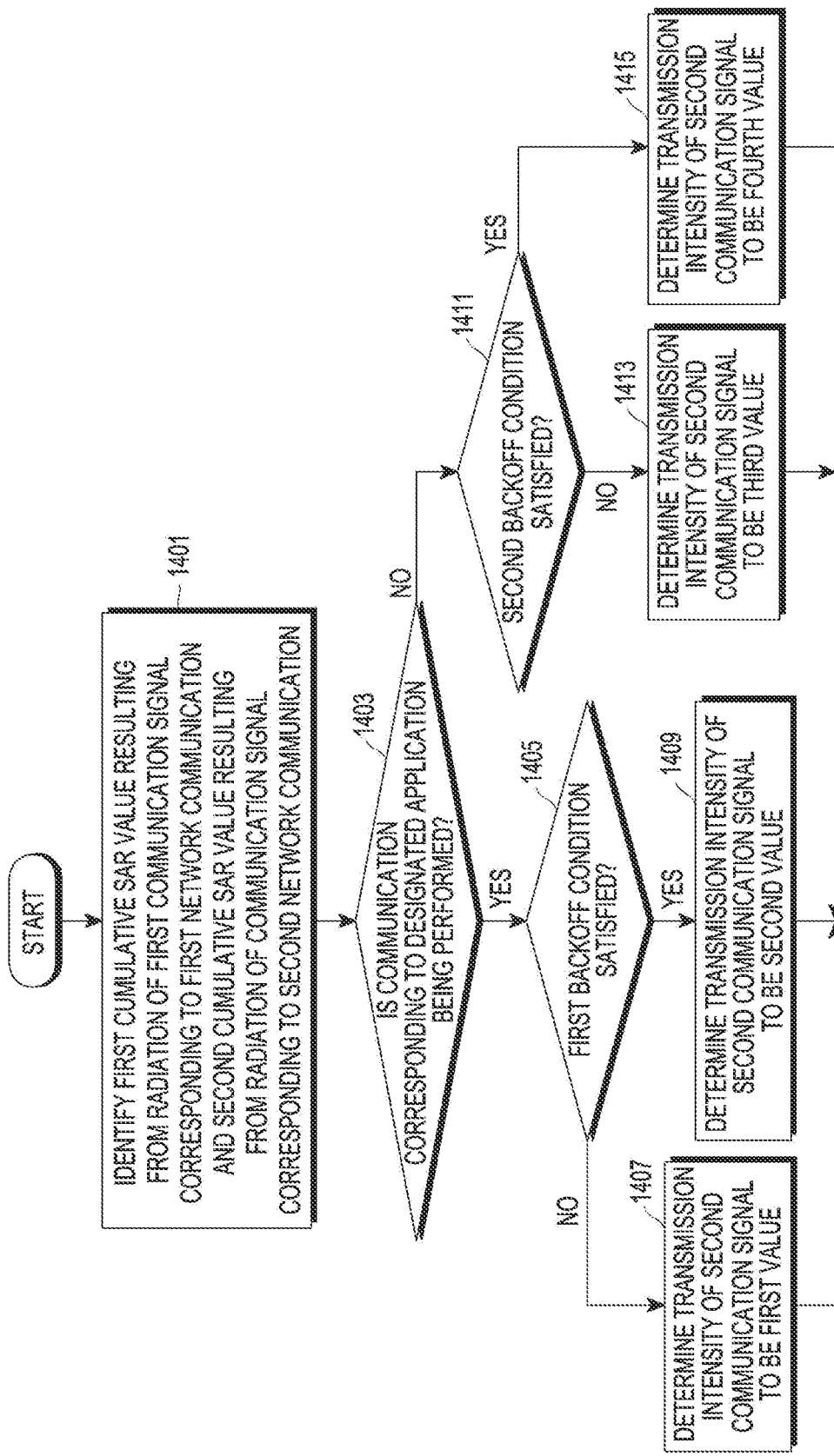
FIG. 14 is a flowchart illustrating an example method for operating an electronic device according to various embodiments.

FIG. 14 is a flowchart illustrating an example method for operating an electronic device according to various embodiments.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 1401. In operation 1403, the electronic device 101 may identify whether communication (for example, VoLTE) corresponding to a designated application is being performed.

According to various embodiments, if it is identified that communication corresponding to the designated application is being performed (Yes in operation 1403), the electronic device 101 may identify whether a first backoff condition is satisfied in operation 1405. If it is identified that no communication corresponding to the designated application is being performed (No in operation 1403), the electronic device 101 may identify whether a second backoff condition is satisfied in operation 1411. For example, if the designated application uses first network communication, the first backoff condition and the second backoff condition may be backoff conditions regarding second network communication. The second backoff condition may further include a SAR margin assigned to the communication (for example, LTE communication) corresponding to the designated application. For example, the SAR margin regarding the LTE communication under the first backoff condition may be higher than the SAR margin regarding LTE communication while performing VoLTE under the second backoff condition. As in the above-described example, a relatively larger SAR may be assigned to LTE communication when VoLTE is performed. Since LTE communication requires a relative larger SAR, the SAR available to NR communication may become smaller, in a time average aspect. Accordingly, the threshold cumulative value (SAR limit) for backing off second communication under the first backoff condition may be smaller than the threshold cumulative value (SAR limit) for backing off second network communication under the second backoff condition.

It is identified that communication corresponding to the designated application is being performed, and the first backoff condition is accordingly applied. The electronic device 101 may identify whether the first backoff condition is satisfied in operation 1405. If the first backoff condition is not satisfied (No in operation 1405), the electronic device 101 may determine that the transmission intensity of the communication signal of the second network communication is a first value in operation 1407. The first value may have no backoff applied thereto. If the first backoff condition is satisfied (Yes in operation 1405), the electronic device 101 may determine that the transmission intensity of the communication signal of the second network communication is a second value in operation 1409. It is identified that no communication corresponding to the designated application is being performed, and the second backoff condition is accordingly applied. The electronic device 101 may identify whether the second backoff condition is satisfied in operation 1411. If the second backoff condition is not satisfied (No in operation 1411), the electronic device 101 may determine that the transmission intensity of the communication signal of second network communication is a third value in operation 1413. The third value may have no backoff applied thereto, and may be configured to be equal to, larger than, or smaller than the first value, for example. If the second backoff condition is satisfied (Yes in operation 1411), the electronic device 101 may determine that the transmission intensity of the communication signal of the second network communication is a fourth value in operation 1415. The backoff value (fourth value) when the designated application is performed may be smaller than the backoff value (third value) when the designated application is not performed. However, the relative size of the third and fourth values is not limited. For example, the backoff value of NR communication when VoLTE communication is performed may be configured to be smaller than the backoff value of NR communication when VoLTE communication is not performed. This may secure a relatively large transmission intensity of LTE communication for VoLTE, thereby improving the stability of VoLTE.

Figure 15:
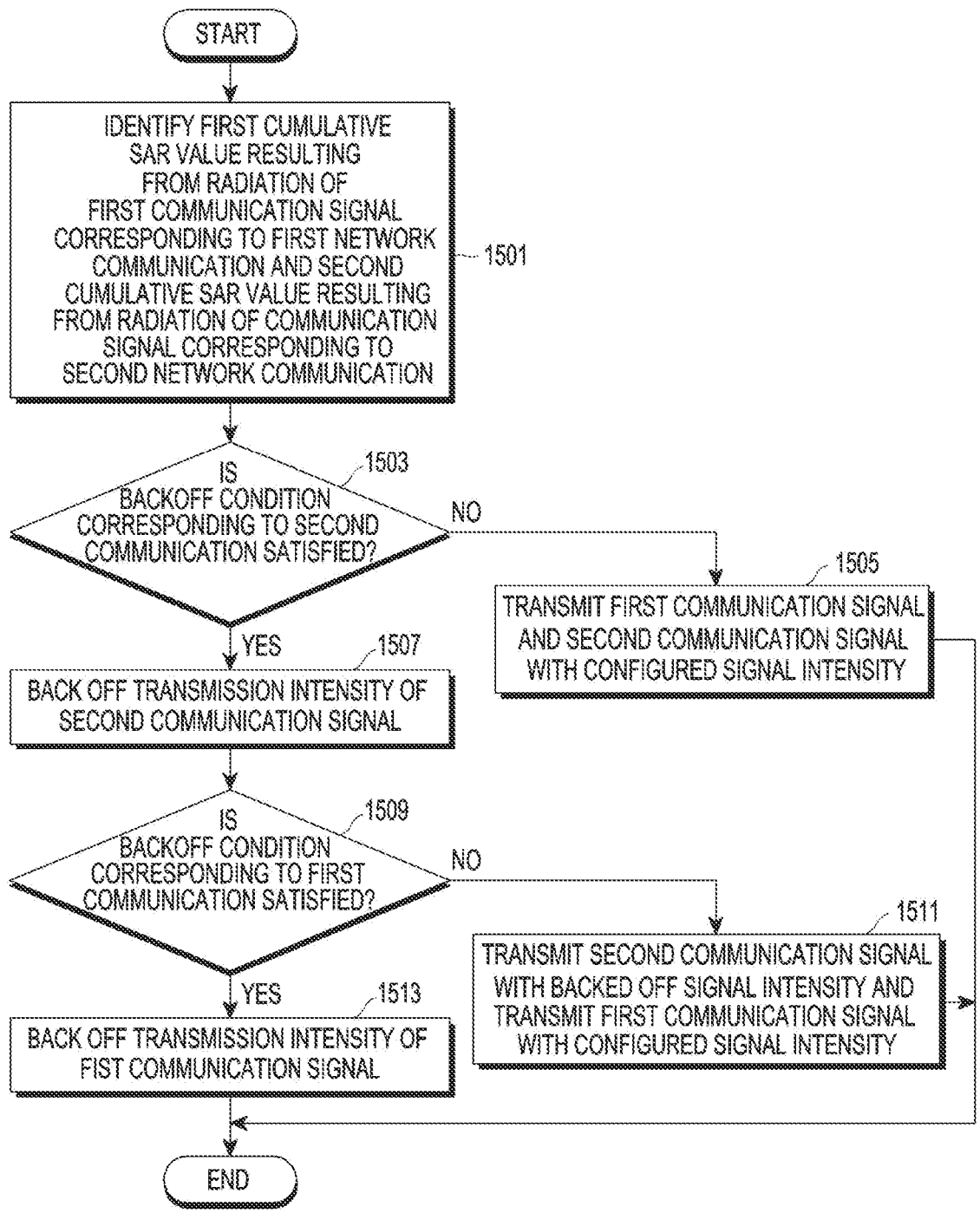
FIG. 15 is a flowchart illustrating an example method for operating an electronic device according to various embodiments.
Figure 16:
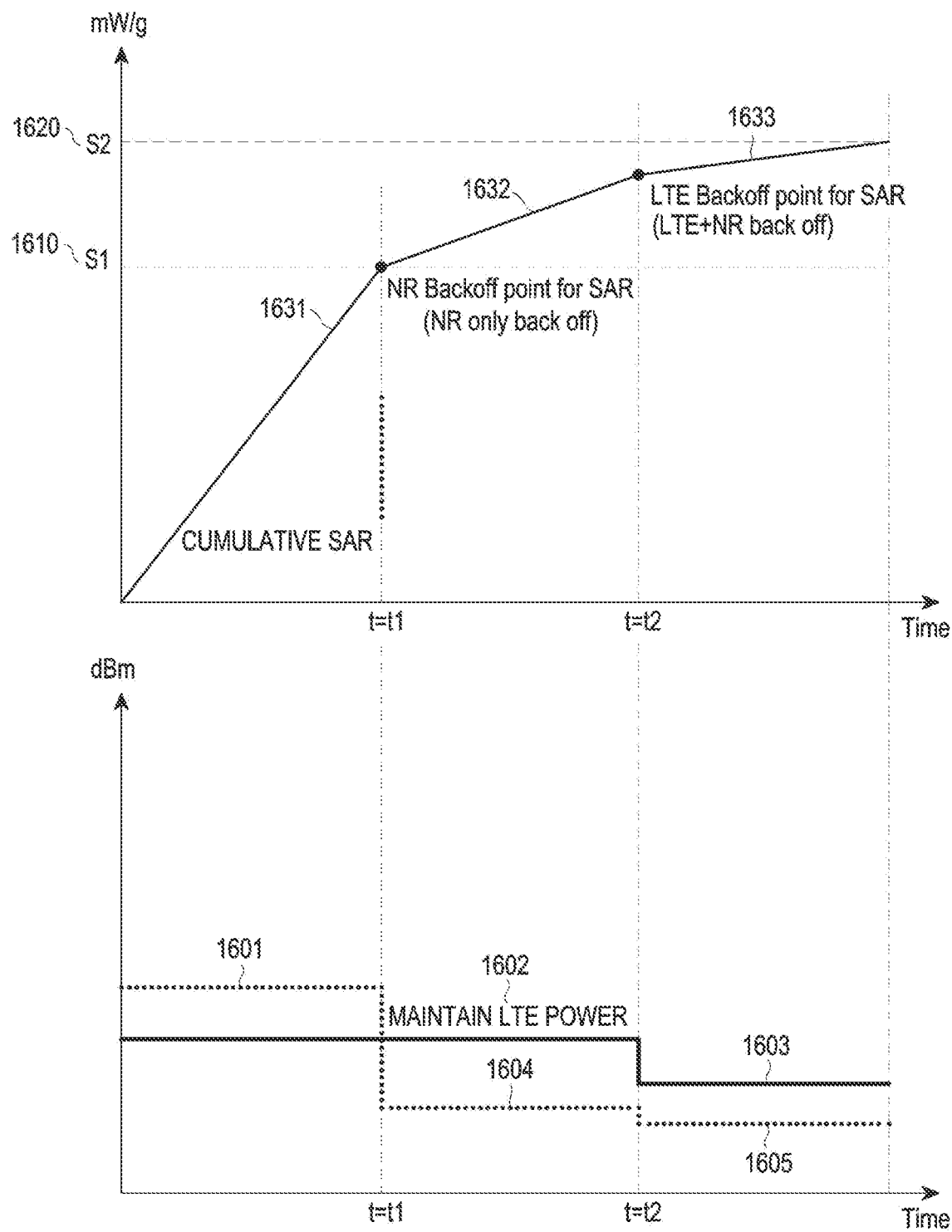
FIG. 16 is a graph illustrating example transmission intensity and an cumulative SAR according to various embodiments.
Figure 17:
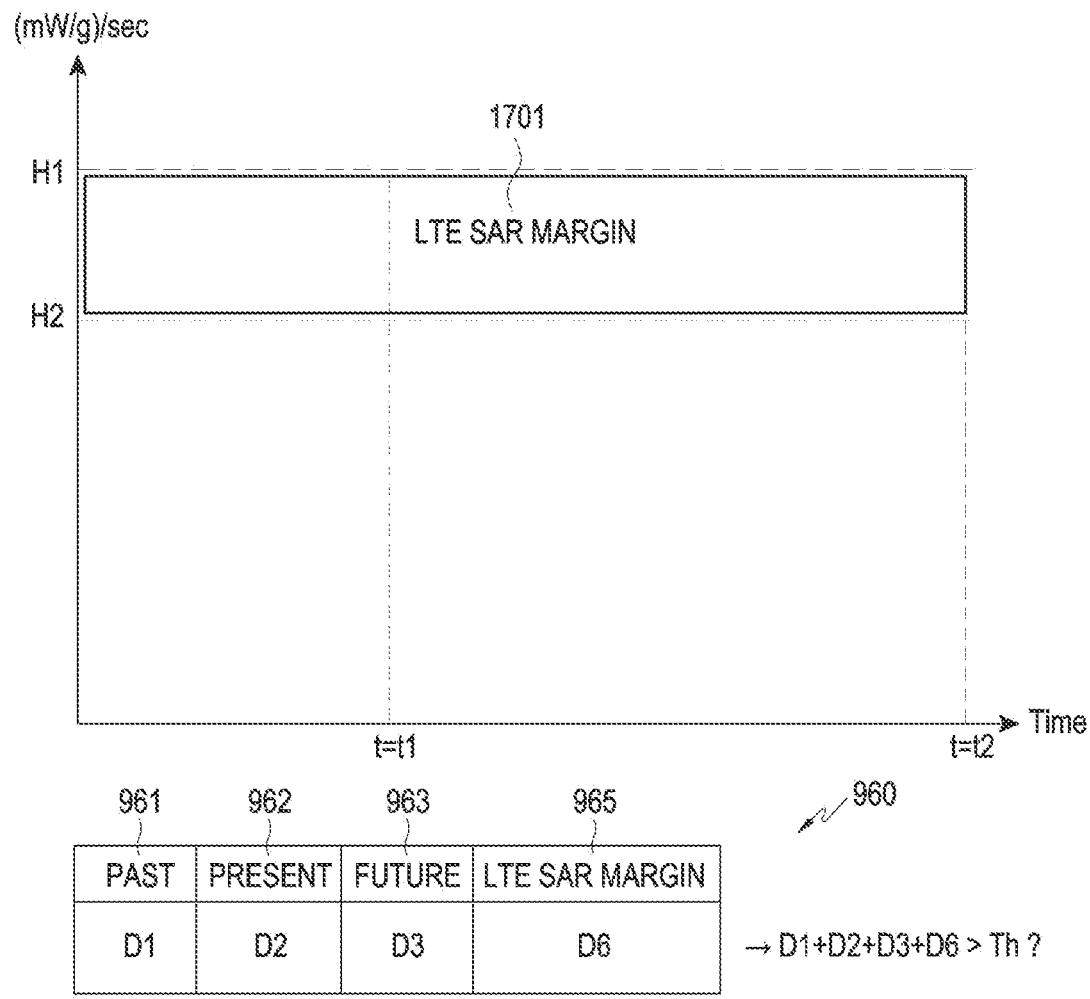
FIG. 17 is a diagram illustrating an example SAR margin of LTE according to various embodiments.

FIG. 15 is a flowchart illustrating an example method for operating an electronic device according to various embodiments. The embodiment in FIG. 15 will be described with reference to FIG. 16 and FIG. 17. FIG. 16 is a graph illustrating example transmission intensity and an cumulative SAR according to various embodiments. FIG. 17 is a diagram illustrating an example SAR margin of LTE according to various embodiments.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 1501. For example, as in FIG. 16, the electronic device 101 may configure the transmission intensity of first network communication (for example, LTE communication) to be a first value 1602 and may configure the transmission intensity of second network communication (for example, NR communication) to be a first value 1601. The electronic device 101 may identify the cumulative SAR 1631.

According to various embodiments, the electronic device 101 may identify whether a backoff condition corresponding to the second network communication is satisfied, in operation 1503. The electronic device 101 may differently configure a backoff condition corresponding to the first network communication and a backoff condition corresponding to the second network communication, and may preferentially identify whether the backoff condition corresponding to the second network is satisfied. As described above, the electronic device 101 may be configured to first back off the network communication determined according to the priority, and it will be assumed in the description of the embodiment that the second network communication is first backed off.

It has been described with reference to FIG. 9D that the electronic device 101 may determine whether to perform a backoff, according to whether the total sum of the cumulative SAR value (for example, D1 in FIG. 9D) corresponding to at least one past time, the maximum SAR value (for example, D2 in FIG. 9D) corresponding to the current timepoint, and the sum of backoff SARs (for example, D3 in FIG. 9D) of the second network communication (NR communication) at future timepoints exceed a threshold (for example, Th in FIG. 9D). According to various embodiments, in order to determine whether to perform a preferential backoff of specific network communication (for example, second network communication), the electronic device 101 may further consider the SAR margin value of network communication configured to be backed off relatively later. The SAR margin regarding specific network communication may refer, for example, to a SAR value predicted to be consumed by the corresponding network communication. For example, the LTE SAR margin may refer, for example, to the amount of margin configured such that, after NR communication is backed off at the current timepoint, in the case of a specific table, LTE communication is not backed off during future timepoints within the table. According to various embodiments, the LTE SAR margin may be configured as the same value (for example, 2 mW/g) for all tables. The LTE SAR margin may be configured to be proportional to the remaining time in the corresponding table, for example, the number of future timepoints in each table. For example, electronic device 101 may configure the LTE SAR margin 1701 as in FIG. 17, for example. The y-axis in FIG. 17 may be a SAR per time, the unit of which may be (mW/g)/sec, for example. Use of LTE communication per unit time may result in a SAR of H1−H2 (for example, 0.2 mW/g). Accordingly, the LTE SAR margin may be configured as (H1−H2)*t1 for the table regarding the case in which the remaining time is t1, and the LTE SAR margin may be configured as (H1−H2)*t2 for the table regarding the case in which the remaining time is t2.

According to various embodiments, in order to determine whether to back off second network communication (for example, NR communication), the electronic device 101 may identify whether the sum of the cumulative SAR value 961 (for example, D1) at least one past timepoint in a specific table, the maximum SAR value 962 (for example, D2) at the current timepoint, the predicted SAR value 963 (for example, D3) at least one future timepoint, and the LTE SAR margin 965 (for example, D6) exceeds a threshold cumulative value (for example, Th). For example, if the LTE SAR margin 1701 is configured as an amount obtained by multiplying 0.2 mW/g by the remaining time, determining whether to back off in the case of Table 2 will be described. In Table 2, the table having 0.5 second SAR information has a remaining time of 49.5 seconds, and the LTE SAR margin may be configured to be 0.2*(49.5−0.5), which is 9.8 mW/g. For example, the table having 40 second SAR information has a remaining time of 10 seconds, and the LTE SAR margin may be configured to be 0.2*(10.5−0.5)=1.9 mW/g. For example, the table having 49.5 second SAR information has a remaining time of 0.5 seconds, and the LTE SAR margin may be configured to be 0.2*(0.5−0.5)=0 mW/g. The maximum transmission power may be used for both LTE communication and NR communication, and the transmission intensity of NR communication may not be backed off due to the cumulative SAR in this case.

According to various embodiments, if it is identified that the backoff condition corresponding to the second network communication (for example, NR communication) is not satisfied (No in operation 1503), the electronic device 101 may transmit the first communication signal and the second communication signal with a configured signal intensity in operation 1505. For example, in the first time interval (t<t1) in FIG. 16, the electronic device 101 may maintain the transmission intensity of the first network communication (for example, LTE communication), which is configured as the second value 1602, and may maintain the transmission intensity of the second network communication (for example, NR communication), which is configured as the first value 1601.

According to various embodiments, if it is identified that the backoff condition corresponding to the second network communication (for example, NR communication) is satisfied (Yes in operation 1503), the electronic device 101 may back off the transmission intensity of the communication signal of the second network communication (for example, NR communication) in operation 1507. For example, as in FIG. 16, the electronic device 101 may identify that the backoff condition corresponding to the second network communication is satisfied at the first timepoint t1. In various embodiments, the electronic device 101 may identify whether to back off the second network communication, based on the cumulative SAR value at least one past timepoint, and may detect, for example, that D1+D2+D3+D6 exceeds the threshold value (Th). The electronic device 101 may back off the transmission intensity of the second network communication (for example, NR communication) to a fourth value 1604. Moreover, the electronic device 101 may maintain the transmission intensity of the first network communication (for example, LTE communication) as the second value 1602. Accordingly, the cumulative SAR 1632 may have a decreasing rate of change, starting from S1. The electronic device 101 may determine to back off the second network communication (for example, NR communication) if it is identified whether D1+D2+D3 exceeds NR SAR LIMIT 1610, for example. As describe above, LTE communication may also have a relatively large transmission intensity by limiting the average SAR, and data transmission/reception by the user plane may accordingly be performed stably.

According to various embodiments, after backing off the second network communication (for example, NR communication), the electronic device 101 may identify whether the backoff condition corresponding to the first network communication is satisfied, in operation 1509. If it is identified that the backoff condition corresponding to the first network communication is not satisfied (No in operation 1509), the electronic device 101 may transmit the second communication signal with the backed-off signal intensity in operation 1511, and may transmit the first communication signal with a configured signal intensity. For example, as in the second time interval (t1≤t≤t2) in FIG. 16, the electronic device 101 may maintain the transmission intensity of the second value 1602 with regard to the first communication signal and may maintain the transmission intensity of the fourth value 1604 with regard to the second communication signal. If it is identified that the backoff condition corresponding to the first network communication is satisfied (Yes in operation 1509), the electronic device 101 may back off the transmission intensity of the first communication signal in operation 1513. For example, the electronic device 101 may determine whether to back off the first network communication, based on whether the backoff condition (for example, D1+D2+

D3>Th) regarding the first network communication (for example, LTE communication) is satisfied. For example, as in the third time interval (t2≤t) in FIG. 16, the electronic device 101 may back off the intensity of the first communication signal to the third value 1603. The cumulative SAR 1633 may have a decreasing rate of change, starting from S2. Although the electronic device 101 is illustrated as additionally backing off the second network communication (for example, NR communication) to the fifth value 1605, this is only an example, and the electronic device 101 may maintain the transmission intensity of the second communication signal at the fourth value 1604.

Meanwhile, the above assumption that the first network communication is LTE communication and the second network communication is NR communication is simply an example, and the combination of the first network communication and the second network communication is not limited. The combination of the first network communication and the second network communication may include, for example, a combination of an anchor NR communication and non-anchor NR communication. Various embodiments may be applied to a case in which sub-6 NR communication (as anchor NR communication) and mmWave communication (as non-anchor NR communication) operate in a non-standalone (NSA) type. The combination of the first network communication and the second network communication may include, for example, a combination of NR communication of SA-URLLC and NR communication of SA-eMBB. Various embodiments may be applied to a case in which both types of communication operate in a standalone (SA) type, but one side provides a URLLC service. A person skilled in the art would understand that, in various embodiments, the combination of LTE/NR is not limited in all cases in which two or more types of network communication are used, and various embodiments are applicable to various combinations besides the above-mentioned combinations.

Figure 18A:
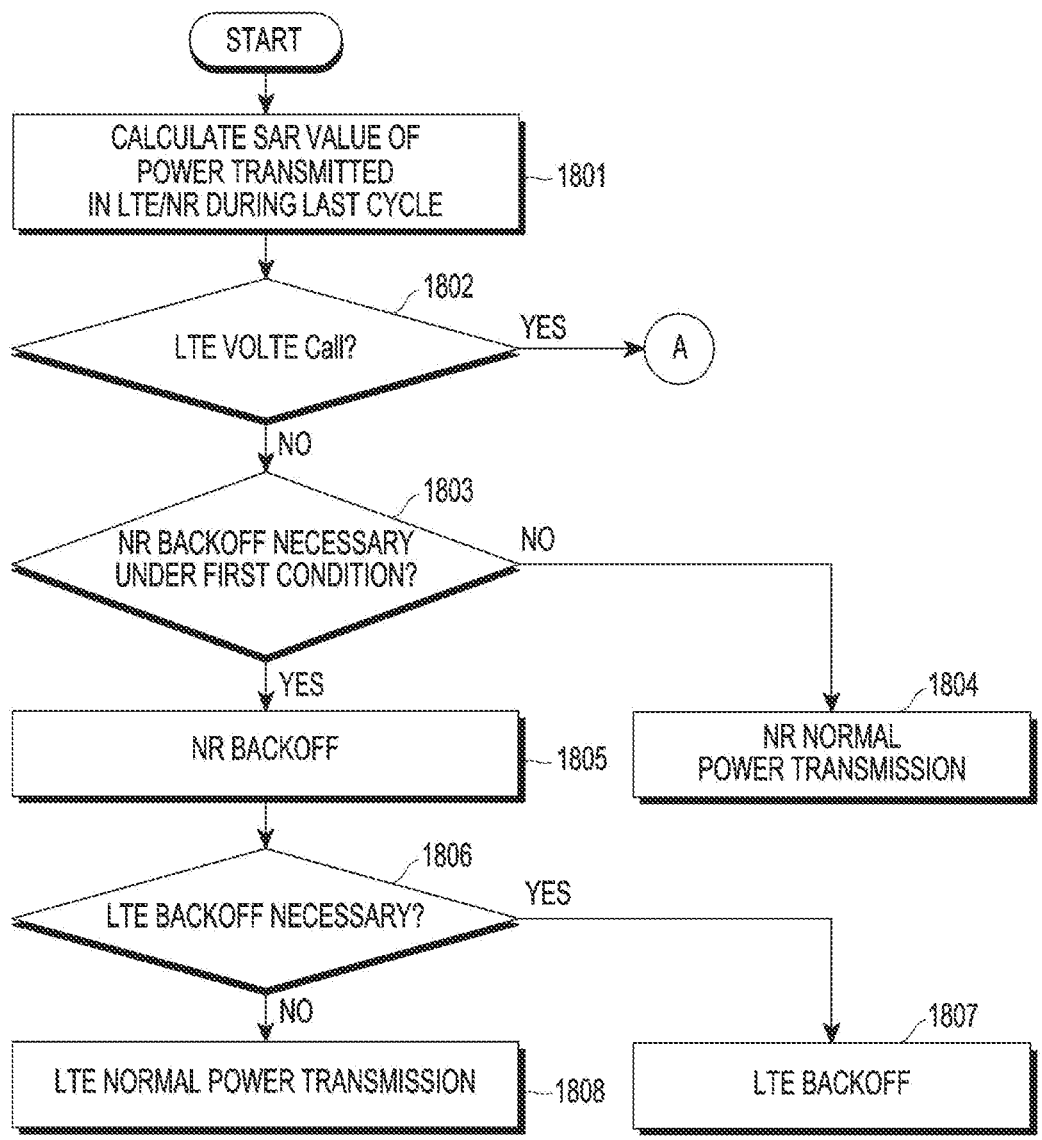
FIG. 18A is a flowchart illustrating an example method for operating an electronic device according to various embodiments.
Figure 18B:
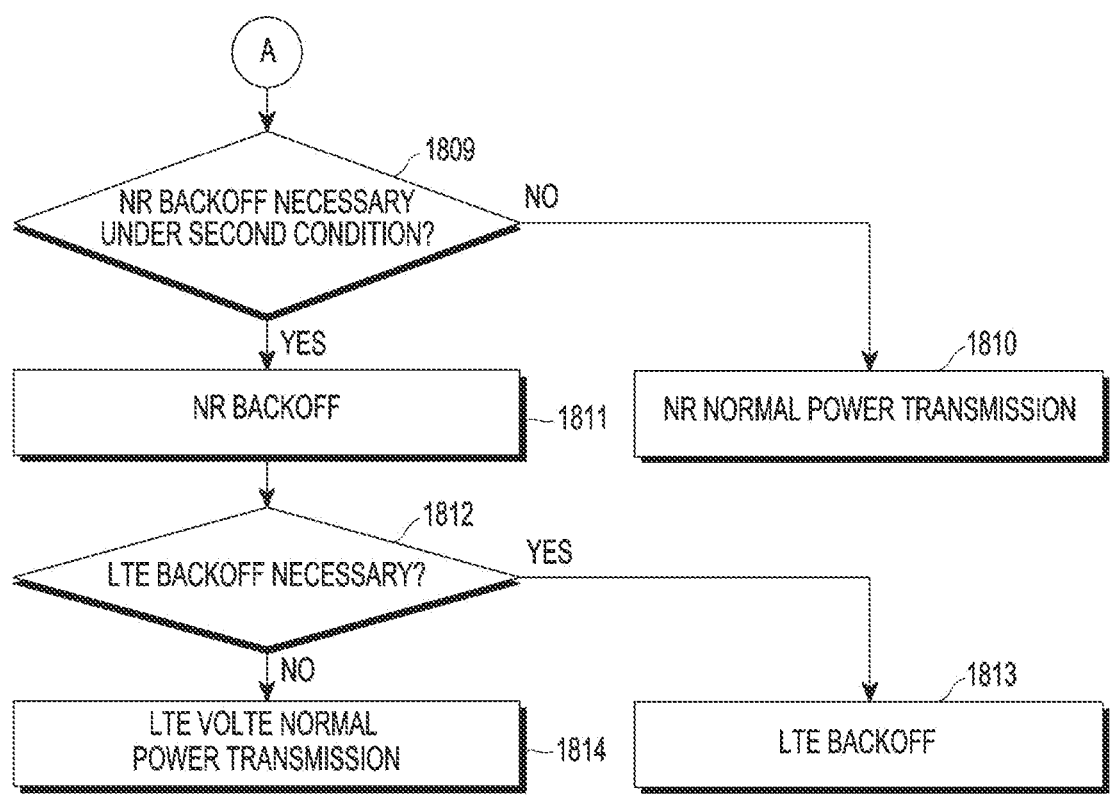
FIG. 18B is a flowchart illustrating an example method for operating an electronic device according to various embodiments.

FIG. 18A is a flowchart illustrating an example method for operating an electronic device according to various embodiments, and FIG. 18B is a flowchart illustrating an example method for operating an electronic device according to various embodiments.

According to various embodiments, the electronic device 101 (for example, at least one of processor 120, first communication processor 212, second communication processor 214, or combined communication processor 260) may calculate the SAR value of power transmitted via LTE communication and NR communication during the last cycle, in operation 1801. The electronic device 101 may identify an cumulative SAR value at least one past timepoint, for example. In operation 1802, the electronic device 101 may identify whether an LTE VoLTE call is being performed. If it is identified that the LTE VoLTE call is not performed (No in operation 1802), the electronic device 101 may identify whether a backoff of NR communication is necessary under a first condition, in operation 1803. If it is identified that the LTE VoLTE call is performed (Yes in operation 1802), the electronic device 101 may identify whether a backoff of NR communication is necessary under a second condition, in operation 1809 of FIG. 18B. According to various embodiments, the electronic device 101 may apply a different condition (for example, first condition or second condition) to the backoff of NR communication, according to whether VoLTE is being performed. The LTE SAR margin for determining whether to backoff NR communication has already been described with reference to FIG. 15, FIG. 16, and FIG. 17. In various embodiments, the first condition corresponding to a case in which VoLTE is not being performed may be related to whether the sum of the cumulative SAR value (for example, 961 in FIG. 17) (for example, D1) at least one past timepoint in the case of a specific table, the maximum SAR value (for example, 962 in FIG. 17) (for example, D2) at the current timepoint, the predicted SAR value (for example, 963 in FIG. 17) (for example, D3) at a least one future timepoint, and the LTE SAR margin (for example, 964 in FIG. 17) (for example, D6) exceeds the threshold cumulative value (for example, Th). Meanwhile, if VoLTE is being performed, a SAR margin regarding VoLTE may be assigned, in order to perform VoLTE stably. The SAR margin of VoLTE may be configured to be larger than the LTE SAR margin, for example. The SAR margin may differ depending on whether VoLTE is performed, and the first and second condition may accordingly differ from each other. The difference in margin will be described in greater detail below with reference to FIG. 19B.

According to various embodiments, if it is determined that no backoff regarding NR communication is necessary under the first condition (No in operation 1803), the electronic device 101 may transmit a communication signal with NR normal power, for example, a value equal to/less than the maximum transmission power allowed for NR communication with no backoff, in operation 1804. If it is determined that NR backoff is necessary under the first condition (Yes in operation 1803), the electronic device 101 may perform a backoff with regard to NR communication in operation 1805. After performing a backoff with regard to NR communication, the electronic device 101 may identify whether a backoff regarding LTE communication is necessary in operation 1806. The electronic device 101 may identify whether a backoff regarding LTE communication is necessary, based on whether the sum of the cumulative SAR value (for example, 961 in FIG. 9D) (for example, D1) at least one past timepoint in the case of a specific table, for example, the maximum SAR value (for example, 962 in FIG. 9D) (for example, D2) at the current timepoint, and the predicted SAR value (for example, 963 in FIG. 9D) (for example, D3) at a least one future timepoint exceeds the threshold cumulative value (for example, SAR limit). If it is identified that a backoff regarding LTE communication is necessary (Yes in operation 1806), the electronic device 101 may perform a backoff regarding LTE communication in operation 1807. If it is identified that no backoff regarding LTE communication is necessary (No in operation 1806), the electronic device 101 may perform LTE normal power transmission in operation 1808.

According to various embodiments, if it is identified that VoLTE is being performed, the electronic device 101 may identify whether a backoff regarding NR communication is necessary under a second condition, in operation 1809. The second condition may include information regarding the SAR margin regarding VoLTE, for example, and this will be described in greater detail below with reference to FIG. 19B. If it is identified that no backoff regarding NR communication is necessary under the second condition (No in operation 1809), the electronic device 101 may perform normal NR power transmission in operation 1810. If it is identified that a backoff regarding NR communication is necessary under the second condition (Yes in operation 1809), the electronic device 101 may perform a backoff with regard to the NR communication in operation 1811. After performing a backoff with regard to the NR communication, the electronic device 101 may identify whether a backoff regarding LTE communication is necessary in operation 1812. The condition for identifying whether a backoff regarding LTE communication is necessary in operation 1812 may be configured identically or similarly to the condition for identifying whether a backoff regarding LTE communication is necessary in operation 1806. If it is identified that a backoff regarding LTE communication is necessary (Yes in operation 1812), the electronic device 101 may perform a backoff regarding LTE communication in operation 1813. If it is identified that no backoff regarding LTE communication is necessary (No in operation 1812), the electronic device 101 may perform LTE VoLTE normal power transmission in operation 1814. For example, the LTE VoLTE normal power may be configured to be larger than LTE normal power.

Figure 19A:
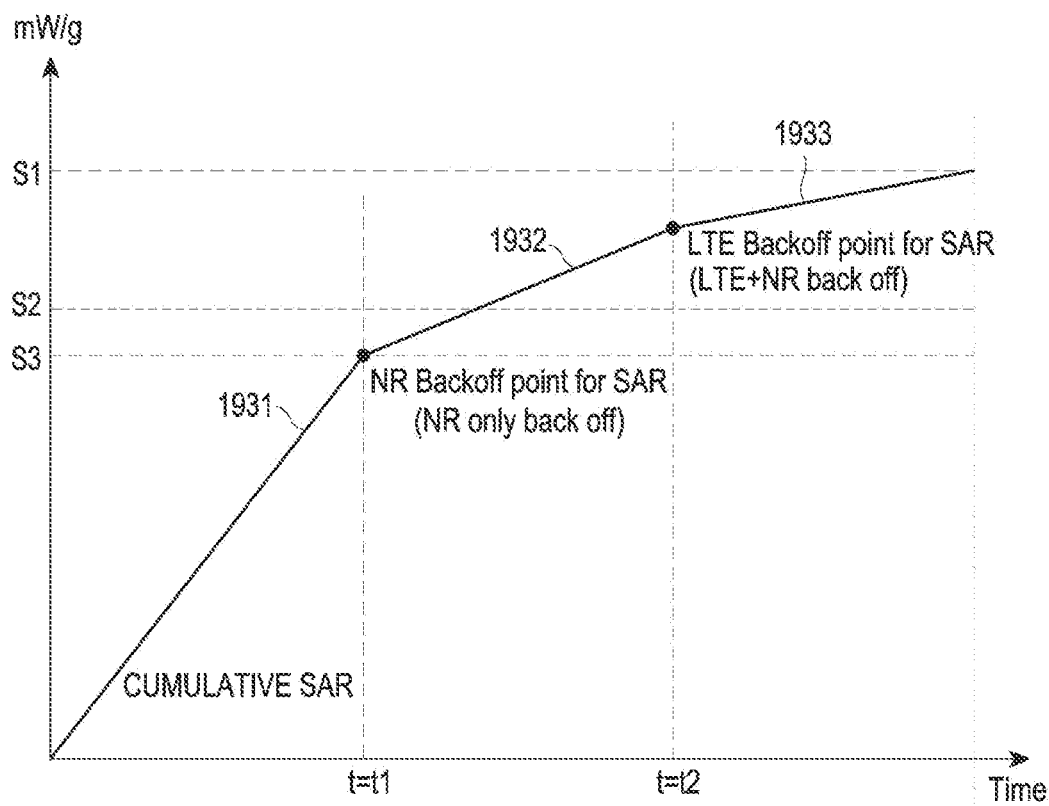
FIG. 19A is a diagram including graphs illustrating example backoff when an electronic device according to various embodiments performs VoLTE.
Figure 19A:
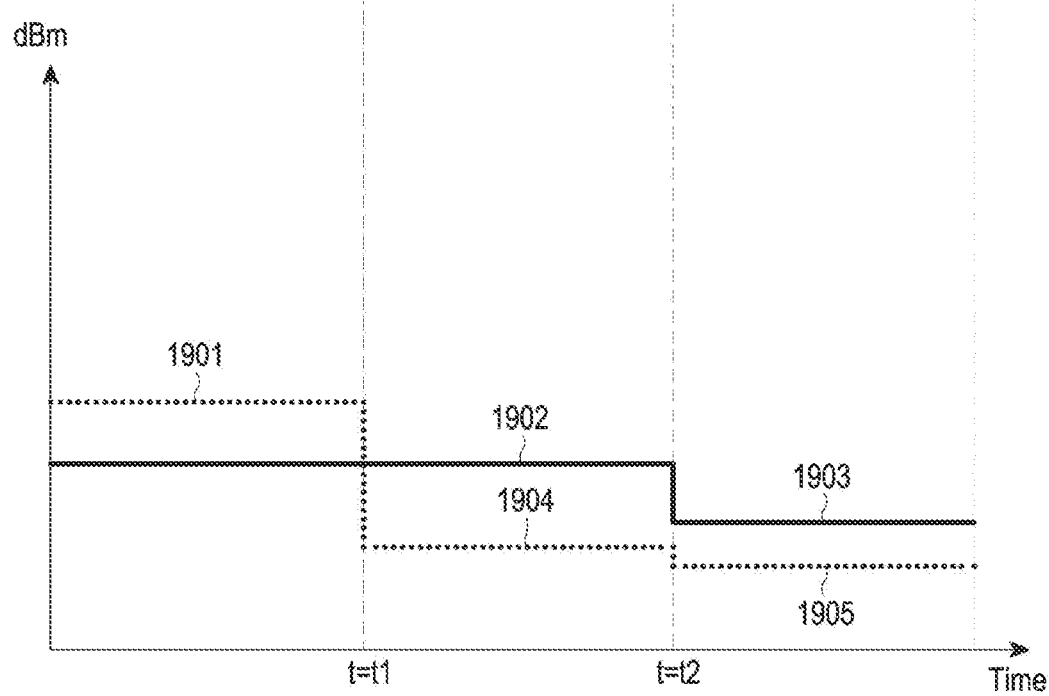
Figure 19B:
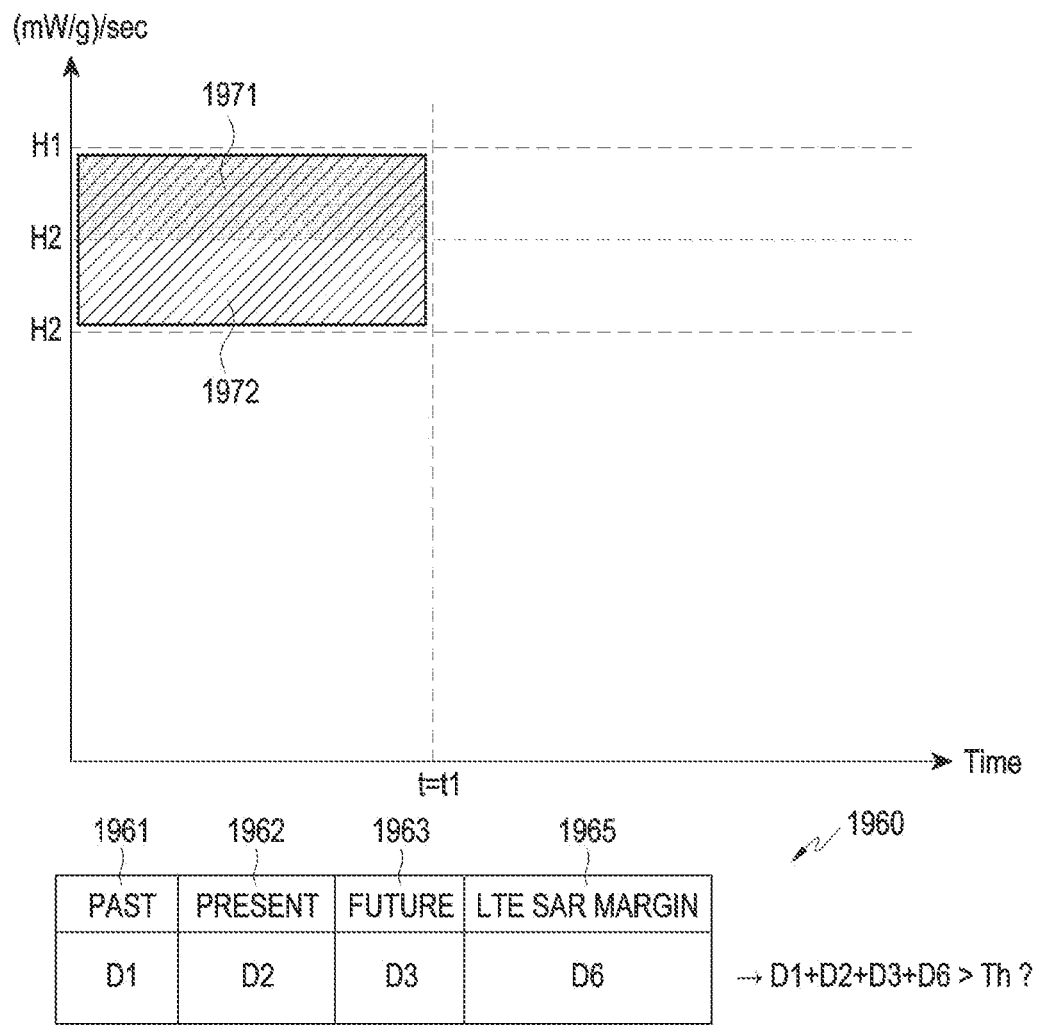
FIG. 19B is a diagram illustrating an example LTE SAR margin and a VoLTE SAR margin according to various embodiments.

FIG. 19A is a diagram illustrating example backoff when an electronic device according to various embodiments performs VoLTE. FIG. 19B is a diagram illustrating an example LTE SAR margin and a VoLTE SAR margin according to various embodiments.

According to various embodiments, the electronic device 101 (for example, at least one of processor 120, first communication processor 212, second communication processor 214, or combined communication processor 260) may configure the transmission intensity of first network communication (for example, LTE communication) to be a second value 1902 in the first time interval (t<t1), and may configure the transmission intensity of second network communication (for example, NR communication) to be a first value 1901. The first value 1901 and the second value 1902 may be transmission intensities that are not backed off. The LTE transmission intensity when VoLTE is performed may be larger than the LTE transmission intensity when VoLTE is not performed, for example, but may be equal to or smaller than the same, depending on the manner of implementation. The cumulative SAR 1931 may increase at a first rate of increase in the first time interval (t<t1). It will be assumed in the description with reference to FIG. 19A that the electronic device 101 is performing VoLTE. The electronic device 101 may identify whether to back off the second network communication (for example, NR communication) while performing VoLTE. For example, the electronic device 101 may identify whether a backoff condition is satisfied in view of the VoLTE SAR margin. Referring to FIG. 19B, (H1−H3)*t1 may be the VoLTE SAR margin 1972 with regard to a table at a timepoint at which the remaining time is t1, and this may be larger than the LTE SAR margin 1971 of (H1−H2)*t2. For example, (H1−H3) may be 0.3 (mW/g)sec. The margin may be proportional to the remaining time, but may be configured as the same value for all tables, as described above.

As described above, a communication signal may need to be produced with a transmission intensity having a relatively high value, in order to stably perform VoLTE, and this may result in consumption of a SAR having a relatively high value. Alternatively, in order to provide a service stably, the electronic device 101 may operate such that the transmission intensity prior to the backoff is maintained as long as possible. The electronic device 101 may secure a SAR margin for VoLTE such that, in order to observe SAR regulations, the transmission intensity of the communication signal for VoLTE is not reduced. Accordingly, with regard to another type of network communication (for example, NR communication), whether to perform a backoff may be determined with reference to a value obtained by subtracting the VoLTE SAR margin from the threshold cumulative value (SAR Limit).

According to various embodiments, the electronic device 101 may identify that a backoff of the NR communication is requested at the first timepoint t1. The electronic device 101 may identify whether the sum of the cumulative SAR value 1961 (for example, D1) at least one past timepoint in the case of a specific table 1960 as in FIG. 19B, for example, the maximum SAR value 1962 (for example, D2) at the current timepoint, the predicted SAR value 1963 (for example, D3) at a least one future timepoint, and the VoLTE SAR margin 1965 (for example, D7) exceeds the threshold cumulative value (for example, Th). If it is identified that D1+D2+D3+D7 exceeds the threshold cumulative value (Th), the electronic device 101 may identify that the NR communication is to be backed off while performing VoLTE. While maintaining the LTE power at the second value 1902, the electronic device 101 may back off the NR power from the first value 1901 to the fourth value 1904. The cumulative SAR value 1932 may increase from the value of S3 at a second rate of increase. The cumulative SAR (D3) that is backed off when VoLTE is being performed in FIG. 19 may be smaller than the cumulative SAR (S1) that has been backed off when LTE is being performed in FIG. 16, and this may result from the fact that the VoLTE SAR margin is larger than the LTE SAR margin. The electronic device 101 may later identify that the backoff condition of LTE power is satisfied at the second timepoint (t2). The electronic device 101 may back off the LTE power from the second value 1902 to the third value 1903. Although the electronic device 101 is illustrated in the embodiment of FIG. 19A as additionally backing off the NR power from the fourth value 1094 to the fifth value 1905 together with a backoff of the LTE power, this is merely an example, and the electronic device 101 may also maintain the NR power at the fourth value 1904. The electronic device 101 may increase the cumulative SAR 1933 at a third rate of increase with reference to the point of S4, for example.

Figure 20:
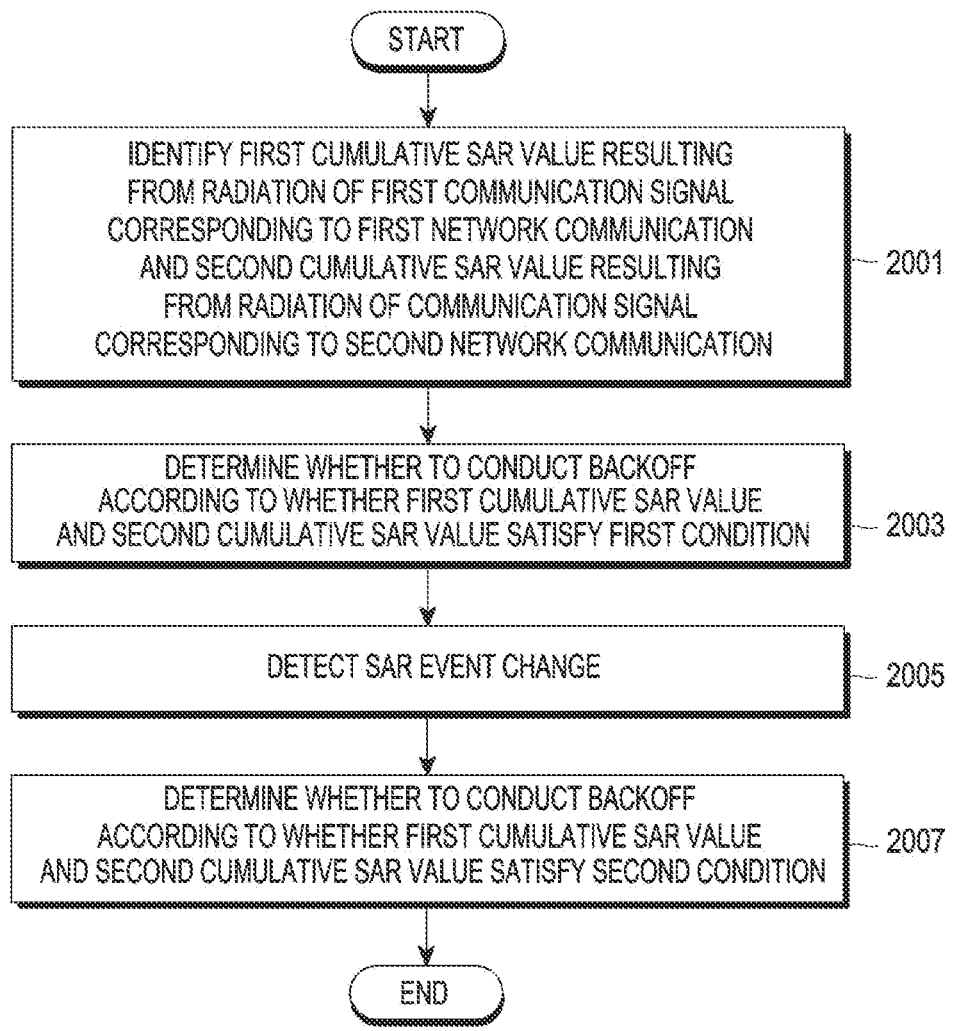
FIG. 20 is a flowchart illustrating an example method for operating an electronic device according to various embodiments.

FIG. 20 is a flowchart illustrating an example method for operating an electronic device according to various embodiments.

According to various embodiments, the electronic device 101 (for example, at least one of processor 120, first communication processor 212, second communication processor 214, or combined communication processor 260) may identify a first cumulative SAR value resulting from radiation of a first communication signal corresponding to first network communication and a second cumulative SAR value resulting from radiation of a communication signal corresponding to second network communication, in operation 2001. The electronic device 101 may determine whether to conduct a backoff according to whether the first cumulative SAR value and the second cumulative SAR value satisfy a first condition, in operation 2003. The electronic device 101 may detect a SAR event change in operation 2005. If a SAR event is changed, at least one of the maximum transmission power for each type of network communication, the backoff power, or the threshold cumulative value (SAR limit) may be changed, for example. The electronic device 101 may determine whether to conduct a backoff according to whether the first cumulative SAR value and the second cumulative SAR value satisfy a second condition, in operation 2007. For example, the second condition may be based on at least one of the changed maximum transmission power for each type of network communication, the changed backoff power, or the changed threshold cumulative value (SAR limit). According to various embodiments, the electronic device 101 may manage such that a SAR of 1.5 mW/g occurs per unit time with regard to a transmission intensity of 24 dBm, in connection with a grip event in a band of LTE B7, for example, and may manage such that a SAR of 1.2 mW/g occurs per unit time with regard to a transmission intensity of 24 dBm, in connection with a proximity event. If the SAR event has changed from a proximity event to a grip event, the electronic device 101 may not update existing tables, and may determine whether to conduct a backoff using a SAR value corresponding to the proximity event. The electronic device 101 may determine whether to conduct a backoff using a smaller value between SAR values (for example, 1.5 mW/g or 1.2 mW/g) before/after the change.

Figure 21:
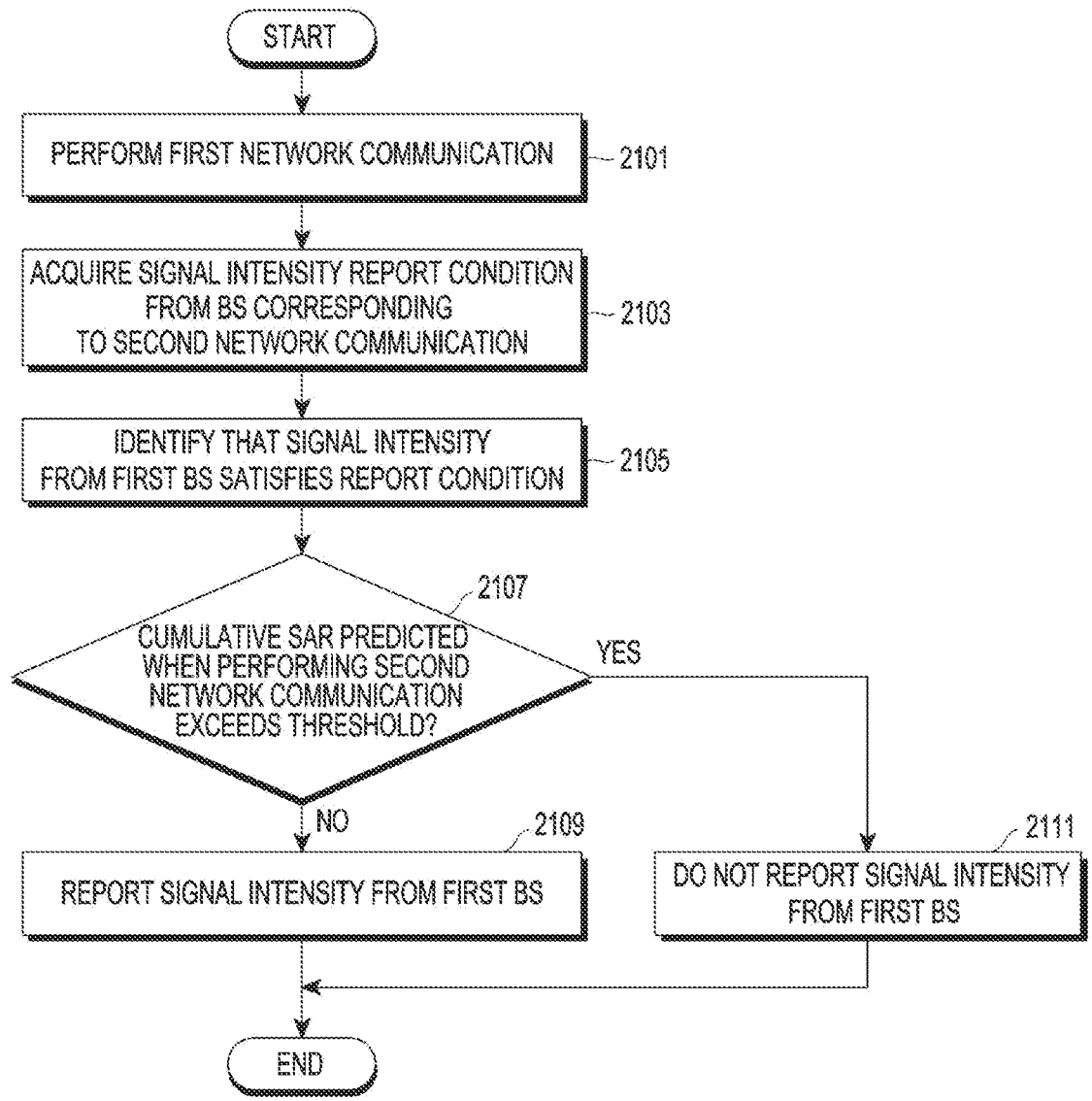
FIG. 21 is a flowchart illustrating an example method for operating an electronic device according to various embodiments.

FIG. 21 is a flowchart illustrating an example method for operating an electronic device according to various embodiments.

According to various embodiments, the electronic device 101 (for example, at least one of processor 120, first communication processor 212, second communication processor 214, or combined communication processor 260) may perform first network communication in operation 2101. For example, the electronic device 101 may perform LTE communication with a base station (BS) of LTE. The electronic device 101 may acquire a signal intensity report condition from a BS corresponding to second network communication in operation 2103. For example, the electronic device 101 may receive an RRC connection reconfiguration message from the BS of LTE, and the RRC connection reconfiguration message may include a report condition resulting from an NR-B1 event. The electronic device 101 may configure a report condition resulting from the NR-B1 event, based on the RRC connection reconfiguration message. The report condition may be configured such that, in a case that the intensity of a signal from a neighbor cell of second network communication (for example, NR communication) exceeds a threshold, for example, information regarding the signal intensity is reported to the BS of LTE, which is a master node. Upon receiving the report, the master node may perform SN addition, and may transmit an RRC connection reconfiguration message regarding the SN addition to the electronic device 101. The electronic device 101 may perform a RACH with the secondary node (SN) corresponding to the second network communication, based on the received RRC connection reconfiguration message.

According to various embodiments, the electronic device 101 may identify that the intensity of a signal from the first BS, among at least one BS corresponding to the second network communication, satisfies the report condition in operation 2105. Instead of immediately reporting the measurement result to the master node, the electronic device 101 may identify whether the predicted cumulative SAR exceeds a threshold cumulative value, when second network communication is performed, in operation 2107. If it is predicted that the predicted cumulative SAR will not exceed the threshold cumulative value (No in operation 2107), the electronic device 101 may report the intensity of the signal from the first BS to the master node in operation 2109. Thereafter, if an RRC connection reconfiguration message regarding SN addition is received from the master node, the electronic device 101 may perform a RACH with the corresponding SN. If it is predicted that the predicted cumulative SAR will exceed the threshold cumulative value (Yes in operation 2107), the electronic device 101 may not report the intensity of the signal from the first BS in operation 2111. Accordingly, if a backoff of the second network communication is predicted due to limitation of the cumulative SAR (or average SAR), the SN addition procedure may be omitted to prevent and/or reduce unnecessary power consumption.

FIG. 22 is a diagram illustrating an example amount of used SAR and a margin according to various embodiments.

According to various embodiments, the electronic device 101 (for example, at least one of processor 120, first communication processor 212, second communication processor 214, or combined communication processor 260) may identify a condition to report information regarding measurement of the reception intensity of a communication signal from a BS of a second network communication, as described with reference to FIG. 21. Moreover, it will be assumed that the communication signal from the first BS of the second network communication satisfies the condition. Referring to FIG. 22, the electronic device 101 may identify an cumulative SAR value 2201 (for example, D1) at a past timepoint, which corresponds to the amount of SAR used to the present, with regard to a specific table 2200. The electronic device 101 may identify a predicted amount of use 2203 (for example, D7) during an LTE backoff at a remaining future timepoint, and a predicted amount of use 2204 (D8) during an NR backoff at a remaining future timepoint. The electronic device 101 may identify the amount of use 2203 during an LTE backoff and the amount of use 2204 during an NR backoff, for example, as temporary fixed values, or may identify the same based on the remaining time. The electronic device 101 may identify, in the case of FIG. 22, that the summation (for example, D1+D2+D7+D8) of the cumulative SAR value 2201 (for example, D1) at a past timepoint, the maximum SAR value 2202 (for example, D2) at the current timepoint, the predicted amount of use 2203 (for example, D7) during an LTE backoff, and the predicted amount of use 2204 (for example, D8) during an NR backoff exceeds a threshold cumulative value (SAR limit) (Th). The electronic device 101 may not perform the measurement report regarding the first BS, based on identifying that the summation exceeds the threshold cumulative value (SAR limit).

Figure 23:
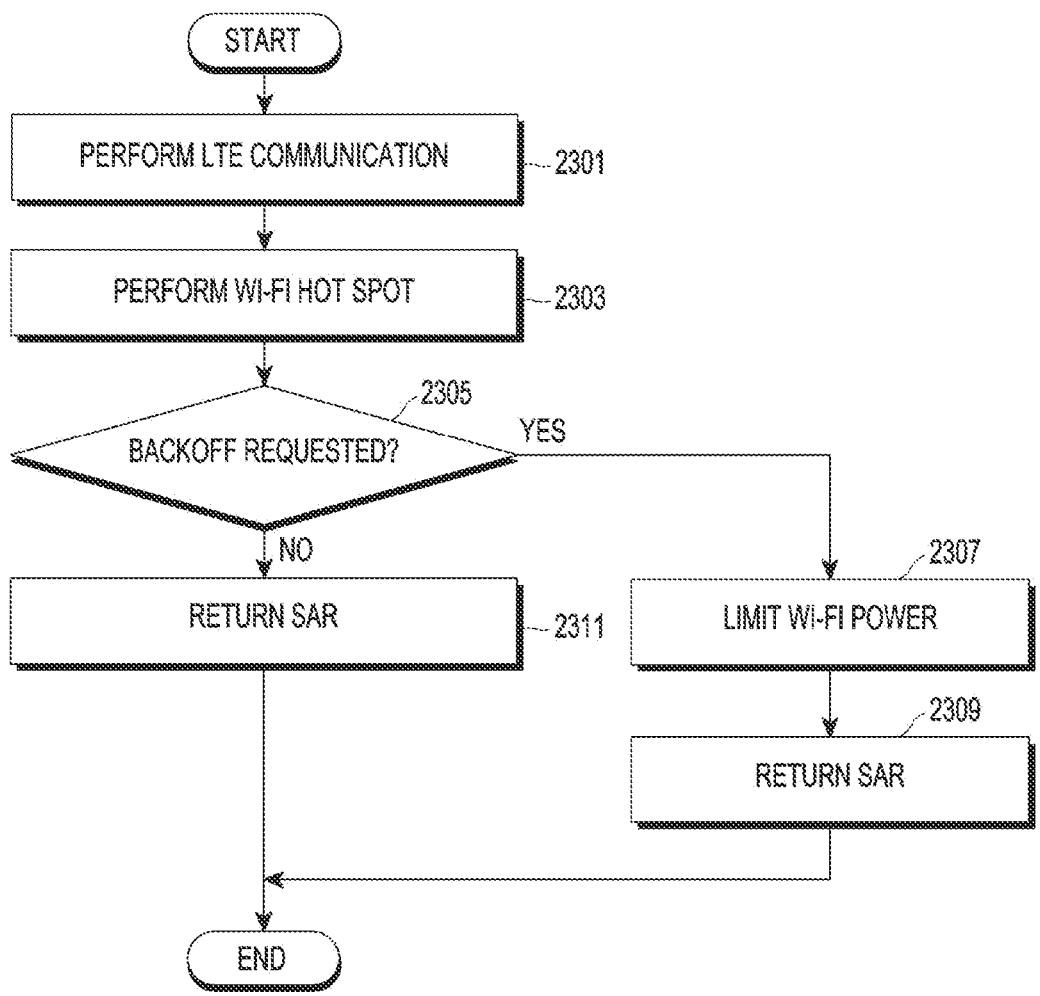
FIG. 23 is a flowchart illustrating an example method for operating an electronic device according to various embodiments.

FIG. 23 is a flowchart illustrating an example method for operating an electronic device according to various embodiments. FIG. 23 will be described with reference to FIG. 24. FIG. 24 is a diagram illustrating an example identified amount of used SAR according to various embodiments.

According to various embodiments, the electronic device 101 (for example, at least one of processor 120, first communication processor 212, second communication processor 214, or combined communication processor 260) may perform LTE communication in operation 2301. The electronic device 101 may perform a Wi-Fi hot spot function in operation 2303. For example, the electronic device 101 may perform the Wi-Fi hot spot function based on a user input. According to various examples, the Wi-Fi hot spot function may pertain to a function performed by the electronic device 101 to share an external data communication connection of the electronic device 101 with another electronic device (not illustrated) via Wi-Fi. The electronic device 101 may identify whether a backoff is requested in operation 2305. For example, the electronic device 101 may identify, as in FIG. 24, the summation (for example, D1+D2+D9+D10) of the cumulative SAR value 2401 (for example, D1) used at a past timepoint, with regard to a specific table 2400, the current maximum SAR 2402 (for example, D2), the amount of predicted SAR use 2403 (for example, D9) when using the hot spot at a remaining future timepoint, and the amount of predicted SAR use 2404 (for example, D10) when using data communication (for example, LTE communication and/or NR communication) at a remaining future timepoint. The electronic device 101 may identify whether a backoff is requested, based on whether the summation exceeds the threshold cumulative value (SAR limit) (Th).

According to various embodiments, if it is identified that a backoff is requested (Yes in operation 2305), the electronic device 101 may limit the Wi-Fi power in operation 2307. The electronic device 101 may return the SAR, which is allowed to additionally occur after use for the Wi-Fi, such that the same is used for LTE or NR communication. If it is identified that no backoff is requested (No in operation 2305), the electronic device 101 may not limit the Wi-Fi power, and may return the SAR, which is allowed to additionally occur after use for the Wi-Fi, such that the same is used for LTE or NR communication, in operation 2311.

According to various embodiments, the electronic device 101 may configure the period for calculating the cumulative (or average) SAR of Wi-Fi to be shorter than the period for calculating the cumulative (or average) SAR of LTE and NR. For example, the period for calculating the cumulative SAR of Wi-Fi may be configured to be 10 seconds, and period for calculating the cumulative SAR of LTE and NR may be configured to be 50 seconds. The electronic device 101 may return the SAR, which remains after being used in the Wi-Fi, and which is allowed to additionally occur, at each cycle (for example, 10 seconds) of the Wi-Fi such that the same can be used for LTE and NR communication. For example, in the case of tables having at least 10 seconds of remaining time (for example, if the table size is 50 seconds, tables having at least 10 seconds of periods corresponding to future timepoints), among the tables, a Wi-Fi margin of the SAR limit value (for example, 4 mW/g) of Wi-Fi may need to be secured additionally. Moreover, in the case of a table having less than 10 seconds of remaining time, among the tables, a value obtained by multiplying the maximum amount of Wi-Fi use per second (for example, 0.5 mW) by the remaining time needs to be secured as the Wi-Fi margin, but the maximum value thereof may be the SAR limit value of Wi-Fi. As an example, in the case of a table having one second of remaining time, the result value of 0.5 mW*1 second, which is 0.5 mW, may be required as the Wi-Fi margin. In the case of a table having three seconds of remaining time, the result value of 0.5 mW*3 seconds, which is 1.5 mW, may be required as the Wi-Fi margin. In the case of a table having nine seconds of remaining time, the result value of 0.5 mW*5 seconds+0.5 mW*3 seconds, which is 3.7 mW, may be required as the Wi-Fi margin. The reason why thee seconds are multiplied by 0.3 mW in the case of the nine-second table may be for the purpose of satisfying the maximum SAR value of ten seconds, which is 4 mW. After ten seconds are completed, the electronic device 101 may identify the SAR which remains in the Wi-Fi, and which is allowed to additionally occur, and may return the same to be used for LTE and NR communication.

According to various embodiments, the electronic device 101 may return a SAR which remains after being consumed by Wi-Fi during past 20 seconds or past 10 seconds, and which is allowed to additionally occur, when a timepoint (for example, 20 seconds (which is 10 seconds times two)) larger than 10 seconds is completed, not when 10 seconds is completed, such that the same is used for LTE and NR communication. In this case, it may be guaranteed in the time interval of a past 20 seconds or past 10 seconds that a value within the threshold cumulative value (SAR limit) (for example, 4 mW), during 10 seconds, is used by the Wi-Fi module. The electronic device 101 may return the SAR which remains in the corresponding interval, and which is allowed to additionally occur, such that the same is used for LTE and NR communication with no other limitations.

According to various embodiments, the electronic device 101 may control the Wi-Fi so as to operate with the maximum power. If the amount of use is smaller than the SAR predicted to be used in real time in this case, the remaining SAR which is allowed to additionally occur may be returned such that the same is used for LTE and NR communication.

Figure 25:
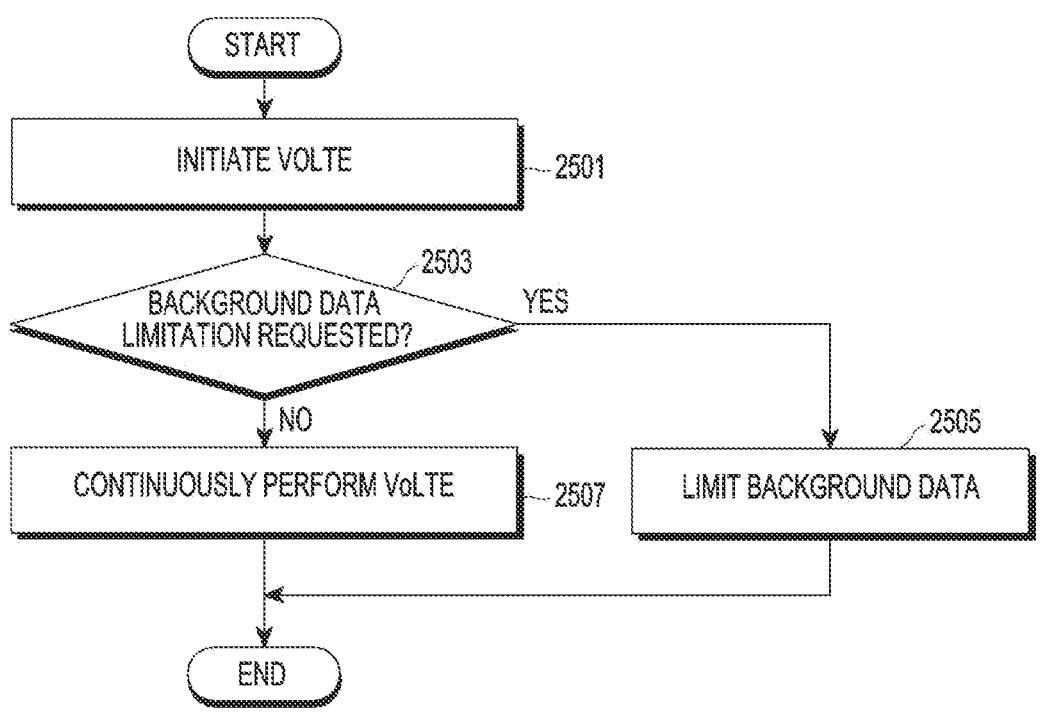
FIG. 25 is a flowchart illustrating an example method for operating an electronic device according to various embodiments.

FIG. 25 is a flowchart illustrating an example method for operating an electronic device according to various embodiments.

According to various embodiments, the electronic device 101 (for example, at least one of processor 120, first communication processor 212, second communication processor 214, or combined communication processor 260) may initiate VoLTE in operation 2501. The electronic device 101 may identify whether background data limitation is requested, in operation 2503. For example, the electronic device 101 may identify, with regard to a specific table, the summation of an cumulative SAR value used at a past timepoint, a maximum SAR value at the current timepoint, and a value of use of SAR, which is predicted to be used at a future timepoint when background data is transmitted. The electronic device 101 may identify whether background data limitation is requested at the current timepoint, based on whether the summation exceeds a threshold cumulative value (SAR limit). If it is identified that no background data limitation is requested (No in operation 2503), the electronic device 101 may continuously perform VoLTE in operation 2507. In this case, transmission of the background data to a base station may be maintained. If it is identified that background data limitation is requested (Yes in operation 2503), the electronic device 101 may limit the background data in operation 2505. In the case of backoff maximum power (for example, reserved power operation interval), background data may be transmitted from the electronic device 101 to the base station. Moreover, the SAR may be consumed by transmission of background data. If the background data transmission is limited, SAR consumption caused by the transmission may not occur, and the electronic device 101 may use the portion of SAR that has not been consumed as the SAR margin. Addition of the SAR margin may enable the electronic device 101 to further delay the backoff timepoint while maintaining the transmission intensity of LTE communication. Addition of the SAR margin may enable the electronic device 101 to increase the transmission intensity of LTE communication while maintaining the same usage time.

Figure 26A:
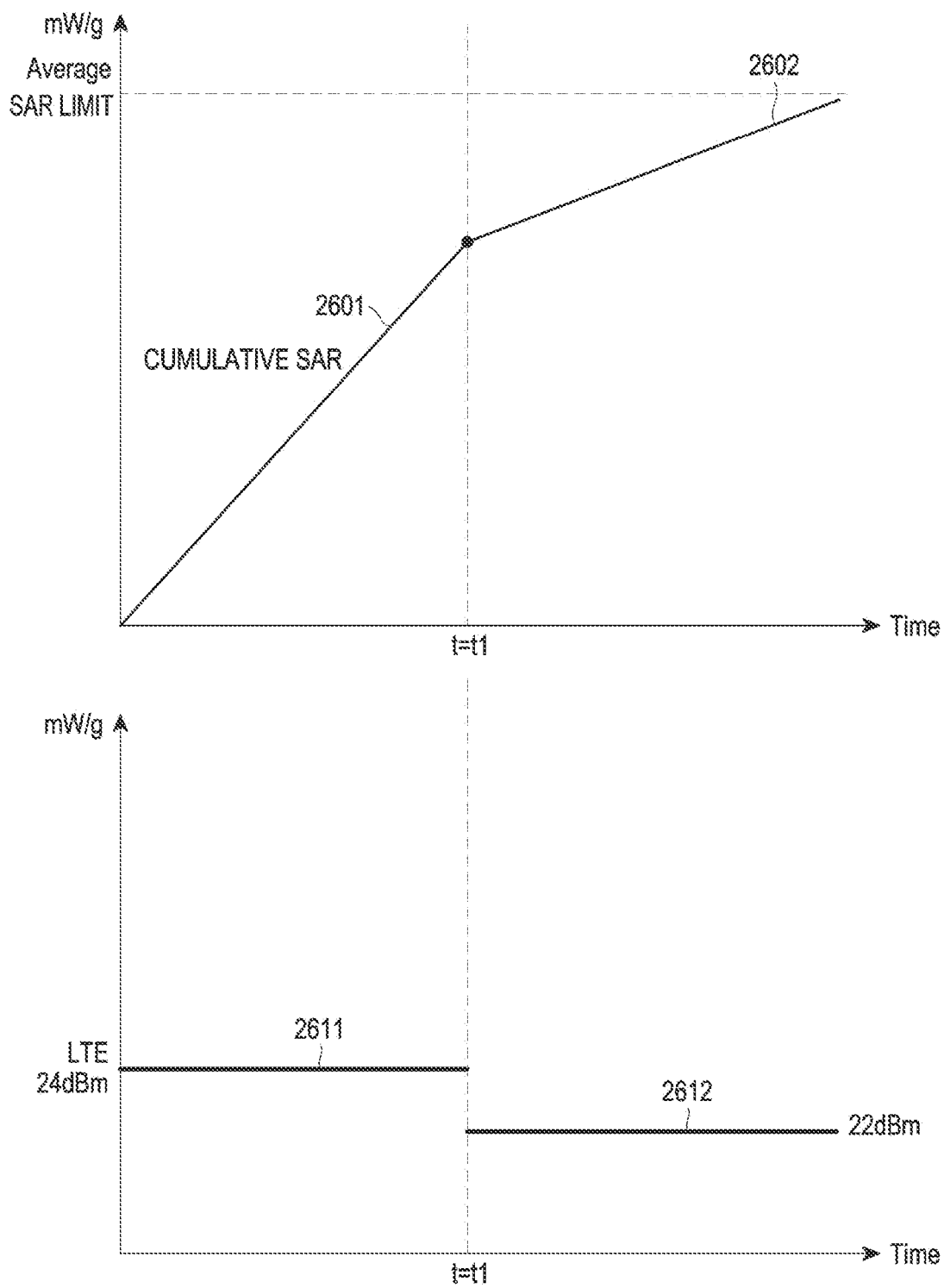
FIG. 26A is a diagram including graphs illustrating example backoff based on consideration of an cumulative SAR according to various embodiments.

FIG. 26A is a diagram illustrating example backoff based on consideration of an cumulative SAR according to various embodiments.

According to various embodiments, the electronic device 101 (for example, at least one of processor 120, first communication processor 212, second communication processor 214, or combined communication processor 260) may configure the transmission intensity of LTE communication to be a first value 2611 (for example, 24 dM) in the first time period (t<t1). During the first time period (t<t1), the cumulative SAR 2601 may increase at a first rate of increase. At the first timepoint (t1), the electronic device 101 may identify that a backoff is requested. The electronic device 101 may back off the transmission intensity of LTE communication to a second value 2612 (for example, 22 dBm). In the second time period (t1≤t), the cumulative SAR 2602 may increase at a second rate of increase. It will be assumed that the electronic device 101 uses a bandwidth of 20 MHz in order to transmit background data and data caused by VoLTE. Moreover, the electronic device 101 may use a bandwidth (for example, 1.6 MHz or 5 MHz) smaller than normally used bandwidths, when background data transmission is limited. After the first timepoint (t1), a first SAR margin resulting from use of a bandwidth of 5 MHz, not 20 Mhz, and a second SAR margin resulting from a backoff to the second value (for example, 22 dBm) may be secured. The electronic device 101 may use the secured SAR margins to delay the backoff timepoint or to maintain the transmission intensity.

Figure 26B:
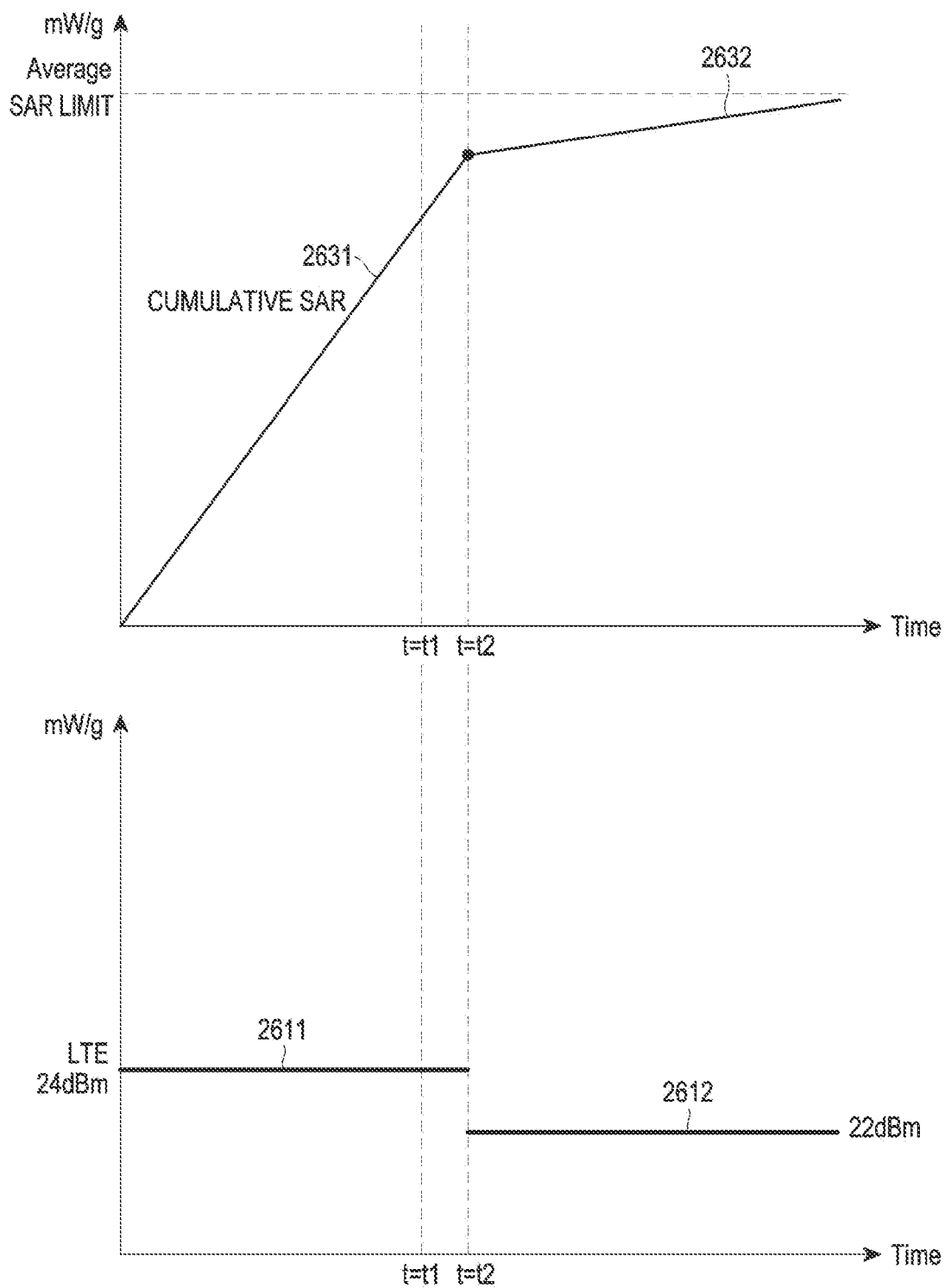
FIG. 26B is a diagram including graphs illustrating example backoff based on consideration of an cumulative SAR according to various embodiments.
Figure 26C:
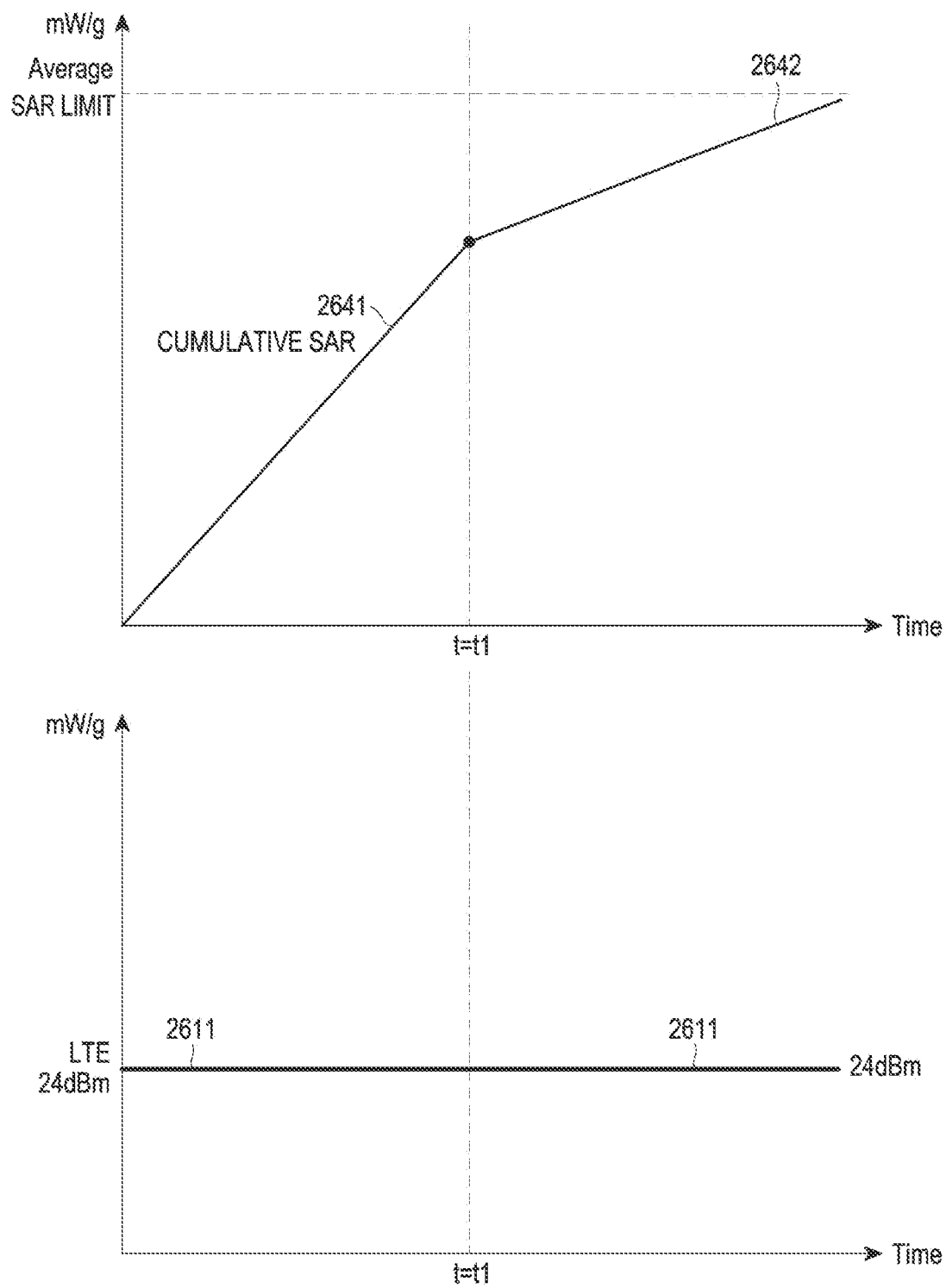
FIG. 26C is a diagram including graphs illustrating example backoff based on consideration of an cumulative SAR according to various embodiments.

Referring to FIG. 26B, the electronic device 101 may maintain the intensity of the communication signal at the first value 2611 until the second timepoint (t2), which comes later than the first timepoint (t1), using the secured SAR margin, and may perform a backoff at the second timepoint (t2). The cumulative SAR 2631 may increase at a first rate of increase before the second timepoint (t2), and the cumulative SAR 2632 may increase at a second rate of increase after the second timepoint (t2). Accordingly, the transmission intensity of VoLTE may be maintained relatively longer, thereby improving the stability. Referring to FIG. 26C, the electronic device 101 may use the secure SAR margin to maintain the intensity of the communication signal at the first value 2611. The cumulative SAR 2641 may increase at a first rate of increase before the first timepoint (t1), and the cumulative SAR 2642 may increase at a third rate of increase after the first timepoint (t1).

Figure 27A:
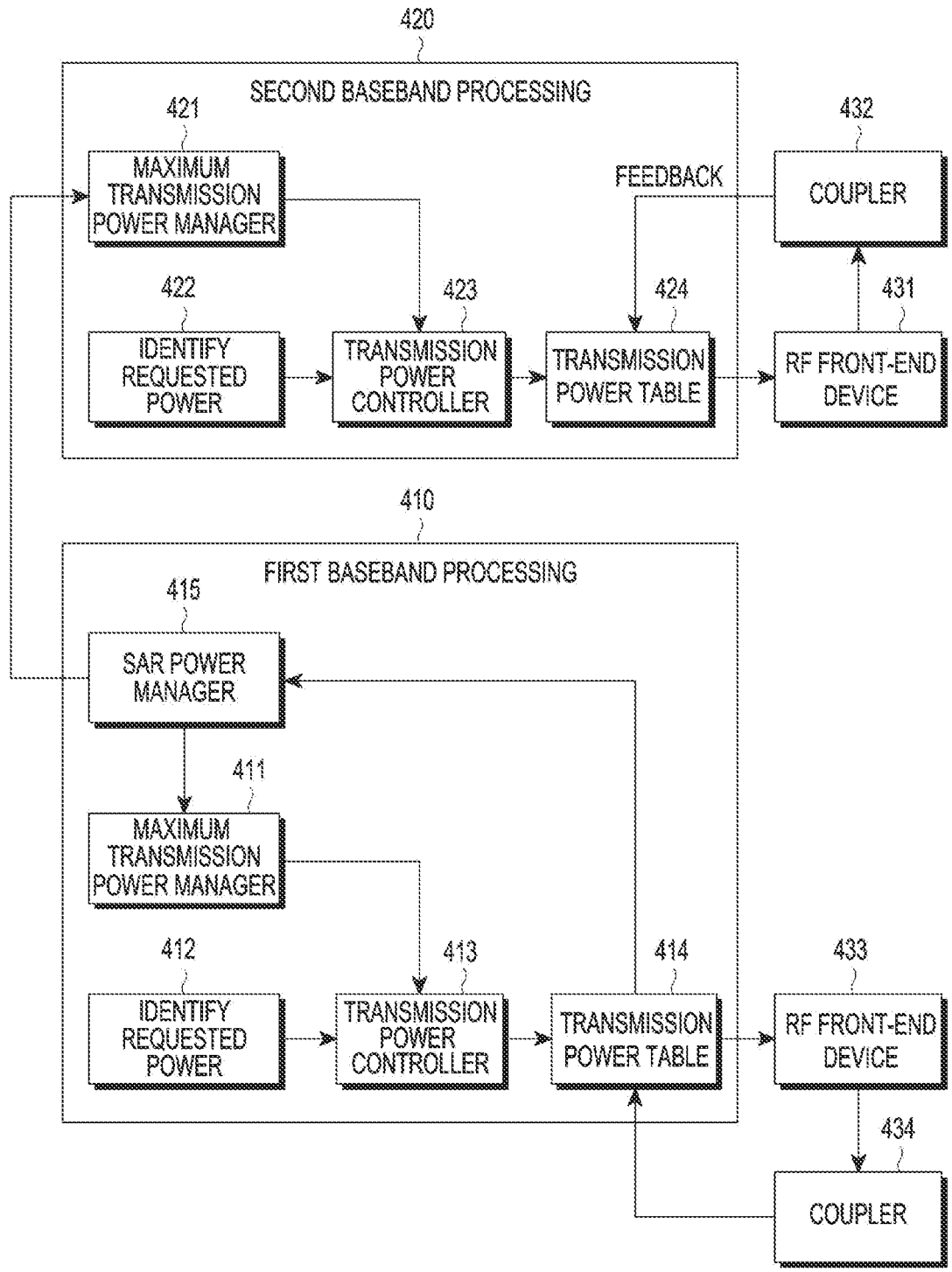
FIG. 27A is a diagram illustrating example baseband processing according to various embodiments.
Figure 27B:
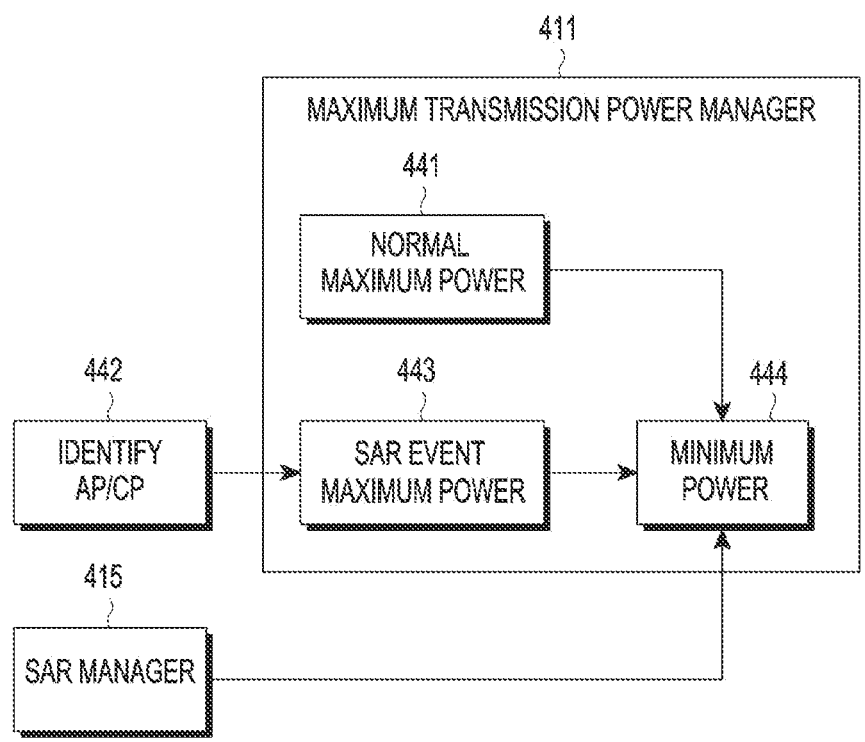
FIG. 27B is a diagram illustrating example baseband processing according to various embodiments.

FIG. 27A is a diagram illustrating an example configuration of the transmission intensity of a communication signal by an electronic device according to various embodiments. Physical components and/or logical components illustrated in at least one of FIG. 27A, 27B, 27C, 27D and FIG. 27E are not limited, may be omitted, or may be implemented such that other components are added.

According to various embodiments, the electronic device 101 (for example, at least one of processor 120, first communication processor 212, second communication processor 214, or combined communication processor 260) may perform first baseband processing 410 and second baseband processing 420. It may be understood that the first baseband processing 410 is performed by the first communication processor 212, for example, or represents the first communication processor 212. It may be understood that the second baseband processing 420 is performed by the second communication processor 214, for example, or represents the second communication processor 214. Referring to the first baseband processing 410, the maximum transmission power manager 411 may determine the maximum transmission power of a communication signal to be transmitted and may deliver the same to the power transmission controller 413. For example, referring to FIG. 27A and FIG. 27B, the maximum transmission power manager 411 may determine that minimum power 444 among normal maximum power 441, SAR event maximum power 443, and maximum power from the SAR manager 415 is the maximum transmission power value. The SAR manager 415 may deliver information regarding maximum power for satisfying a condition associated with an cumulative SAR (or average SAR) to at least one of the maximum transmission power manager 411 inside the first baseband processing 410 or the maximum transmission power manager 421 inside the second baseband processing 420. The SAR event maximum power 443 may output information regarding a maximum power value corresponding to a SAR event (for example, grip event, proximity event, or hot spot event) identified from the event manager 442, for example. The normal maximum power 441 may represent a power value allowed in the normal state of the electronic device 101.

According to various embodiments, the transmission power controller 413 may identify information regarding maximum transmission power from the maximum transmission power manager 411, and may identify (412) information regarding transmission power requested by the network or UE (for example, electronic device 101). The transmission power controller 413 may determine transmission power based on the identified information. The transmission power controller 413 may configure parameters of a power amplifier bias and/or an RF gain, with reference to a transmission power table 414. Information regarding the parameter configuration may be delivered to the RF front-end device 433 of the first network communication, for example, and used for parameter configuration. The RF front-end device 433 may be a separate hardware module. The coupler 434 may perform a feedback for adjusting the transmitted power. Meanwhile, descriptions of the maximum transmission power manager 421, the process of identifying (422) requested power, the transmission power controller 423, the transmission power table 424, the RF front-end device 431, and the coupler 432 inside the second baseband processing 420 may be similar to descriptions of components with the same names inside the first baseband processing 420, the RF front-end device 433, and the coupler 434.

Figure 27C:
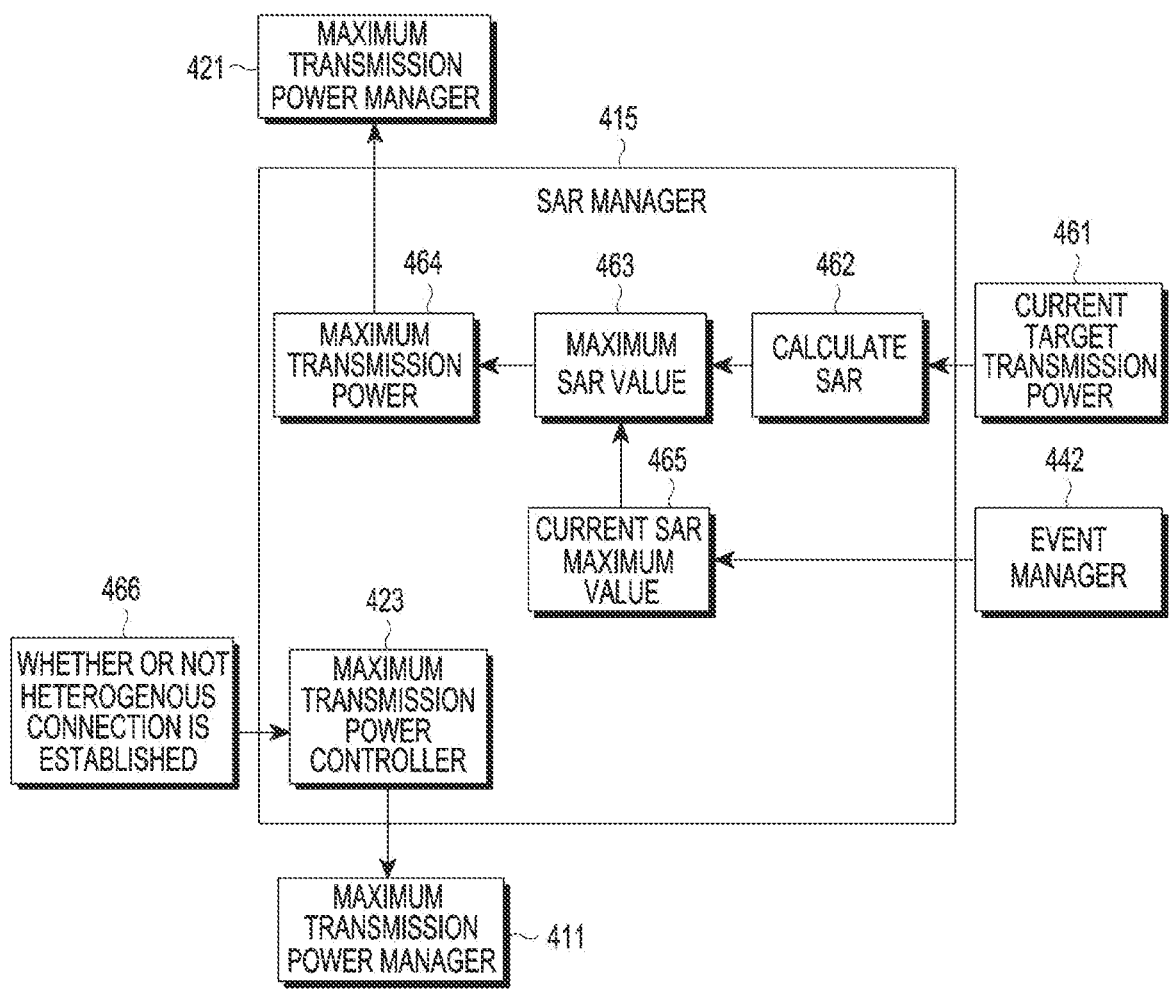
FIG. 27C is a diagram illustrating example baseband processing according to various embodiments.

Referring to FIG. 27C, the SAR manager 415 may identify the maximum value 465 of the current SAR, based on the SAR event identified from the event manager 442. Moreover, the SAR manager 415 may calculate (462) the SAR predicted when the corresponding power is transmitted, based on the current target TX power 461. The SAR manager 415 may calculate the maximum SAR value 463 based on the current SAR maximum value 465 and the calculated SAR 462, and may identify maximum transmission power 464 corresponding thereto. After the maximum transmission power 474 is identified, the SAR manager 415 may deliver the same to the maximum transmission power manager (for example, maximum transmission power manager 421). Moreover, the maximum transmission power controller 467 (for example, LTE maximum power controller) inside the SAR manager 415 may deliver information regarding the maximum transmission power to the maximum transmission power manager 411, based on whether a heterogenous connection is established (466) (for example, whether NR connection is established).

Figure 27D:
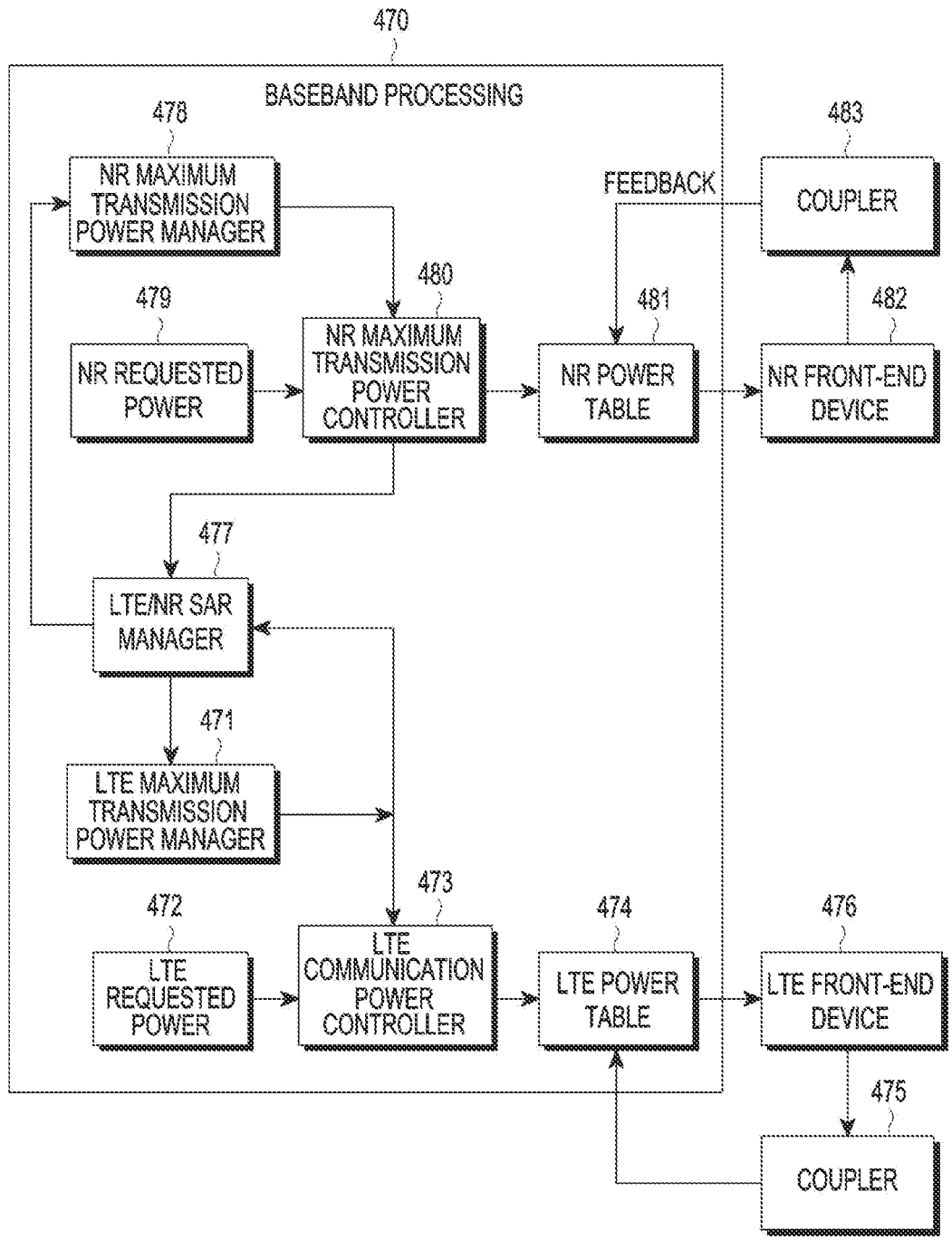
FIG. 27D is a diagram illustrating example baseband processing according to various embodiments.

It can be understood from the illustration in FIG. 27D that LTE and NR transmission power may be determined in one baseband processing 470. The baseband processing 470 may be performed by the combined communication processor 260 in FIG. 2B, for example, or may represent the combined communication processor 260. The LTE/NR SAR manager 477 may deliver information regarding transmission power determined based on an cumulative SAR (or average SAR) to the LTE maximum transmission power manager 471 and/or the NR maximum transmission power manager 478. The LTE maximum transmission power manager 471 may determine the smallest value among information regarding power received from the LTE/NR SAR manager 477, information regarding power corresponding to a SAR event, and normal maximum transmission power, and may deliver the same to the LTE communication power controller 473. The LTE communication power controller 473 may identify transmission power in view of information regarding power 472 required by the network of LTE or the UE. The LTE communication power controller 473 may identify a parameter for the identified transmission power in view of the LTE power table 474, and may deliver information regarding the identified parameter to the LTE front-end device 476. The LTE communication power controller 473 may share information regarding the identified transmission power with the LTE/NR SAR manager 477. The LTE front-end device 476 may operate according to the received parameter, and the coupler 475 may feedback at least a part of transmission power to the baseband processing 470. The NR maximum transmission power manager 478 may determine the smallest value among information regarding power received from the LTE/NR SAR manager 477, information regarding power corresponding to a SAR event, and normal maximum transmission power, and may deliver the same to the NR communication power controller 480. The NR communication power controller 480 may identify transmission power in view of information regarding power 479 required by the network of NR or the UE. The NR communication power controller 480 may identify a parameter for the identified transmission power in view of the NR power table 481, and may deliver information regarding the identified parameter to the NR front-end device 482. The NR communication power controller 482 may share information regarding the identified transmission power with the LTE/NR SAR manager 477. The NR front-end device 482 may operate according to the received parameter, and the coupler 483 may feedback at least a part of transmission power to the baseband processing 470.

Figure 27E:
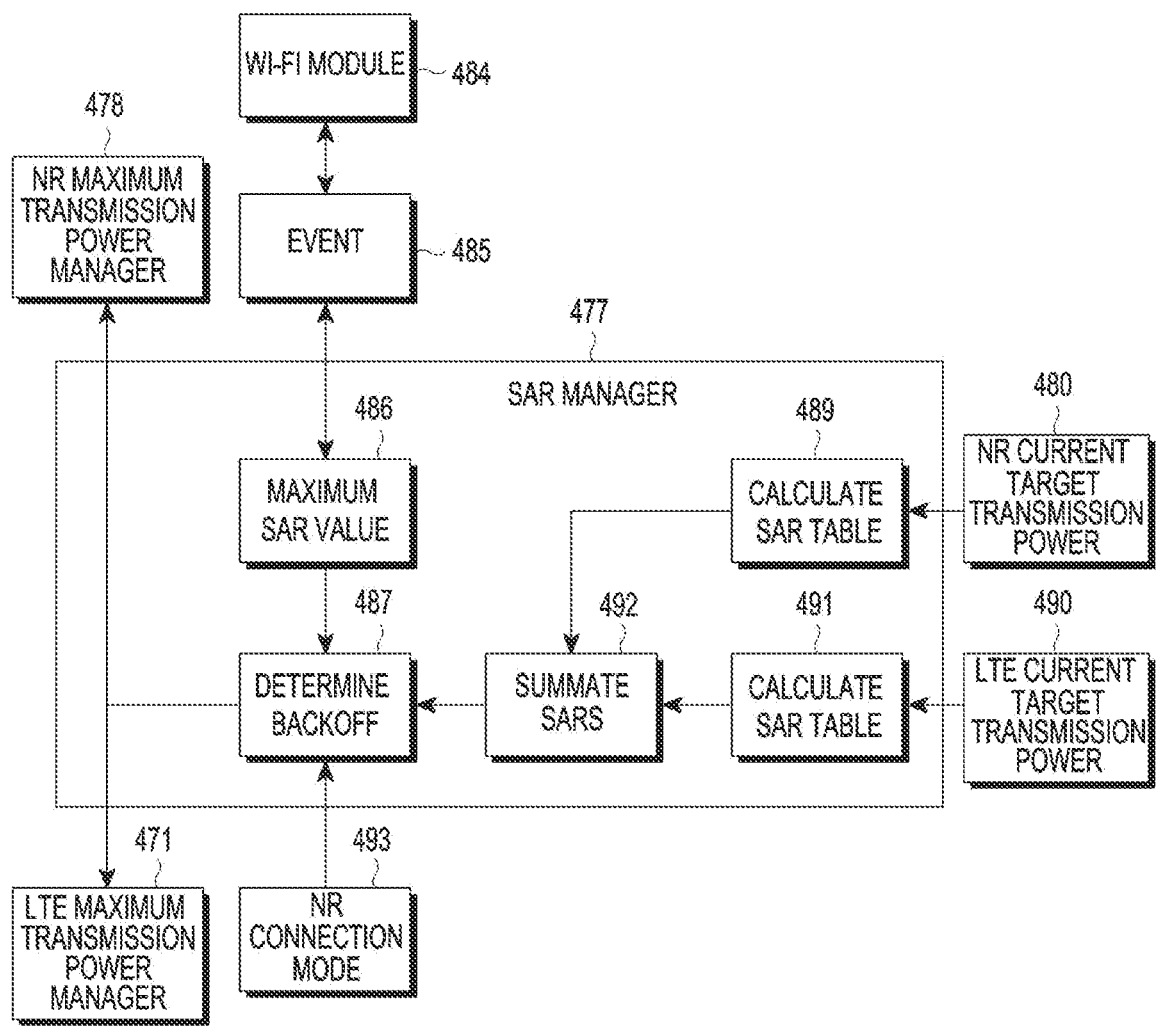
FIG. 27E is a diagram illustrating example baseband processing according to various embodiments.

Referring to FIG. 27E, the LTE/NR manager 477 may identify LTE current target transmission power 490 and NR current target transmission power 480, and may calculate SAR tables 489 and 491 corresponding thereto, respectively. The LTE/NR manager 477 may summate (492) current transmission SARs based on the SAR tables 489 and 491, and may determine (487) whether to conduct a backoff, based thereon. The LTE/NR manager 477 may determine whether to conduct a backoff, based on the maximum SAR value 486 and/or the NR connection mode 493. Determination 487 regarding whether to conduct a backoff may be delivered to the LTE maximum transmission power manager 471 and/or the NR maximum transmission power manager 478. Meanwhile, the Wi-Fi module 484 may transmit/receive information regarding power or SAR consumption with the AP or CP. SAR events, Wi-Fi power, and events 485 of used SAR information may be used to determine the maximum SAR value 486.

According to various example embodiments, an electronic device may include: at least one antenna; and at least one communication processor configured to support first network communication with a first network and second network communication with a second network different from the first network. The at least one communication processor may be configured to: identify a first cumulative SAR value based on radiation of a communication signal corresponding to the first network communication via a first part of the at least one antenna and a second cumulative SAR value based on radiation of a communication signal corresponding to the second network communication via a second part of the at least one antenna; and adjust one of a transmission intensity of a first communication signal corresponding to the first network communication or a transmission intensity of a second communication signal corresponding to the second network communication based on a designated condition satisfied by the first cumulative SAR value and the second cumulative SAR value.

According to various example embodiments, the at least one communication processor may be configured to: adjust one of the transmission intensity of the first communication signal or the transmission intensity of the second communication signal, based on identifying, based on first cumulative SAR value and the second cumulative SAR value, that an entire cumulative SAR value during a designated time period at least one future timepoint exceeds a threshold cumulative value.

According to various example embodiments, the at least one communication processor may be configured to identify multiple tables including information regarding SAR consumption values during the designated time period, respectively. The multiple tables may correspond to multiple future timepoints, respectively. The at least one communication processor may be configured to adjust one of the transmission intensity of the first communication signal or the transmission intensity of the second communication signal, based on identifying that there exists a table having a SAR consumption value during the designated time period exceeding the threshold cumulative value, among the multiple tables.

According to various example embodiments, the at least one communication processor may be configured to: identify, with regard to each of the multiple tables, a summ of a cumulative SAR value regarding at least one past timepoint included in the multiple tables, a maximum SAR value corresponding to a current timepoint, and a predicted SAR value predicted to be consumed at least one future timepoint; and identify whether table having the summation exceeding the threshold cumulative value exists.

According to various example embodiments, the at least one communication processor may be configured to: discard an initial table among the multiple tables, based on identifying that a period of a designated timer expires; perform an update regarding remaining tables; and produce a new table. The remaining tables may be updated by shifting data regarding included multiple timepoints by the time of the period of the designated timer.

According to various example embodiments, the at least one communication processor may be configured to: identify being configured to preferentially back off the second network communication among the first network communication and the second network communication; and preferentially back off the transmission intensity of the second communication signal.

According to various example embodiments, the at least one communication processor may be configured to: back off the transmission intensity of the second communication signal, based on identifying that a threshold cumulative value is exceeded by a summation of the first cumulative SAR value, the second cumulative SAR value, a first predicted SAR value predicted to be consumed by the first network communication that is not backed off, and a second predicted SAR value predicted to be consumed by the second network communication that is backed off, during a designated time period at least one future timepoint.

According to various example embodiments, the at least one communication processor may be configured to: identify whether communication related to a designated application is being performed; and determine the first predicted SAR value that is predicted to be consumed by the first network communication based on whether the communication related to the designated application is being performed.

According to various example embodiments, the at least one communication processor may be configured to: identify whether communication related to a designated application is being performed; and determine the amount of backoff of the second communication based on whether the communication related to the designated application is being performed.

According to various example embodiments, the first network communication may be network communication for supporting VoLTE.

According to various example embodiments, the at least one communication processor may be configured to: limit transmission of background data via the first network communication, based on predicting that an entire cumulative SAR value will exceed a threshold cumulative value by transmission of the first communication signal for the VoLTE during a designated time period at least one future timepoint.

According to various example embodiments, the at least one communication processor may be configured to: maintain the transmission intensity of the first communication signal for at least a first period, based on limitation of transmission of the background data.

According to various example embodiments, the at least one communication processor may be configured to: back off the transmission intensity of the first communication signal, based on predicting, after backing off the transmission intensity of the second communication signal, that an entire cumulative SAR value will exceed a threshold cumulative value by transmission of the first communication signal that is not backed off, during a designated time period at least one future timepoint.

According to various example embodiments, the at least one communication processor may be configured to identify multiple tables including information regarding SAR consumption values during the designated time period, respectively after backing off the transmission intensity of the second communication signal. The multiple tables may correspond to multiple future timepoints, respectively. The at least one communication processor may be configured to back off the transmission intensity of the first communication signal, based on identifying that a table having a SAR consumption value during the designated time period, which exceeds the threshold cumulative value, among the multiple tables exists.

According to various example embodiments, the at least one communication processor may be configured to maintain or additionally back off the transmission intensity of the second communication signal, based on backing off the transmission intensity of the first communication signal.

According to various example embodiments, an electronic device may include at least one communication processor configured to support first network communication with a first network and second network communication with a second network different from the first network. The at least one communication processor may be configured to: receive, from a base station corresponding to the first network communication, a report condition instructing transmission of a communication signal from at least one peripheral base station corresponding to the second network communication; identify that a communication signal from a first base station among peripheral base stations corresponding to the second network communication satisfies the report condition; and identify whether to perform a measurement report corresponding to the first base station, based on a first cumulative SAR value resulting from radiation of a communication signal corresponding to the first network communication.

According to various example embodiments, the at least one communication processor may be configured to: perform the first network communication for a designated time period at least one future timepoint using the first cumulative SAR value and, based on predicting that the amount of predicted SAR that is predicted based on the second network communication being performed together exceeding a threshold amount of accumulation, not perform the measurement report.

According to various example embodiments, the at least one communication processor may be configured to perform the first network communication for a designated time period at least one future timepoint using the first cumulative SAR value and, based on predicting that the amount of predicted SAR predicted based on the second network communication being performed together not exceeding a threshold amount of accumulation, perform the measurement report.

According to various example embodiments, an electronic device may include: at least one antenna; a Wi-Fi communication module comprising circuitry configured to perform Wi-Fi communication with an external electronic device; and at least one communication processor configured to support first network communication with a first network and second network communication with a second network different from the first network. The at least one communication processor may be configured to: identify a first SAR margin configured in the Wi-Fi communication module, based on activation of a Wi-Fi hot spot function using the Wi-Fi communication module; identify a first cumulative SAR value based on radiation of a communication signal corresponding to the first network communication via a first part of the at least one antenna and a second cumulative SAR value based on radiation of a communication signal corresponding to the second network communication via a second part of the at least one antenna; and determine a transmission intensity of the communication signal corresponding to the first network communication and a transmission intensity of the communication signal corresponding to the second network communication, based on the first cumulative SAR value, the second cumulative SAR value, and the first SAR margin.

According to various example embodiments, the at least one communication processor may be configured to: identify an amount of remaining SAR, corresponding to a difference between an amount of consumed SAR consumed by the Wi-Fi communication module and the first SAR margin, at a designated cycle; and determine the transmission intensity of the communication signal corresponding to the first network communication and the transmission intensity of the communication signal corresponding to the second network communication, based on the first cumulative SAR value, the second cumulative SAR value, the first SAR margin, and the amount of remaining SAR.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., a master device or a task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood that the various example embodiments are intended to be illustrative, not limiting. It will further be understood by one of ordinary skill in the art that various changes in form and detail may be made without departing from the true spirit and full scope of the disclosure, including the appended claims and equivalents thereof.

What is claimed is:

1. An electronic component comprising:
   memory storing at least one instruction; and
   at least one communication processor configured to support first network communication with a first network and second network communication with a second network different from the first network,
   wherein the at least one instruction, when executed by the at least one communication processor, causes the electronic component to at least:
      identify, based at least on a current timepoint of a designated time period, a first current cumulative SAR (Specific Absorption Rate) value corresponding to the first network communication and a second current cumulative SAR value corresponding to the second network communication, wherein the first and second current cumulative SAR values correspond to cumulative transmission power from a start timepoint to the current timepoint of the designated time period,
      estimate a first future cumulative SAR value corresponding to the first network during a remaining time of the designated time period, and a second future cumulative SAR value corresponding to the second network during the remaining time of the designated time period, and
      based at least on the first current cumulative SAR value, the second current cumulative SAR value, the first future cumulative SAR value and the second future cumulative SAR value, control first transmission power corresponding to the first network to be limited to a first back off transmission power and control second transmission power corresponding to the second network to be limited to a second back off transmission power, so that a sum of the first and second current cumulative SAR values and the first and second future cumulative SAR values during designated time period is maintained at a value less than or equal to a threshold cumulative SAR value of the designated time period,
      wherein, during the remaining time, an allocated amount of SAR associated with the first back off transmission power is to be greater than an allocated amount of SAR associated with the second back off transmission power.

2. The electronic component of claim 1, wherein the control of the first transmission power corresponding to the first network and the control of the second transmission power corresponding to the second network are performed at the same time point.

3. The electronic component of claim 1, wherein the control of the first transmission power corresponding to the first network and the control of the second transmission power corresponding to the second network are performed at different time points.

4. The electronic component of claim 1, wherein the at least one instruction, when executed by the at least one communication processor, further causes the electronic component to:
identify the first current cumulative SAR value by summing accumulated SAR value corresponding to the first network communication associated with at least one past timepoint and a first maximum SAR value associated with the first network communication corresponding to the current timepoint, and
identify the second current cumulative SAR value by summing accumulated SAR value corresponding to the second network communication associated with the at least one past timepoint and a second maximum SAR value associated with the second network communication corresponding to the current timepoint.

5. The electronic component of claim 1, wherein a SAR generated based at least on the first back off transmission power is greater than a SAR generated based at least on the second back off transmission power.

6. The electronic component of claim 1, wherein the at least one instruction, when executed by the at least one communication processor, further causes the electronic component to:
adjust a first maximum intensity corresponding to the first network communication and a second maximum intensity corresponding to the second network communication, such that the first transmission power corresponding to the first network is limited to the first back off transmission power and the second transmission power corresponding to the second network is limited to the second back off transmission power.

7. The electronic component of claim 1, wherein at least one of the first back off transmission power and the second back off transmission power is to be identified based at least on whether a voice call service is enabled or not.

8. The electronic component of claim 1, wherein at least one of the first back off transmission power and the second back off transmission power is to be identified based at least on whether a predefined application is executed or not.

9. The electronic component of claim 1, wherein the first network communication is LTE and the second network communication is NR.

10. An electronic component comprising:
memory storing at least one instruction; and
at least one communication processor configured to support first network communication with a first network and second network communication with a second network,
wherein the at least one instruction, when executed by the at least one communication processor, causes the electronic component to at least:
identify, based at least on a current timepoint of a designated time period, a first current cumulative SAR (Specific Absorption Rate) value corresponding to the first network communication and a second current cumulative SAR value corresponding to the second network communication, wherein the first and second current cumulative SAR values correspond to cumulative transmission power from a start timepoint to the current timepoint of the designated time period,
based at least on the first current cumulative SAR value and the second current cumulative SAR value, identify a first back off transmission power corresponding to the first network and a second back off transmission power corresponding to the second network to be limited during a remaining time of the designated time period, and
control first transmission power corresponding to the first network based at least on the first back off transmission power and control second transmission power corresponding to the second network based at least on second back off transmission power, such that a sum of cumulative SAR values corresponding to the first network communication and the second network communication during designated time period is maintained at a value less than or equal to a threshold cumulative SAR value of the designated time period,
wherein an allocated amount of SAR associated with the first back off transmission power for the first network is greater than an allocated amount of SAR associated with the second back off transmission power for the second network.

11. The electronic component of claim 10, wherein the control of the first transmission power corresponding to the first network and the control of the second transmission power corresponding to the second network are performed at the same time point.

12. The electronic component of claim 10, wherein the at least one instruction, when executed by the at least one communication processor, further causes the electronic component to:
identify the first current cumulative SAR value by summing accumulated SAR value corresponding to the first network associated with at least one past timepoint and a first maximum SAR value associated with the first network corresponding to the current timepoint, and
identify the second current cumulative SAR value by summing accumulated SAR value corresponding to the second network associated with the at least one past timepoint and a second maximum SAR value associated with the second network corresponding to the current timepoint.

13. The electronic component of claim 10,
wherein the first transmission power corresponding to the first network is less than or equal to the first back off transmission power, and
wherein the second transmission power corresponding to the second network is less than or equal to the second back off transmission power.

14. The electronic component of claim 10, wherein at least one of the first back off transmission power and the second back off transmission power is identified based at least on whether a voice call service is enabled or not.

15. The electronic component of claim 10, wherein at least one of the first back off transmission power and the second back off transmission power is identified based at least on whether a predefined application is executed or not.

16. The electronic component of claim 10, wherein the first network communication is LTE and the second network communication is NR.

17. An electronic component comprising:
memory storing at least one instruction; and
at least one communication processor configured to support first network communication with a first network and second network communication with a second network different from the first network, wherein the at least one instruction, when executed by the at least one communication processor, causes the electronic component to at least:

identify, based at least on a current timepoint of a designated time period, a first cumulative SAR (Specific Absorption Rate) value corresponding to the first network communication and a second cumulative SAR value corresponding to the second network communication, based at least on the first cumulative SAR value and the second cumulative SAR value, identify a sum of SAR values associated with backoff transmission intensities with regard to a future timepoint in the designated time period, and based at least on a sum of SAR values associated with the backed-off transmission intensities with regard to the future timepoint, control a backoff transmission intensity of a first communication signal corresponding to the first network communication and a backoff transmission intensity of a second communication signal corresponding to the second network communication, such that a sum of cumulative SAR values at the future timepoint is maintained at a value less than or equal to a threshold cumulative value, wherein the backoff transmission intensity of the first communication signal and the backoff transmission intensity of the second communication signal are to be controlled during a duration with regard to the future timepoint such that an amount of SAR allocated to the first communication signal, associated with a control signal communication, is to be greater than an amount of SAR allocated to the second communication signal.

18. The electronic component of claim 17, wherein the control of the backoff transmission intensity of the first communication signal corresponding to the first network communication and the control of the backoff transmission intensity of the second communication signal corresponding to the second network communication are performed at the same time point.

19. The electronic component of claim 17, wherein the first network communication is LTE and the second network communication is NR.

* * * * *